(12) United States Patent
Takakusa

(10) Patent No.: US 11,040,559 B2
(45) Date of Patent: Jun. 22, 2021

(54) INK JET PRINTING APPARATUS

(71) Applicant: Riso Kagaku Corporation, Tokyo (JP)

(72) Inventor: Tadashi Takakusa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 96 days.

(21) Appl. No.: 16/366,417

(22) Filed: Mar. 27, 2019

(65) Prior Publication Data

US 2019/0299683 A1 Oct. 3, 2019

(30) Foreign Application Priority Data

Mar. 29, 2018 (JP) .............................. JP2018-063846
Mar. 18, 2019 (JP) .............................. JP2019-049753

(51) Int. Cl.
| | | |
|---|---|---|
| *B41J 2/045* | (2006.01) | |
| *B41J 25/308* | (2006.01) | |
| *B41J 19/14* | (2006.01) | |
| *B29C 64/112* | (2017.01) | |
| *B41J 3/407* | (2006.01) | |

(52) U.S. Cl.
CPC ............ *B41J 19/142* (2013.01); *B29C 64/112* (2017.08); *B41J 2/04556* (2013.01); *B41J 2/04586* (2013.01); *B41J 19/14* (2013.01); *B41J 25/308* (2013.01); *B41J 3/4073* (2013.01)

(58) Field of Classification Search
CPC ........ B41J 25/308; B41J 19/14; B41J 19/142; B41J 2/04586; B41J 2/04556; B41J 3/4073; B29C 64/112; B29C 64/209; B33Y 30/00
See application file for complete search history.

(56) References Cited

U.S. PATENT DOCUMENTS

| | | |
|---|---|---|
| 2006/0192798 A1 | 8/2006 | Kiku et al. |
| 2009/0160889 A1 | 6/2009 | Holbrook et al. |

FOREIGN PATENT DOCUMENTS

| | | |
|---|---|---|
| JP | 2005-335247 A | 12/2005 |
| JP | 2009-248559 A | 10/2009 |
| JP | 2017-177440 A | 10/2017 |

OTHER PUBLICATIONS

Machine translation of JP 2009-248559, published on Oct. 2009. (Year: 2009).*

(Continued)

*Primary Examiner* — Huan H Tran
(74) *Attorney, Agent, or Firm* — Greenblum & Bernstein, P.L.C.

(57) ABSTRACT

An ink jet printing apparatus includes: a conveying mechanism that moves at least one of a print medium and an ink jet head in a predetermined conveyance direction; a height information detecting unit that obtains information related to the height of the surface of the print medium; a moving mechanism that moves at least one of the ink jet head and the print medium upward and downward in the vertical direction; and a control unit that controls the ink jet head while sequentially controlling the moving mechanism accompanying conveyance by the conveying mechanism, based on the information related to the height which is detected by the height information detecting unit, thereby maintaining the distance between the print medium and the ink jet head to be within a range which is set in advance, to perform a printing process on the print medium.

9 Claims, 35 Drawing Sheets

(56) References Cited

OTHER PUBLICATIONS

Machine translation of JP 2017-177440, published on Oct. 2017 (Year: 2017).*
Machine translation of JP 2005-335247, published on Dec. 2005 (Year: 2005).*
Aug. 21, 2019 extended European Search Report in corresponding European application No. 19165170.2.

* cited by examiner

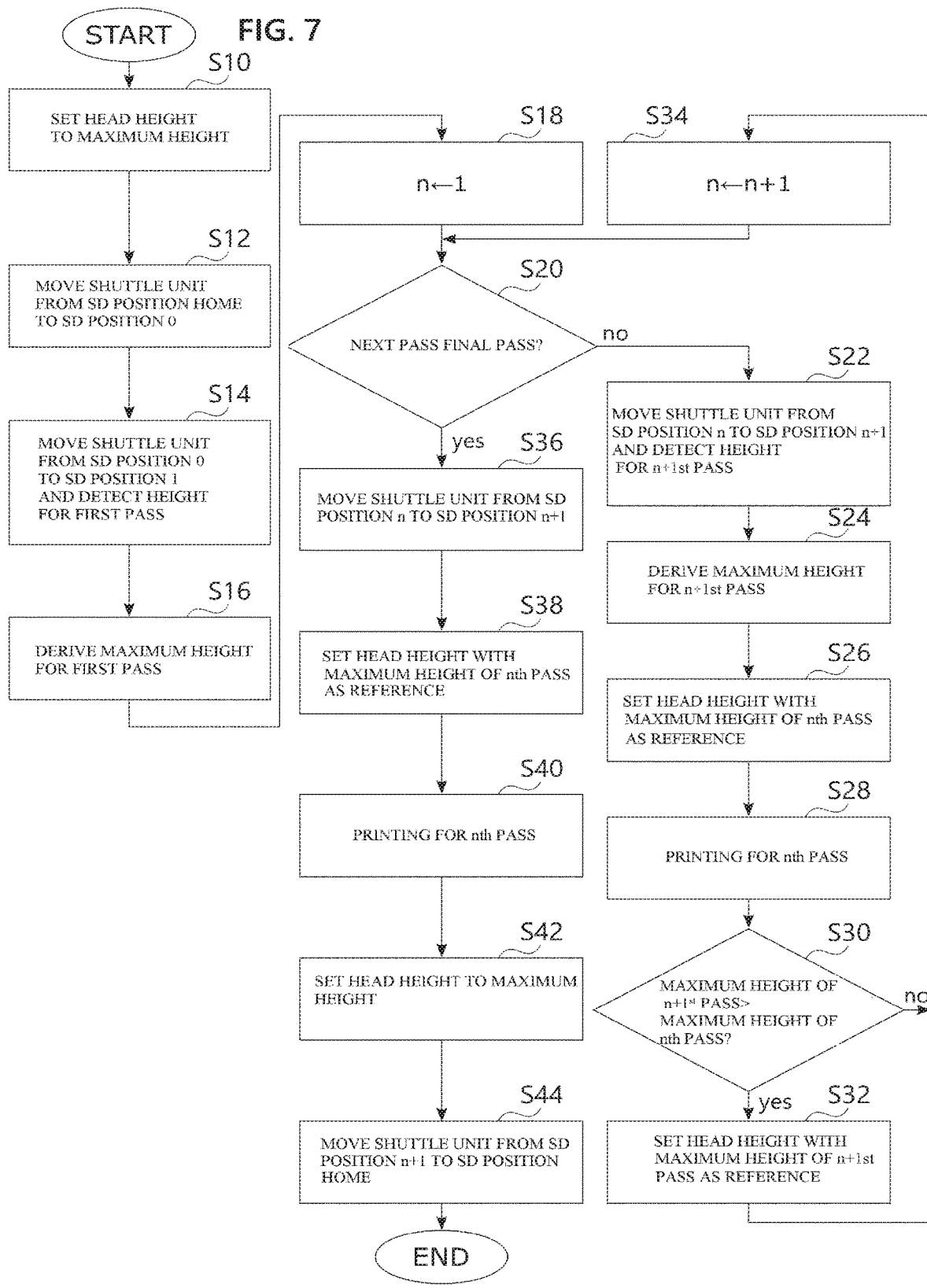

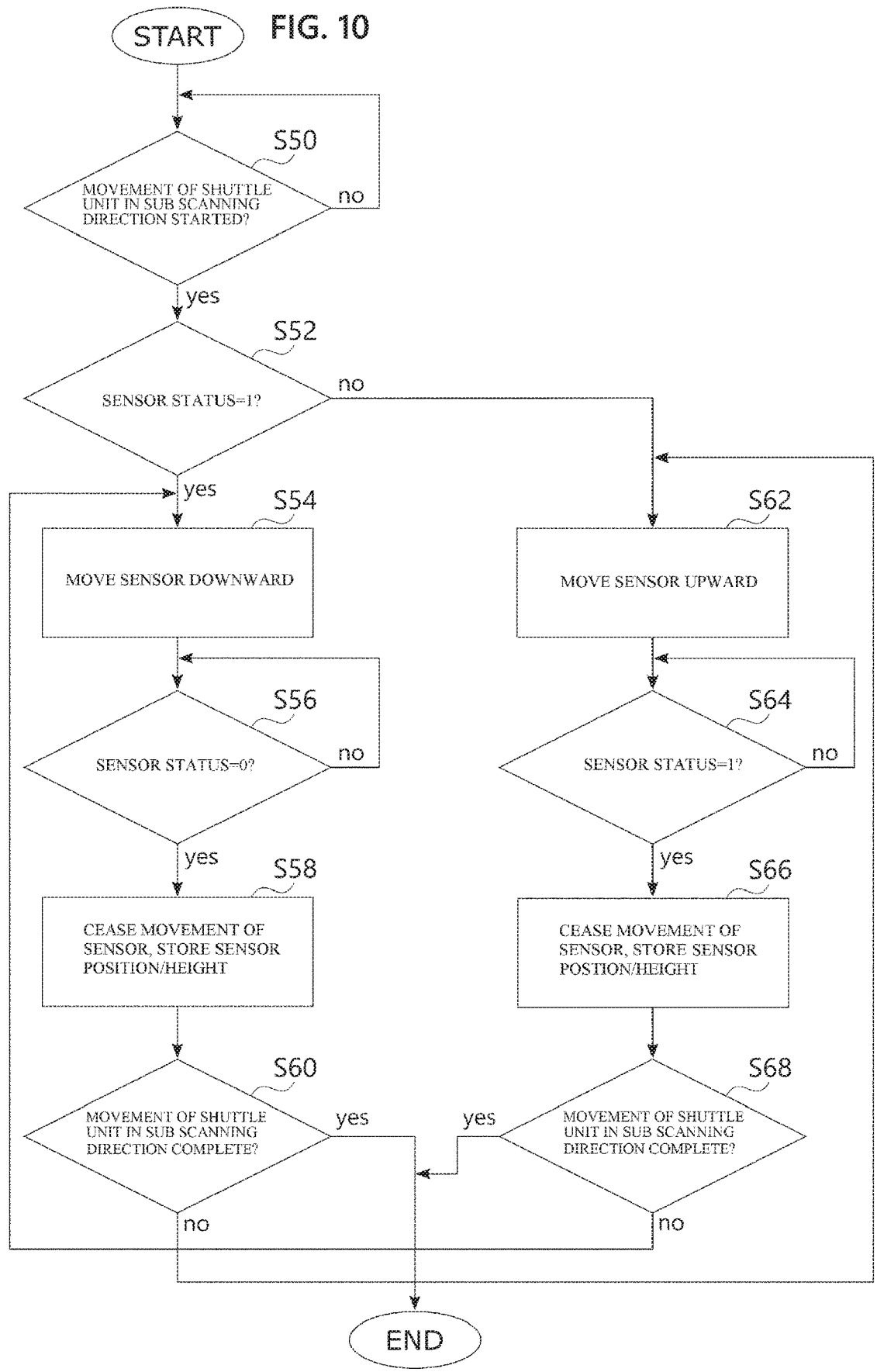

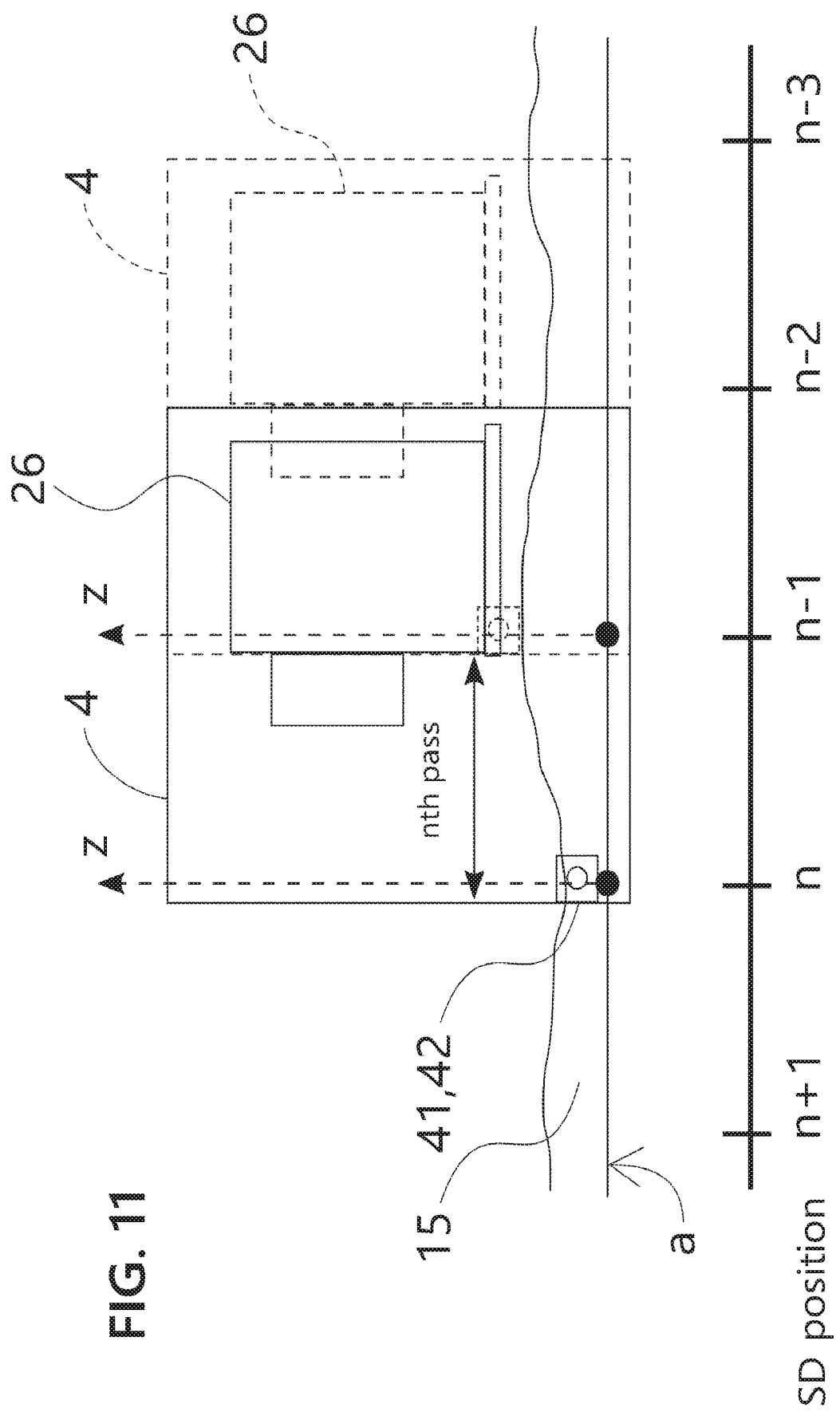

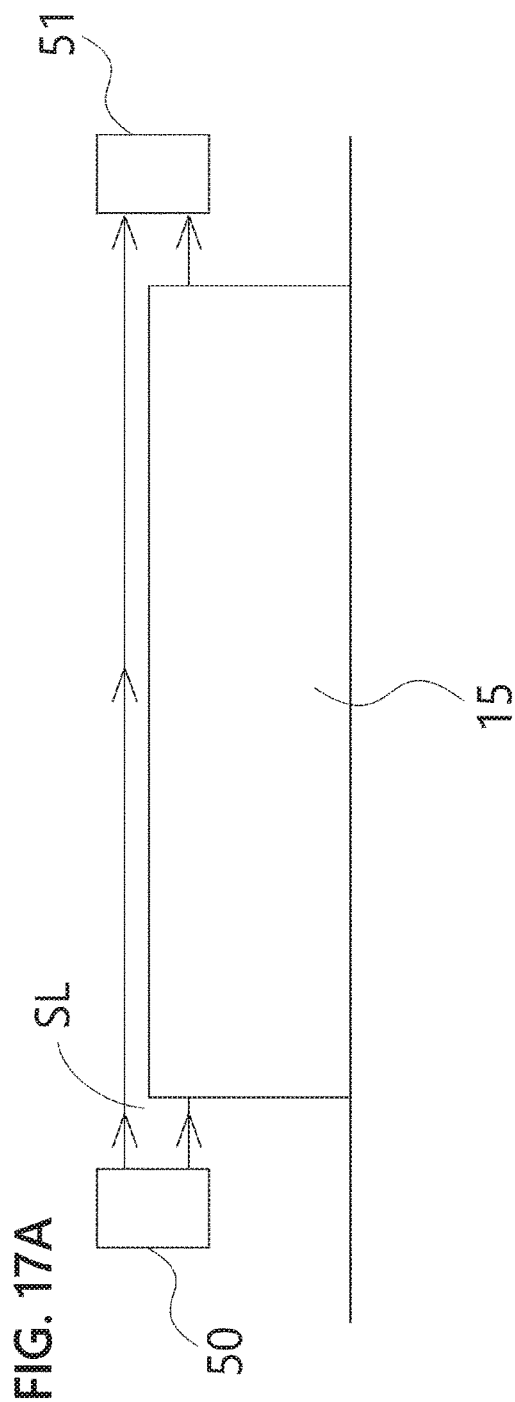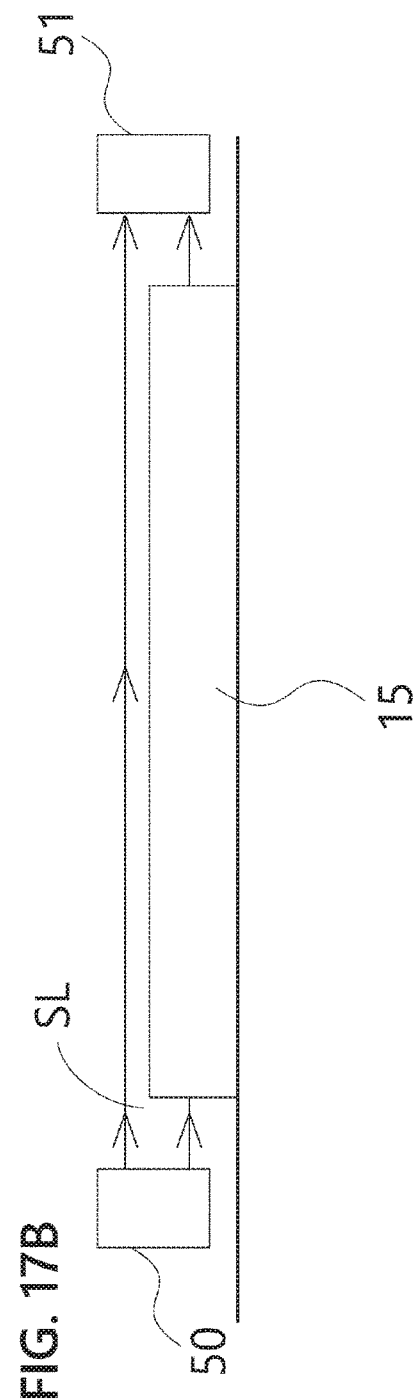

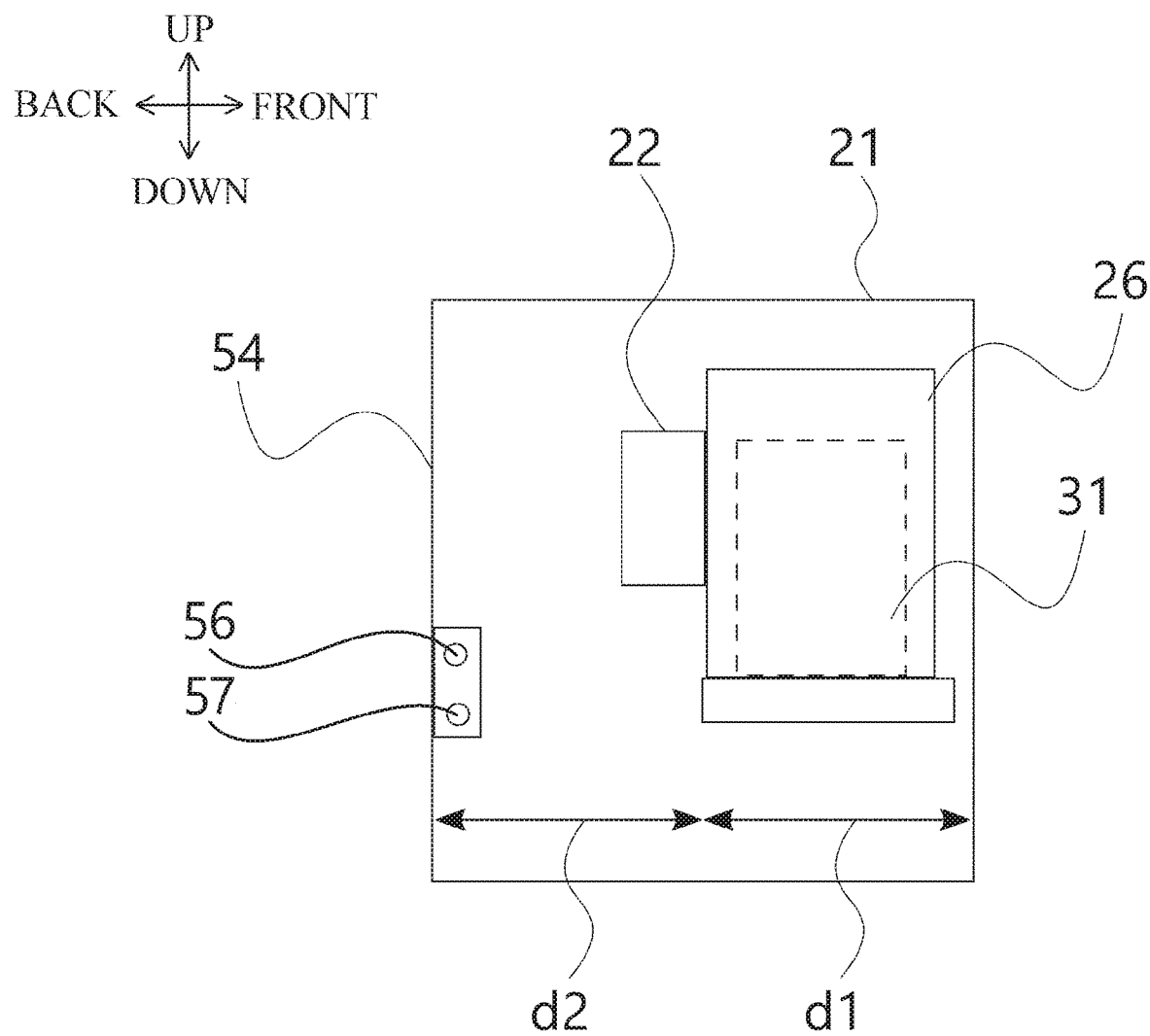

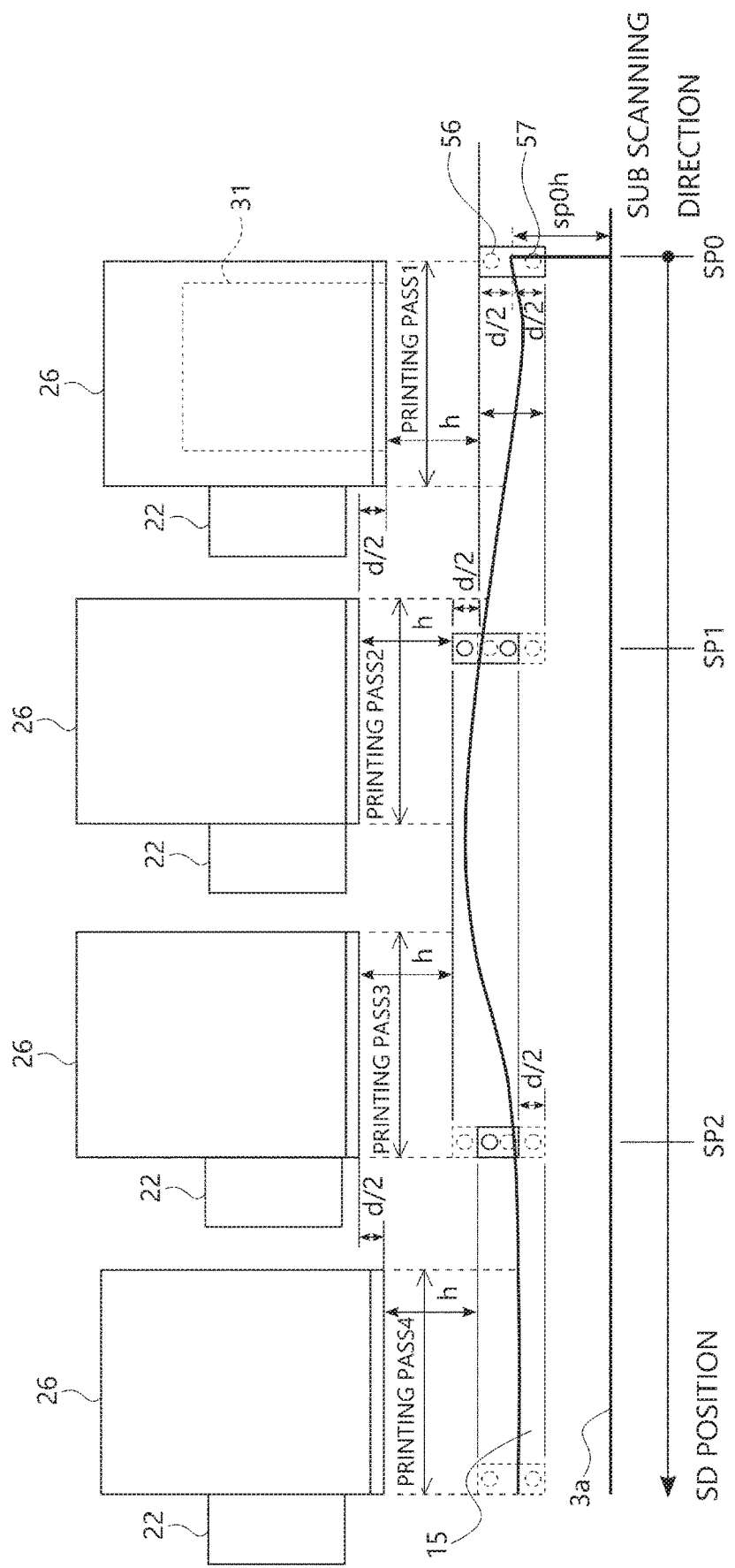

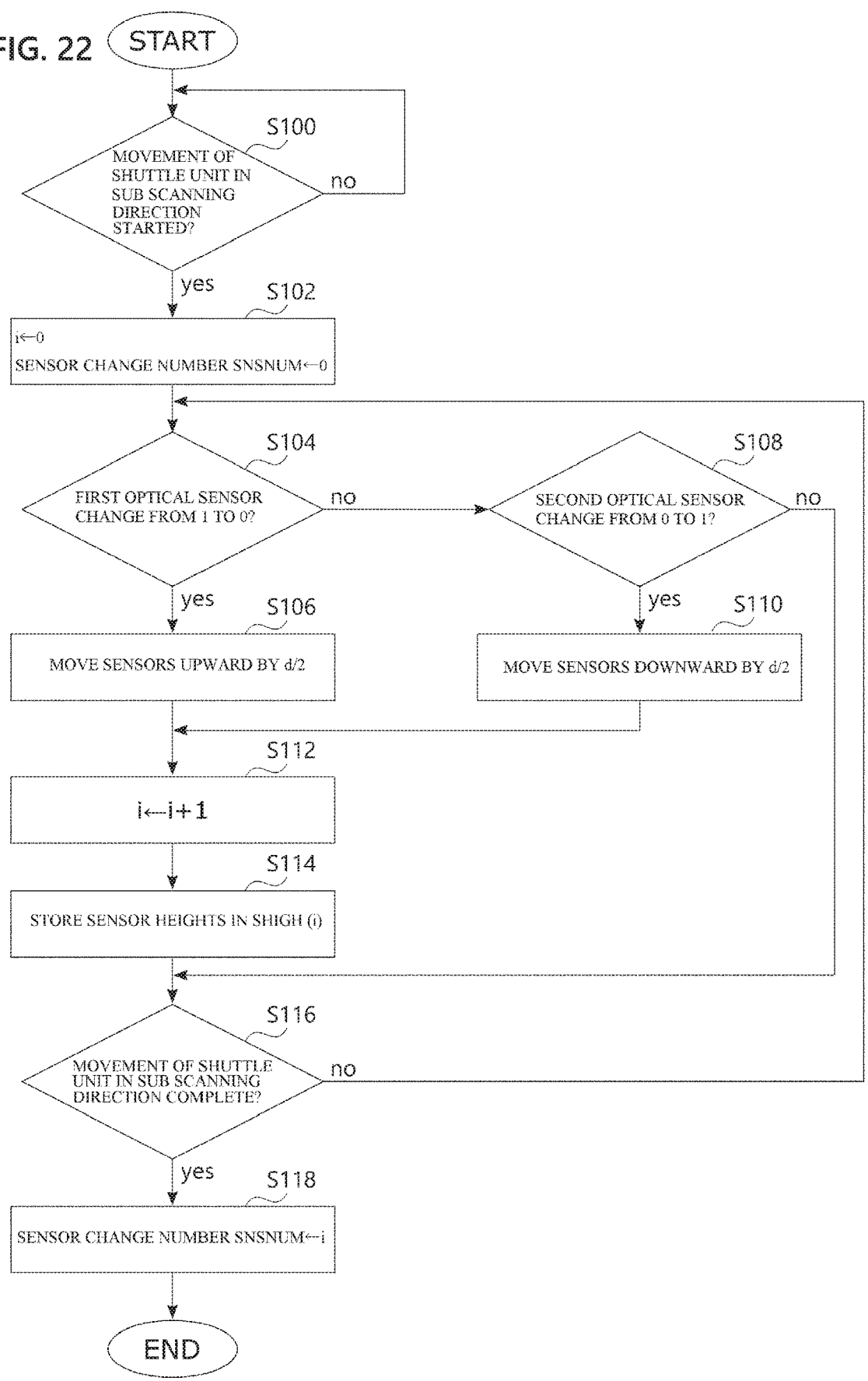

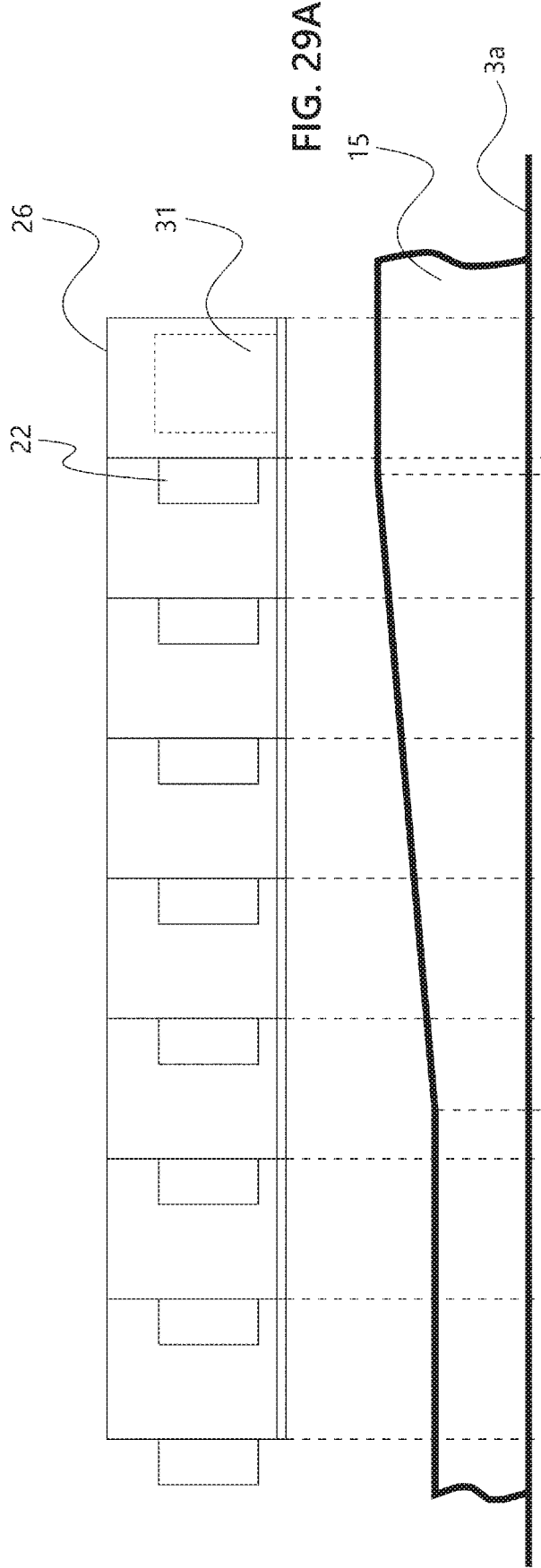
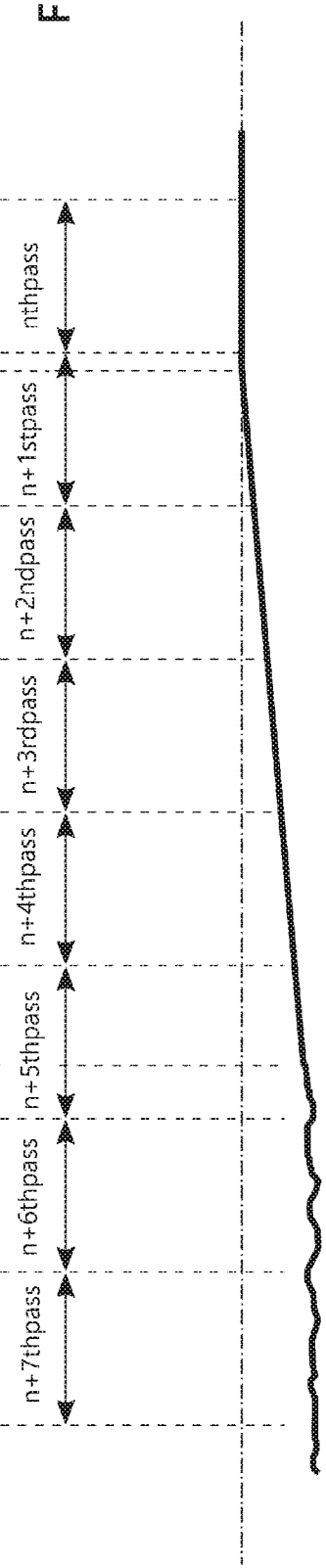

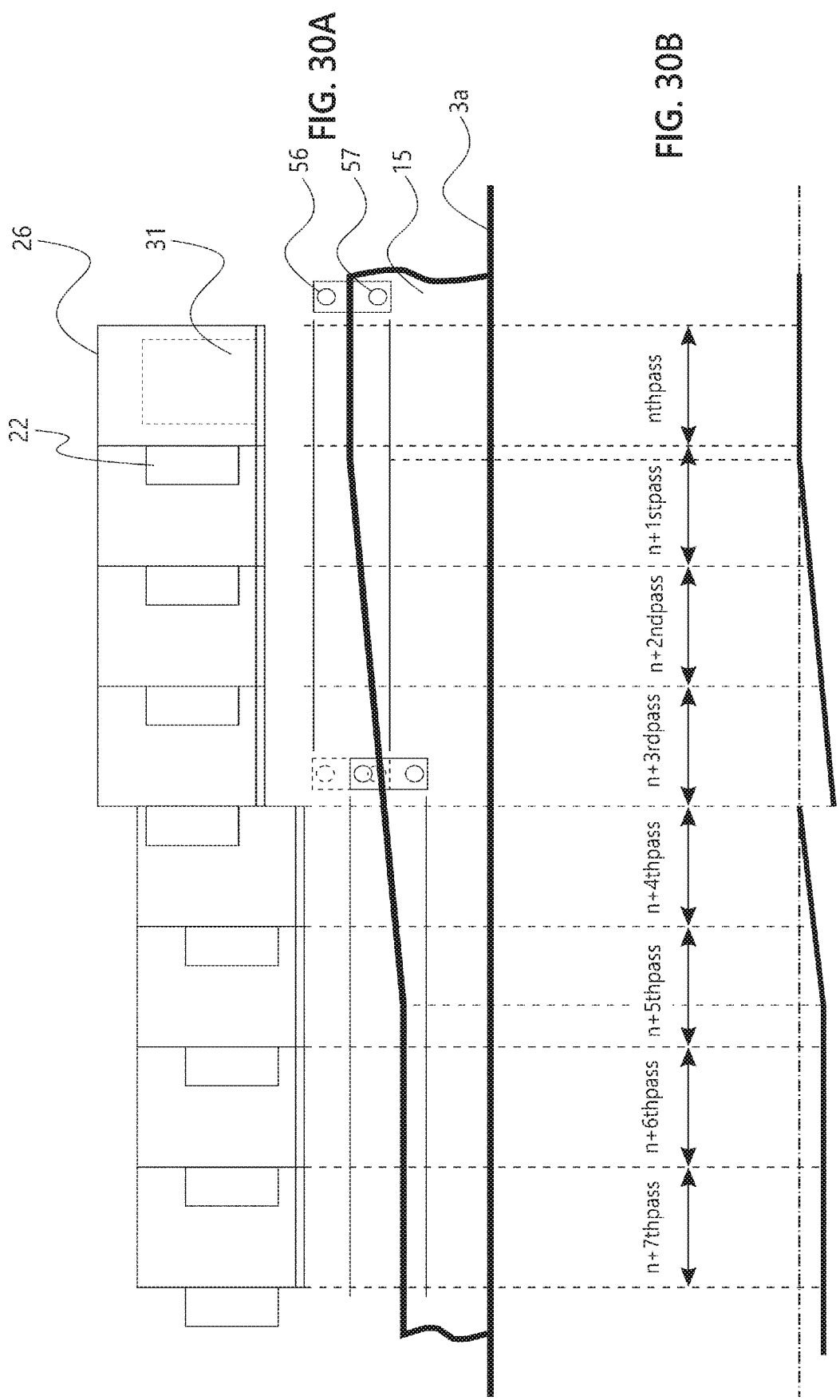

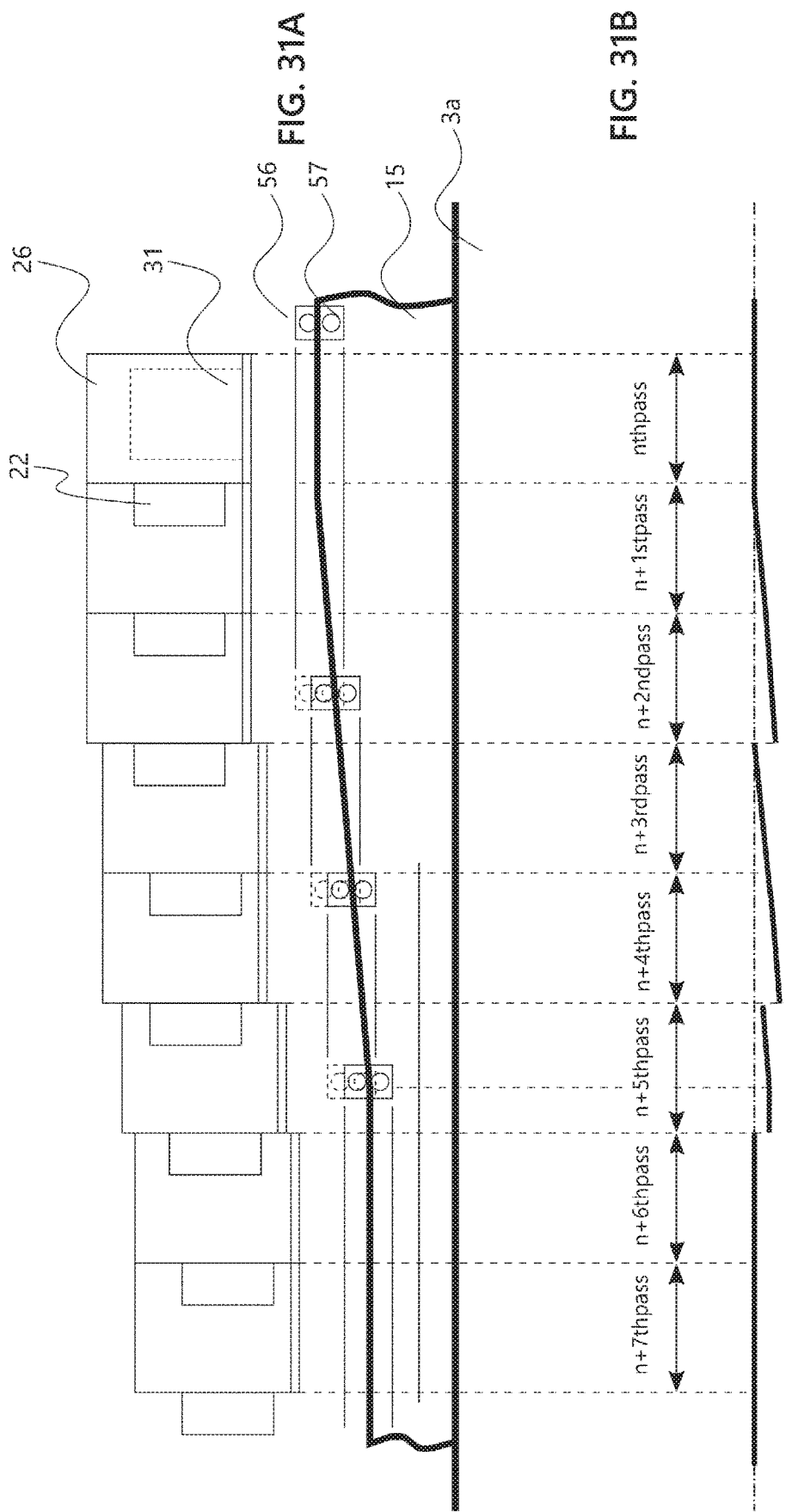

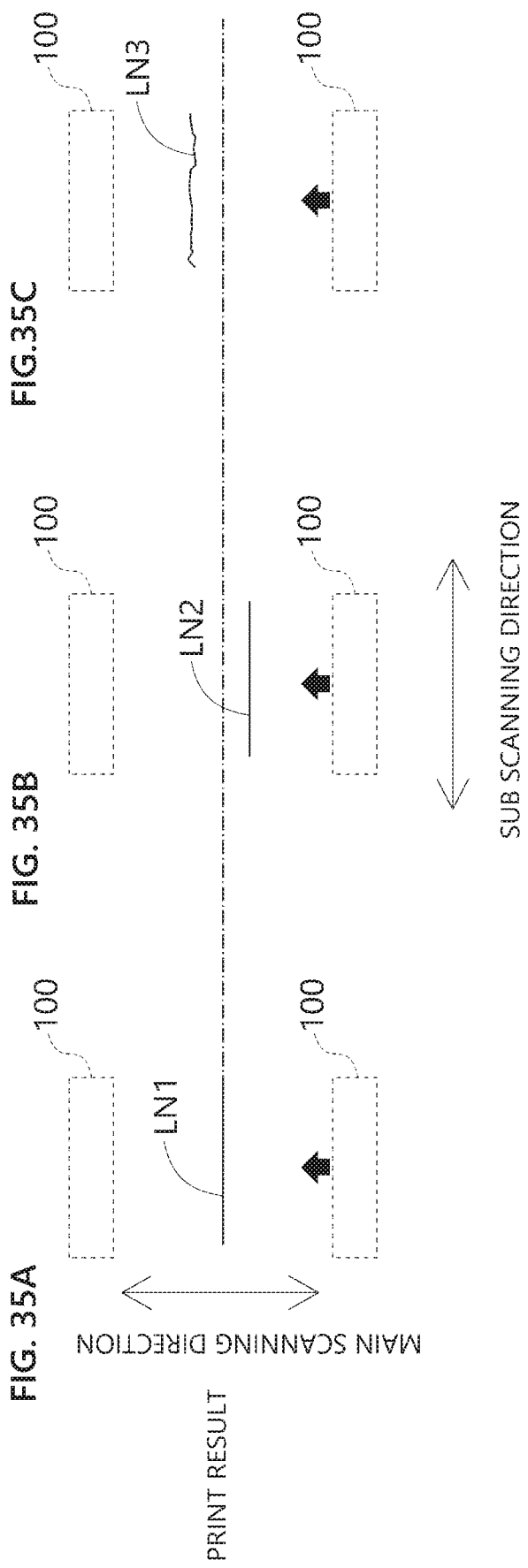

INK JET PRINTING APPARATUS

CROSS-REFERENCE TO RELATED APPLICATIONS

The present application claims priority under 35 U.S.C. § 119 to Japanese Patent Application No. 2018-63846, filed on Mar. 29, 2018 and Japanese Patent Application No. 2019-49753, filed on Mar. 18, 2019. The above applications are hereby expressly incorporated by reference, in its entirety, into the present application.

BACKGROUND OF INVENTION

1. Field of the Invention

The present invention is related to an ink jet printing apparatus having an ink jet head that ejects ink.

2. Description of the Related Art

Conventionally, ink jet printing apparatuses that perform printing by ejecting ink from an ink jet head to a print medium such as paper and film have been proposed. In addition, administering printing processes also onto building materials, decorative panels, etc. using such an ink jet printing apparatus has also been proposed.

Generally, printing media such as building materials and decorative panels are large in size, curved, have irregularities which are formed on the surfaces thereof, resulting in flatness not being uniform over the entire surfaces thereof. When administering a printing process on such a print medium, there is a possibility that the print medium will come into contact with an ink ejection surface, at which the tips of nozzles of the ink jet head are exposed, because the distance between the print medium and an ink jet head varies depending on the printing position of the print medium.

In the case that the print medium comes into contact with the ink ejection surface, an ink repellent film formed on the ink ejection surface may be damaged. In the case that the ink repellent film is damaged, it will become more likely for ink to adhere to the ink ejection surface. There is a possibility that such adhered ink will cause ejection failure of ink from the nozzles, resulting in a deterioration of print image quality.

Therefore, securing a certain distance between the ink jet head and the print medium such that the print medium does not come into contact the ink jet head may be considered.

SUMMARY OF THE INVENTION

However, if the position of the ink jet head is set to be fixed with the most protrusive position of the print medium as a standard in order to avoid contact, for example, landing precision will decrease in portions other than that position, and the image quality will deteriorate. That is, in the case that the position of the ink jet head is fixed with respect to variations in the position of the surface of the print medium, the landing precision of the ink will decrease and the image quality will deteriorate. This decrease in landing precision will be described below.

A case of an ink jet printing apparatus that moves a head unit having an ink jet head reciprocally in a main scanning direction to perform printing in a predetermined main scanning section, and moves the head unit in a sub scanning direction orthogonal to the main scanning direction to sequentially shift scanning sections to perform a printing process will be considered, for example.

In such an apparatus, ink is ejected from the head unit at a preset ejection timing while the head unit is moved in the main scanning direction as illustrated in FIG. 34A, and as a result, a single line LN1 is drawn on the surface S of the print medium in a predetermined scanning section, as illustrated in FIG. 35A. Note that FIGS. 35A through 35C are views of the head unit 100 and the result of printing as viewed from above.

However, when the head unit moves in the sub scanning direction and a printing process is administered in another scanning section, the position of the surface of the print medium will change. In the case that the distance between the head unit 100 and the surface S of the print medium becomes a distance D1 as illustrated in FIG. 34B, which is less than a distance D0 which is illustrated in FIG. 34A, if the printing process is administered with the position of the head unit 100 being fixed, ink will land on the surface S faster than presumed. As a result, a line LN2 will be drawn at a position which is shifted from a desired printing position, as illustrated in FIG. 35B.

Conversely, in the case that the distance between the head unit 100 and the surface S of the print medium becomes a distance D/2 as illustrated in FIG. 34C, which is greater than the distance D0 illustrated in FIG. 34A, if the printing process is administered with the position of the head unit 100 being fixed, ink will land on the surface S slower than presumed. As a result, a line LN3 will be drawn at a position which is shifted from a desired printing position, as illustrated in FIG. 35C. In addition, because the distance from the head unit 100 to the surface S of the print medium is longer, the speed of ink droplets which are ejected from the head unit 100 will decrease, and the ink droplets will not land at desired positions. As a result, the line LN3 will not be straight, as illustrated in FIG. 35C.

That is, as described above, in the case where the position of the ink jet head is fixed with reference to the most protrusive position of a print medium in order to avoid contact and the printing process is administered to the entire surface of the print medium, the landing precision decreases due to local positional variations.

Note that Japanese Unexamined Patent Publication No. 2005-335247 proposes to measure the distance between the head unit and the surface of the print medium at a plurality of positions, and then to adjust the height of the head unit.

However, in the method described in Japanese Unexamined Patent Publication No. 2005-335247 as well, after the height of the head unit is adjusted once, the printing process is administered on the entire surface of the print medium under such a condition, and therefore the aforementioned problem will still arise.

The present invention has been developed in view of the foregoing circumstances. It is an object of the present invention to provide an ink jet printing apparatus which is capable of avoiding contact of a print medium with an ink jet head and is also capable of obtaining a favorable printing quality.

Means for Solving the Problem

An ink jet printing apparatus of the present invention comprises an ink jet head for ejecting ink onto a print medium, a conveying mechanism that moves at least one of the print medium and the ink jet head in a predetermined conveyance direction, a height information detecting unit that obtains information related to the height of the surface of the print medium, a moving mechanism that moves at least one of the ink jet head and the print medium upward and downward in the vertical direction, and a control unit that controls the ink jet head while sequentially controlling the moving mechanism accompanying conveyance by the conveying mechanism, based on the information related to the height which is detected by the height information detecting unit, thereby maintaining the distance between the print medium and the ink jet head to be within a range which is set in advance, to perform a printing process on the print medium.

According to the ink jet printing apparatus of the present invention, information related to the height of the surface of the print medium is detected, and at least one of the ink jet head and the print medium is sequentially moved upward and downward in the vertical direction accompanying movement of at least one of the print medium and the ink jet head, based on the detected information related to the height. Thereby, the ink jet head is controlled to perform a printing process on the print medium while maintaining the distance between the print medium and the ink jet head to be within a range which is set in advance. As a result, contact of the print medium with the ink jet head can be avoided, and favorable print quality can be obtained.

BRIEF DESCRIPTION OF THE DRAWINGS

FIG. 7 is a flowchart that illustrates the flow of a series of steps of a printing operation in the ink jet printing apparatus according to the first embodiment.

FIG. 10 is a flowchart showing the flow of a series of steps of a method for detecting information related to the height of the surface of the print medium which is executed in the first embodiment.

FIG. 11 is a diagram for explaining a method for detecting information related to the height of an n-th pass scanning section while the shuttle unit moves from SD position=n−1 to SD position=n.

FIG. 17A is a diagram that illustrates a modified example of the height information detecting unit according to the first embodiment.

FIG. 17B is a diagram that illustrates a modified example of the height information detecting unit according to the first embodiment.

FIG. 19 is a cross-sectional view of the shuttle unit taken along line B B illustrated in FIG. 18.

FIG. 21 is a diagram for explaining a method for detecting information related to height in the second embodiment in detail.

FIG. 22 is a flowchart for explaining the processes which are executed by the control unit when executing the method for detecting information related to height in the second embodiment.

FIG. 29A is a diagram for explaining printing deviations that occur in a conventional ink jet printing apparatus.

FIG. 29B is a diagram for explaining printing deviations that occur in a conventional ink jet printing apparatus.

FIG. 30A is a collection of diagrams for explaining the advantageous effects of the ink jet printing apparatus according to the second embodiment.

FIG. 30B is a collection of diagrams for explaining the advantageous effects of the ink jet printing apparatus according to the second embodiment.

FIG. 31A is a collection of diagram for explaining the advantageous effects of narrowing the distance between the first optical sensor and the second optical sensor.

FIG. 31B is a collection of diagram for explaining the advantageous effects of narrowing the distance between the first optical sensor and the second optical sensor.

FIG. 35A is a diagram for explaining the problem of a conventional ink jet printing apparatus.

FIG. 35B is a diagram for explaining the problem of a conventional ink jet printing apparatus.

FIG. 35C is a diagram for explaining the problem of a conventional ink jet printing apparatus.

DETAILED DESCRIPTION OF THE EMBODIMENTS

Figure 1:
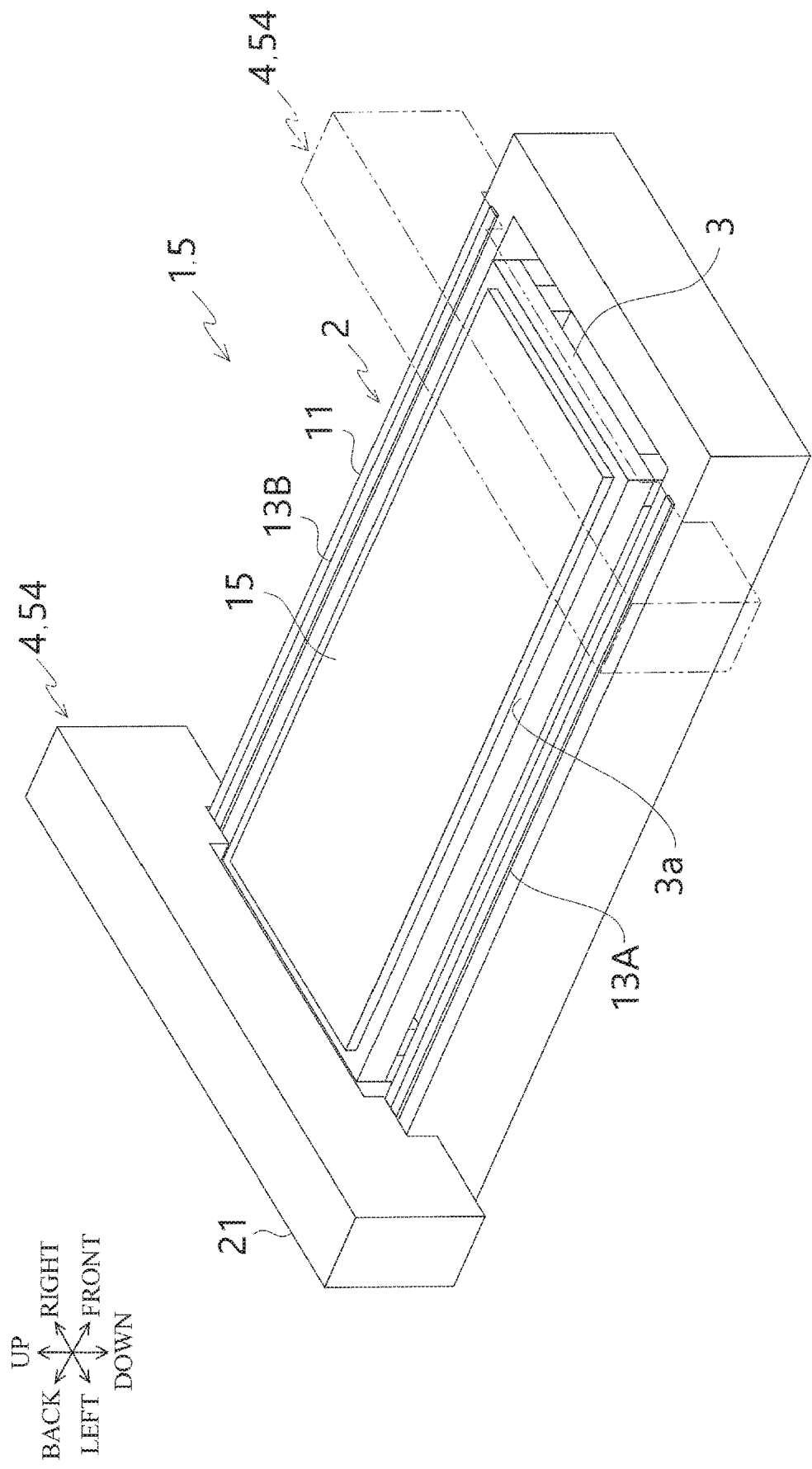
FIG. 1 is a perspective view that illustrates the schematic configuration of an ink jet printing apparatus according to a first embodiment of the present invention.

A first embodiment of an ink jet printing apparatus of the present invention will be described in detail below, with reference to the attached drawings. The ink jet printing apparatus of the present embodiment is characterized by a height position control process that controls the height of an ink jet head according to the height of the surface of a print medium. First, the configuration of the entirety of the ink jet printing apparatus will be described. FIG. 1 is a perspective view that illustrates the schematic configuration of an ink jet printing apparatus 1 according to the present embodiment. Note that in the descriptions of the embodiments to follow, the up, down, left, right, front, and back indicated by arrows in FIG. 1 are designated as the upward, downward, leftward, rightward, frontward, and backward directions of the ink jet printing apparatus 1. Further, the front-back direction corresponds to a conveyance direction of the present invention, and the left-right direction corresponds to a direction orthogonal to the conveyance direction of the present invention.

As illustrated in FIG. 1, the ink jet printing apparatus 1 of the present embodiment is equipped with a shuttle base unit 2, a flat bed unit 3, and a shuttle unit 4.

The shuttle base unit 2 supports the shuttle unit 4 and moves the shuttle unit 4 in the front-back direction (sub scanning direction). Specifically, the shuttle base unit 2 is equipped with a gantry section 11 and a sub scanning drive motor 12 (refer to FIG. 6).

The gantry section 11 is formed in the shape of a rectangular frame and supports the shuttle unit 4. Sub scanning drive guides 13A and 13B that extend in the front-back direction are respectively formed above the left and right sides of the frame of the gantry section 11. The sub scanning drive guides 13A and 13B guide the shuttle unit 4 so as to move in the front-back direction. The sub scanning drive motor 12 moves the shuttle unit 4 in the front-back direction. In the present embodiment, the sub scanning drive guides 13A and 13B and the sub scanning drive motor 12 correspond to the conveying mechanism of the present invention.

The flat bed unit 3 supports a print medium 15 such as a building material or a decorative panel. The flat bed unit 3 is arranged in a rectangular parallelepiped shaped recess formed inside the gantry section 11 of the shuttle base unit 2. The flat bed unit 3 has a medium mounting surface 3a, which is a horizontal surface on which the print medium 15 is placed. The flat bed unit 3 has an elevating mechanism constituted by a hydraulic drive mechanism (not shown) or the like, such that the height of the medium mounting surface 3a can be adjusted.

Figure 2:
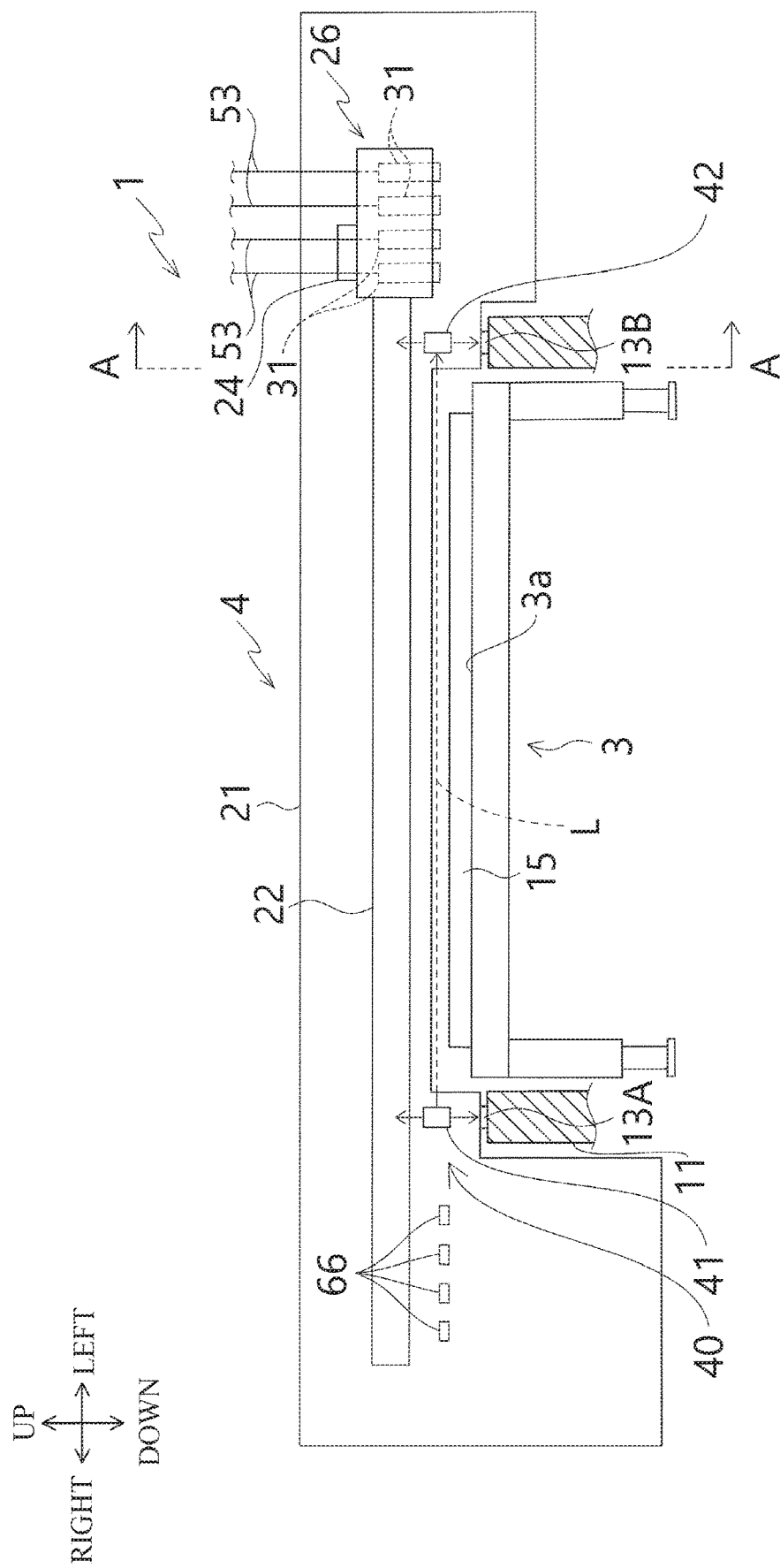
FIG. 2 is a diagram that illustrates the schematic configuration of a shuttle unit according to a first embodiment.

The shuttle unit 4 performs printing processes on the print medium 15. FIG. 2 is a diagram that illustrates the schematic configuration of the shuttle unit 4. As illustrated in FIG. 2, the shuttle unit 4 is equipped with a casing 21, a main scanning drive guide 22, a main scanning drive motor 23 (refer to FIG. 6), a head elevating guide 24, a head elevating motor 25 (refer to FIG. 6), a head unit 26, a capping unit 66, and a height information detecting unit 40.

The casing 21 accommodates components such as the head unit 26. The casing 21 is formed in a portal shape so as to straddle the flat bed unit 3 in the left-right direction. The casing 21 is supported by the gantry portion 11 of the shuttle base unit 2 and is configured to be movable along the sub scanning drive guides 13A and 13B.

The main scanning drive guide 22 guides the head unit 26 so as to move in the left-right direction (main scanning direction). The main scanning drive guide 22 is formed by an elongated member that extends in the left-right direction. The head unit 26 is moved in the left-right direction by the main scanning drive motor 23. In the present embodiment, the main scanning drive guide 22 and the main scanning drive motor 23 correspond to the scanning mechanism of the present invention.

The head elevating guide 24 guides the head unit 26 to move in the up-down direction. The head elevating guide 24 is formed by a member having a shape which is elongated in the up-down direction. The head elevating guide 24 is configured to be movable in the left-right direction along the main scanning drive guide 22 together with the head unit 26. The head unit 26 is moved up and down in the up-down direction by the head elevating motor 25. In the present embodiment, the head elevating guide 24 and the head elevating motor 25 correspond to the moving mechanism of the present invention.

The head unit 26 performs printing processes by ejecting ink onto the print medium 15 while moving in the left-right direction along the main scanning drive guide 22 in the manner described above. As illustrated in FIG. 2, the head unit 26 has four ink jet heads 31.

Figure 3:
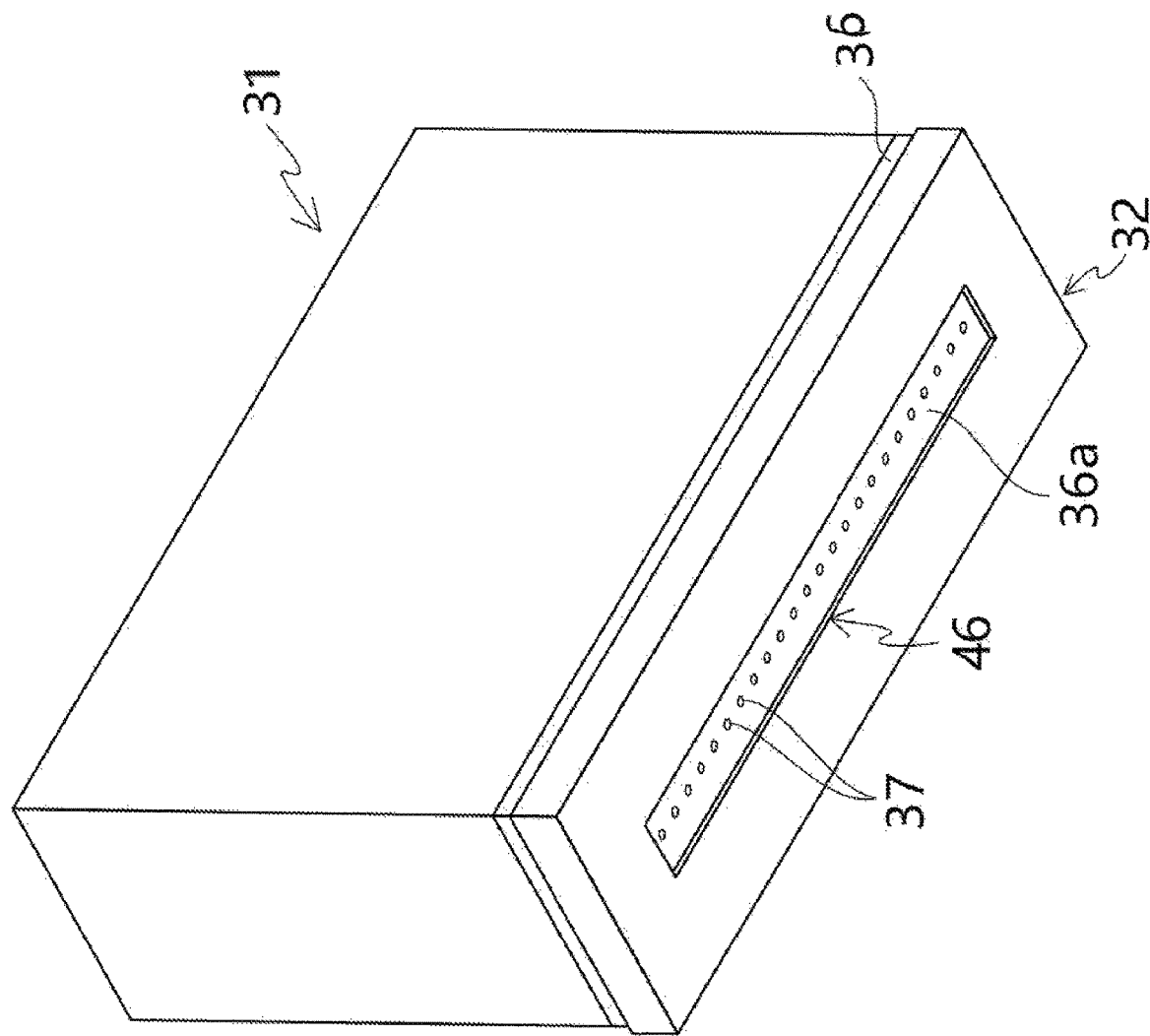
FIG. 3 is a perspective view that illustrates the exterior appearance of an ink jet head.

FIG. 3 is a perspective view that illustrates the outer appearance of an ink jet head 31. As illustrated in FIG. 3, the ink jet head 31 is equipped with a nozzle plate 36 and a nozzle guard 32. The nozzle plate 36 has a nozzle row in which a plurality of nozzles 37 that eject ink are arranged in the front-back direction.

The nozzle guard 32 protects an ink ejection surface 36a of the nozzle plate 36, and has an opening 46 at a portion that corresponds to the nozzle row of the nozzle plate 36, and is provided with respect to the ink ejection surface 36a of the nozzle row. The opening 46 of the nozzle guard 32 is formed in a rectangular shape which is elongated in the front-back direction such that all of the nozzles 37 are exposed.

The four ink jet heads 31 are arranged in parallel in the left-right direction. The four ink jet heads 31 eject inks of different colors (for example, cyan, black, magenta, and yellow).

One end of an ink supply pipe 53 is connected to each of the ink jet heads 31. An ink tank (not shown) that stores ink is connected to the other end of the ink supply pipe 53. Ink which is stored in the ink tank is supplied to the ink jet heads 31 via the ink supply pipe 53.

The capping unit 66 seals the opening 46 of the nozzle guard 32 in order to prevent the ink ejecting ports of the nozzles 37 from drying while the ink jet printing apparatus 1 is not performing a printing process and is in a standby state.

The capping unit 66 is installed within the right end portion of the casing 21 as illustrated in FIG. 2. When the head unit 26 moves to a standby position at the right end portion of the housing 21, the opening 46 of the nozzle guard 32 is sealed by the capping unit 66.

Figure 4:
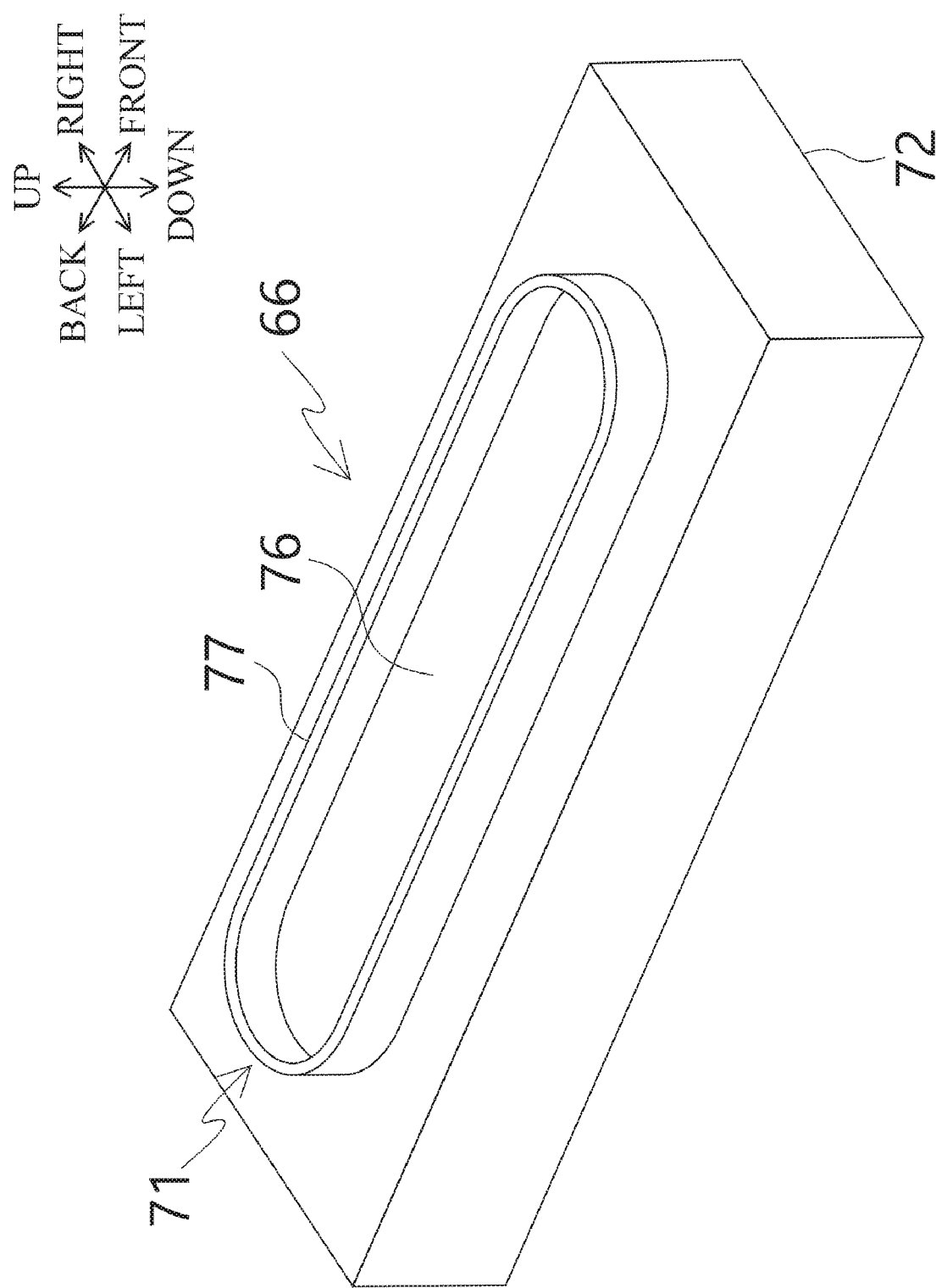
FIG. 4 is a diagram that illustrates the schematic configuration of a capping unit.

As illustrated in FIG. 4, the capping unit 66 is equipped with a cap 71 and a cap base 72. The cap 71 has an ellipsoid bottom portion 76 and a peripheral wall 77 erected from the peripheral edge of the bottom portion 76. The cap base 72 is a base on which the cap 71 is formed.

Figure 6:
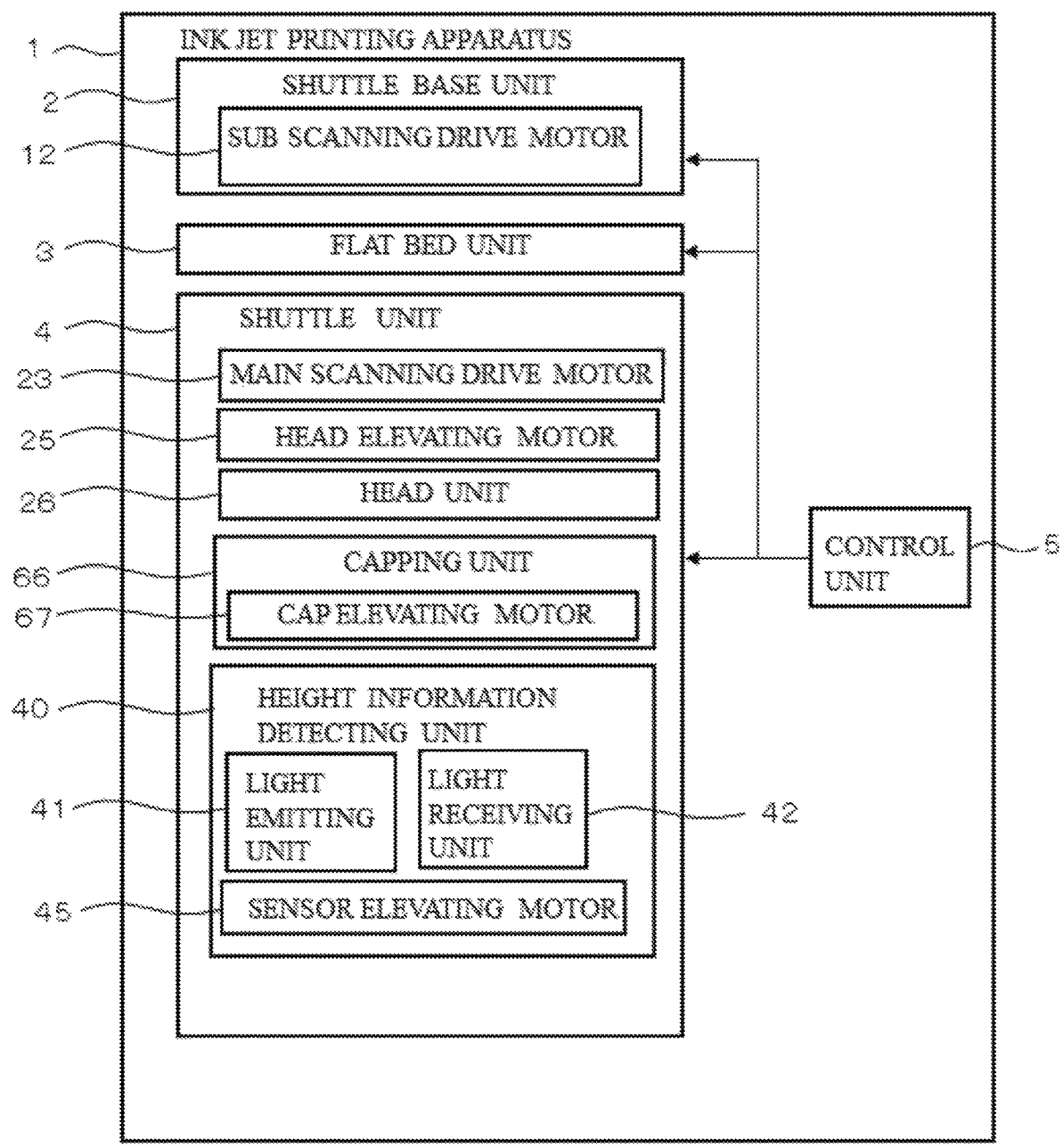
FIG. 6 is a block diagram that illustrates a control system of the ink jet printing apparatus illustrated in FIG. 1.

The capping unit 66 is moved vertically in the up-down direction by a cap elevating motor 67 (refer to FIG. 6). More specifically, the capping unit 66 moves vertically between a contact position at which the peripheral wall 77 of the cap 71 contacts the nozzle guard 32 and a retracted position below the contact position.

The height information detecting unit 40 detects information related to the height of the surface of the print medium 15 placed on the medium mounting surface 3a of the flat bed unit 3. In the present embodiment, the height of the surface of the print medium 15 means the distance between a reference surface and the surface (print surface) of the print medium 15 when the medium mounting surface 3a is designated as the reference surface (zero).

The height information detecting unit 40 of the present embodiment is equipped with a transmissive type optical sensor. As illustrated in FIG. 2, the height information detecting unit 40 is equipped with a light emitting unit 41 that emits sensor light L and a light receiving unit 42 for receiving the sensor light L which is output from the light emitting unit 41. As illustrated in FIG. 2, the light emitting unit 41 and the light receiving unit 42 are provided at the same height at the two outer sides of the print medium 15 in the left-right direction.

In addition, the height information detecting unit 40 includes a sensor elevating motor 45 (refer to FIG. 6) that moves the light emitting unit 41 and the light receiving unit 42 in the up-down direction (vertical direction). The height information detecting unit 40 detects information related to the height of the surface of the print medium 15 by repeatedly moving the light emitting unit 41 and the light receiving unit 42 in the up-down direction. The movement range of the light emitting unit 41 and the light receiving unit 42 in the vertical direction is set to be greater than or equal to a presumed thickness of the print medium 15.

In the present embodiment, information related to the height of the surface of the print medium 15 is detected by repeatedly moving the light emitting unit 41 and the light receiving unit 42 which are arranged on the two outer sides of the print medium 15 in the vertical direction as described above. Therefore, it is possible to detect information related to the height with conservation of space and at a low cost. In addition, because only whether the sensor light L is shielded by the print medium 15 is being detected, the number of pieces of data detected can be reduced and the capacity of a memory for storing the data can be reduced.

Figure 5:
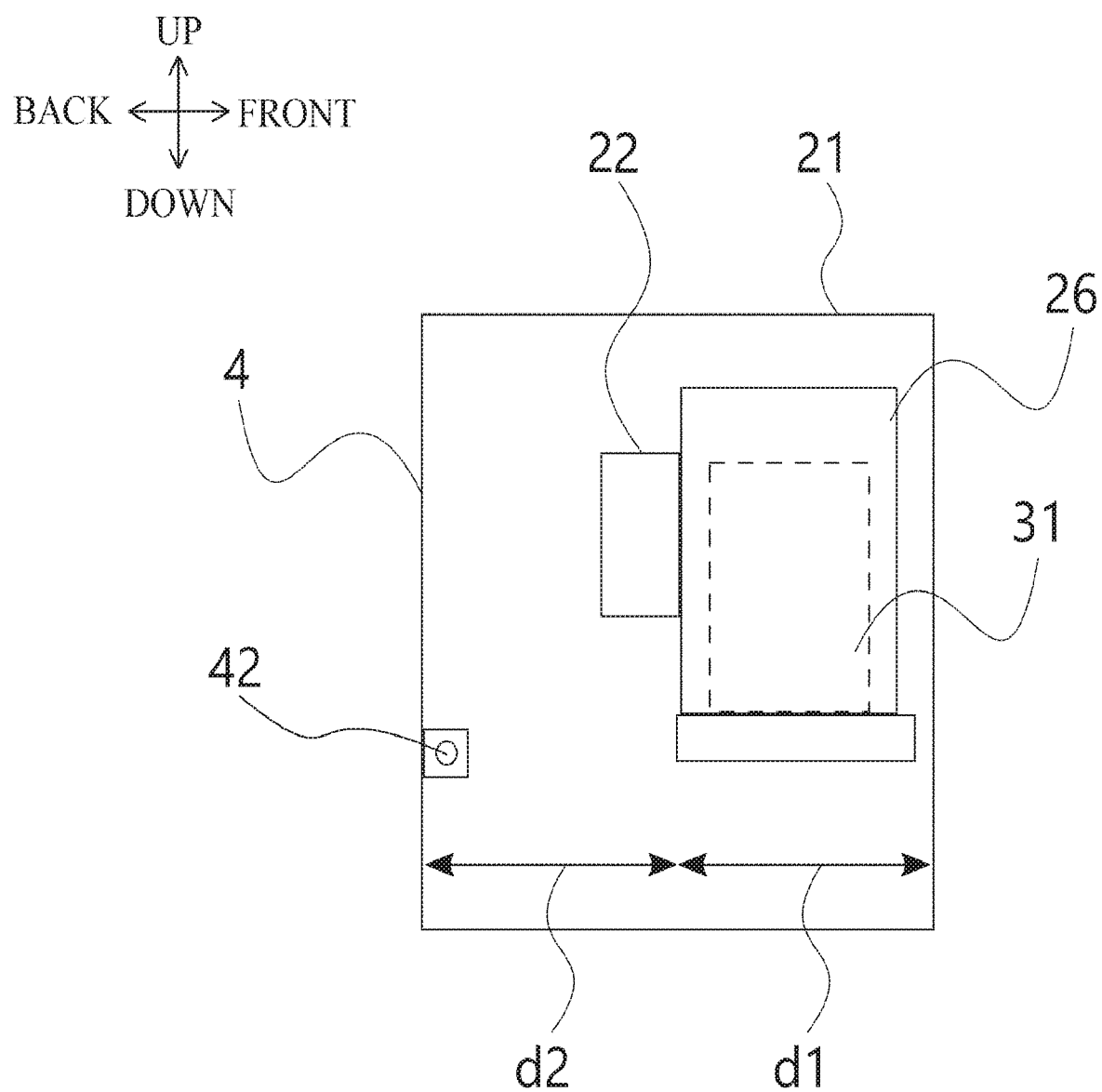
FIG. 5 is a sectional view of the shuttle unit taken along line A-A illustrated in FIG. 2.

FIG. 5 is a cross-sectional view of the shuttle unit 4 taken along the line A-A illustrated in FIG. 2. As illustrated in FIG. 5, the light emitting unit 41 and the light receiving unit 42 are provided behind the head unit 26. Specifically, the light emitting unit 41 and the light receiving unit 42 are provided at positions to the rear of the head unit 26 at a distance of d2. The distance d2 is set to be equal to the length d1 of one scanning section which is scanned by the head unit 26. One scanning section which is scanned by the head unit 26 is a range in which the printing process is performed while the head unit 26 moves in the left-right direction (main scanning direction) and performs a single scan.

In the present embodiment, the light emitting unit 41 and the light receiving unit 42 are provided at positions separated by one scanning section to the rear of the head unit 26 as described above. Therefore, while the shuttle unit 4 is moved backward by one scanning section, information related to the height information of one scanning section can be efficiently detected.

Note that a specific detection method for the height information by the height information detecting unit 40 will be described in detail later.

FIG. 6 is a block diagram that illustrates a control system of the ink jet printing apparatus 1 of the present embodiment. The ink jet printing apparatus 1 includes a control unit 5 that controls the entire apparatus. The control unit 5 includes a CPU (Central Processing Unit), a semiconductor memory, a hard disk, and the like. The control unit 5 executes a program which is stored in advance in a storage medium such as a semiconductor memory or a hard disk, and operates an electric circuit to control each of the units illustrated in FIG. 6.

Next, the printing operation of the ink jet printing apparatus 1 of the present embodiment will be described. FIG. 7 is a flowchart that illustrates the flow of a series of steps of the printing operation. FIGS. 8A through 8C, 9D, and 9E are diagrams for explaining the printing operation of the ink jet printing apparatus 1 of the present embodiment, and are all views of the head unit 26 as viewed from the left side. The horizontal axis (SD position) illustrated in FIGS. 8A through 8C, 9D, and 9E indicates the position of the head unit 26 in the sub scanning direction. As illustrated in FIGS. 8A through 8C, 9D, and 9E, the section from 0 to 1 on the horizontal axis indicates a scanning section for a first pass, the section from 1 to 2 indicates a scanning section for a second pass, and the section from 2 to 3 indicates a scanning section for a third pass, for example.

In the ink jet printing apparatus 1 of the present embodiment, as the shuttle unit 4 moves in the sub scanning direction (front-back direction), the height information detecting unit 40 sequentially detects information related to the height of the print medium 15. Then, by sequentially controlling the head elevating motor 25 based on the sequentially detected information related to the heights, the distance between the print medium 15 and the head unit 26 (ink jet head 31) is set to be within a range which is set in advance, while controlling the ink jet head 31 to perform a printing process on the print medium 15. Hereinafter, this printing process will be described in detail with reference to the flowchart of FIG. 7 and the explanatory views of FIGS. 8A through 8C, 9D, and 9E.

In the ink jet printing apparatus 1, the shuttle unit 4 is disposed at a standby position (HOME) in a standby state prior to the printing operation being initiated. The standby position of the shuttle unit 4 is the position of the shuttle unit 4 indicated by the solid line in FIG. 1, which is the rear end of the gantry section 11 of the shuttle base unit 2. In addition, FIG. 8A illustrates a state in which the shuttle unit 4 is disposed at the standby position (HOME).

Figure 8A:
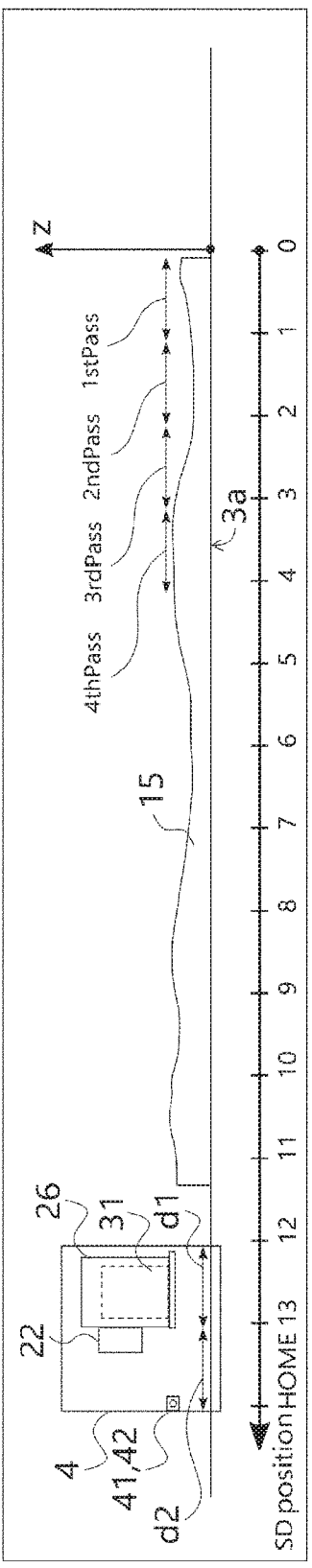
FIG. 8A is a diagram for explaining the printing operation in the ink jet printing apparatus according to the first embodiment.

Next, the height of the head unit 26 is set to a maximum settable height (S10) in a state in which the shuttle unit 4 is disposed at the standby position (HOME) as illustrated in FIG. 8A. The maximum height which is set at this time is a value larger than the maximum thickness of the print medium 15 which is presumed to be placed on the medium mounting surface 3a. The head unit 26 may be configured such that the maximum height thereof may be changeable manually.

Figure 8B:
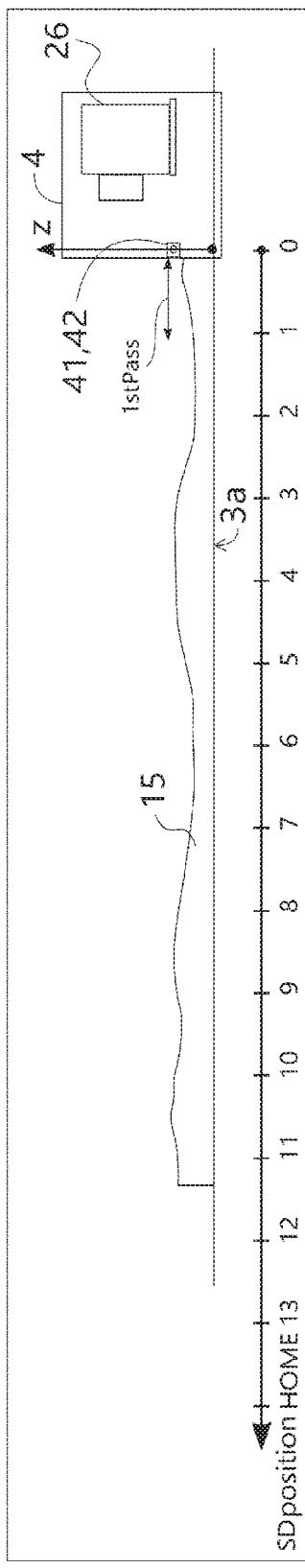
FIG. 8B is a diagram for explaining the printing operation in the ink jet printing apparatus according to the first embodiment.

Thereafter, when a print job is input after the print medium 15 is placed on the medium mounting surface 3a of the flat bed unit 3, the control unit 5 controls the sub scanning driving motor 12 to move the shuttle unit 4 from the standby position to a printing process start position (SD position=0) (S12). The printing process start position (SD position=0) of the shuttle unit 4 is the position of the shuttle unit indicated by the double dotted chain line in FIG. 1 and is at the front end portion of the gantry section 11 of the shuttle base unit 2. In addition, FIG. 8B illustrates a state in which the shuttle unit 4 is disposed at the printing process start position (SD position=0). As illustrated in FIG. 8B, when the shuttle unit 4 is disposed at the printing process start position (SD position=0), the light emitting unit 41 and the light receiving unit 42 of the height information detecting unit 40 are arranged at the position of SD position=0.

Figure 8C:
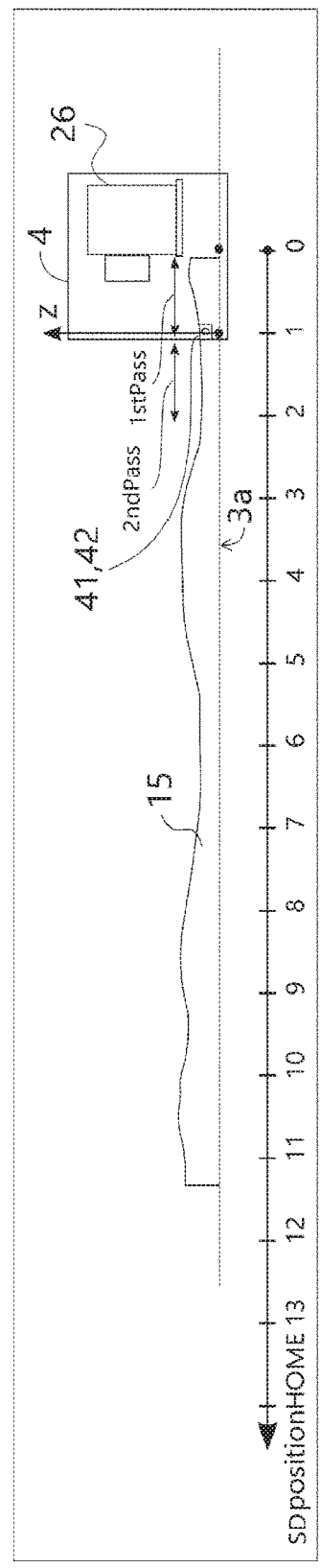
FIG. 8C is a diagram for explaining the printing operation in the ink jet printing apparatus according to the first embodiment.

Subsequently, the control unit 5 controls the sub scanning drive motor 12 to move the head unit 26 from SD position=0 to SD position=1. During this movement, information related to the height of the print medium 15 in the scanning section for the first pass (S14). Then, as illustrated in FIG. 8C, the maximum height of the scanning section for the first pass is derived in a state in which the head unit 26 (the light emitting unit 41 and the light receiving unit 42) is arranged at SD position=1 (S16). The detection of information related to height and the derivation of the maximum height will be described later in detail.

Next, the control unit 5 sets a pass number n to n=1 (S18). In the case that the next pass is not the final pass (S20: NO), the control unit 5 moves the head unit 26 from SD position=n to SD position=n+1. During this movement, information related to the height of the scanning section for the n+1st pass on the print medium 15 is detected (S22). Then, the maximum height of the scanning section for the n+1st pass is derived (S24) in a state in which the head unit 26 (the light emitting unit 41 and the light receiving unit 42) is arranged at the SD position=n+1.

Figure 9D:
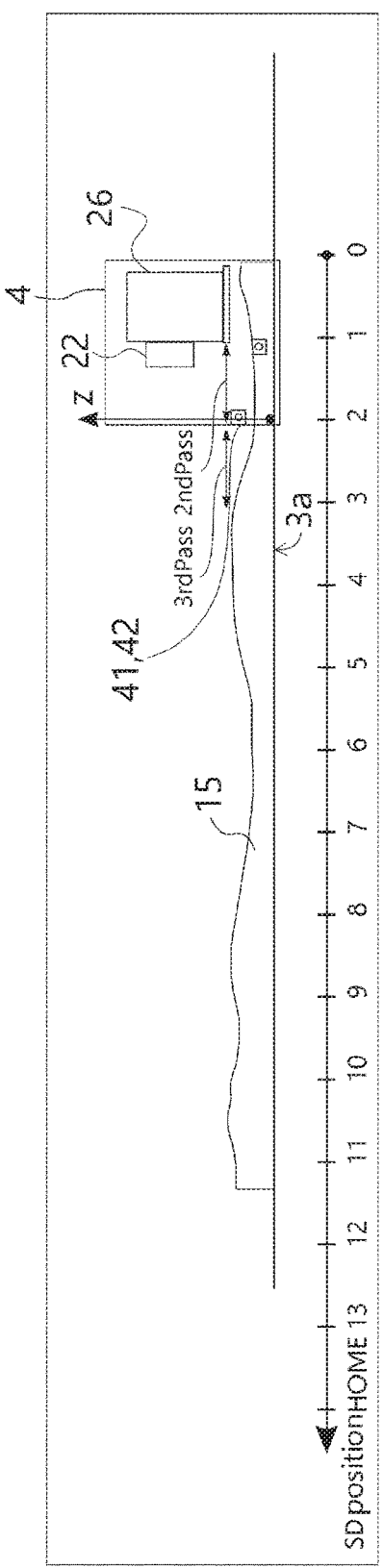
FIG. 9D is a diagram for explaining the printing operation in the ink jet printing apparatus according to the first embodiment.

Specifically, after detection of the maximum height of the above-described scanning section of the first pass, if the second pass is not the final pass, the head unit 26 is moved from SD position=1 to SD position=2. During this movement, the information related to the height of the scanning section for the second pass on the print medium 15 is detected. Then, the maximum height of the scanning section for the second pass is derived in a state in which the head unit 26 (the light emitting unit 41 and the light receiving unit 42) is arranged at the SD position=2, as illustrated in FIG. 9D.

After deriving the maximum height of the scanning section for the n+1st pass (here, the second pass), the control unit 5 controls the head elevating motor 25 based on the maximum height of the scanning section for the nth pass (here, the first pass) which is derived in S16, to set the height of the head unit 26 (S26). Specifically, the height of the head unit 26 is set such that the lower surface of the ink jet head 31 is positioned within a range of from 2 mm to 3 mm above the maximum height of the nth pass as a reference (0).

Next, the control unit 5 controls the main scanning drive motor 23 and controls the ink jet head 31 while moving the head unit 26 in the main scanning direction, to perform a printing process in the scanning section of the nth pass (here, the first pass) (S28).

Note that in the present embodiment, the ink ejection timing from the ink jet head 31 is a fixed timing which is set in advance, and is set to be the same timing in all of the scanning sections.

In addition, in the present embodiment, when the height of the head unit 26 is set, the maximum height of the scanning section is employed. Therefore, small positional variations of the surface of the print medium 15 within the scanning section are not taken into consideration. However, it is assumed that that the scanning section is a sufficiently small range with respect to positional variations of the surface of the print medium 15, and the positional variations therein will not affect the landing precision of the ink within the scanning section. Although controlling the ink ejection timing for each nozzle of the ink jet head 31 according to the positional variations of the surface of the print medium 15 within the scanning section may be considered, such control will become complicated. In addition, it is inefficient to perform such control with respect to the print medium 15, which has little variation within the scanning section. Therefore, the present embodiment does not adopt a configuration that performs such control.

After a printing process of an nth pass (here, the first pass) performed, the control unit 5 compares the maximum height of the scanning section of the n+1st pass (here, the second pass) with the maximum height of the nth pass (S30). In the case that the maximum height of the scanning section of the n+1st pass is less than or equal to the maximum height of the scanning section of the nth pass, the process proceeds to step S34.

In step S34, the control unit 5 sets the pass number n to n=n+1 (here, "2"). In the case that the next pass is not the final pass (S20: NO), the control unit 5 moves the head unit 26 from SD position=n (here, "2") to SD position=n+1 (here, "3"). During this movement, information related to the height of the scanning section of the n+1st pass (here, the third pass) is detected (S22). Then, the maximum height of the scanning section of the n+1st pass (here, the third pass) is derived in a state where the head unit 26 (the light emitting unit 41 and the light receiving unit 42) is arranged at SD position=n+1 (here, "3") (S24).

Figure 9E:
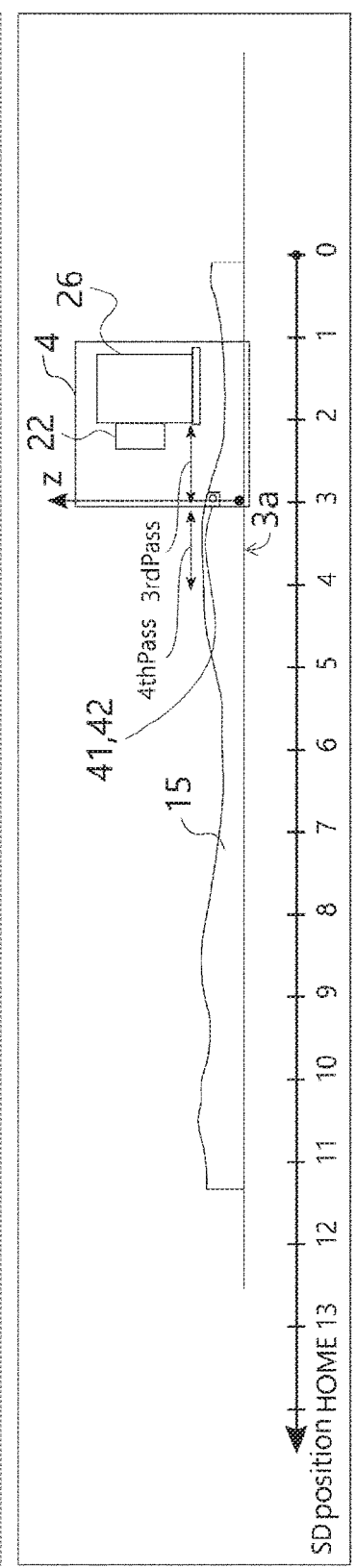
FIG. 9E is a diagram for explaining the printing operation in the ink jet printing apparatus according to the first embodiment.

Specifically, the maximum height of the scanning section for the third pass is derived in a state in which the head unit 26 (the light emitting unit 41 and the light receiving unit 42) is arranged at SD position=3, as illustrated in FIG. 9E.

Then, after the maximum height of the scanning section for the n+1st pass (here, the third pass) is derived, the control unit 5 controls the head elevating motor 25 based on the maximum height of the scanning section based on the maximum height of the scanning section for the nth pass (here, the second pass), to set the height of the head unit 26 (S26). Specifically, the height of the head unit 26 is set such that the lower surface of the ink jet head 31 is positioned within a range from 2 mm to 3 mm above the maximum height of the n-th pass as a reference (0). Here, because the maximum height of the scanning section for the n+1st pass (here, the second pass) is less than or equal to the maximum height of the scanning section of the nth pass (here, the first pass), the head unit 26 moves in the vertical direction, or the height thereof is maintained as is.

Next, the control unit 5 controls the main scanning drive motor 23 to control the ink jet head 31 while moving the head unit 26 in the main scanning direction to perform a printing process in the scanning section for the nth pass (here, the second pass) (S28).

On the other hand, in the case that the maximum height of the scanning section of the n+1st pass (here, the second pass) is greater than the maximum height of the scanning section of the nth pass (here, the first pass) in step S30 (S30: YES), the head elevating motor 25 is controlled based on the maximum height of the scanning section of the n+1st pass (here, the second pass) to set the height of the head unit 26 (S32). More specifically, the height of the head unit 26 is set such that the lower surface of the ink jet head 31 is positioned within a range from 2 mm to 3 mm above the maximum height of the n+1st pass as a reference (0). Here, because the maximum height of the scanning section of the n+1st pass (here, the second pass) is greater than the maximum height of the scanning section of the nth pass (here, the first pass), the head unit 26 moves upward in the vertical direction before the shuttle unit 4 is moved.

In step S34, the control unit 5 sets the pass number n to n=n+1 (here, "2"). In the case that the next pass is not the final pass (S20: NO), the control unit 5 moves the head unit 26 from SD position=n (here, "2") to SD position=n+1 (here, "3"). During this movement, information related to the height of the scanning section for the n+1st pass (here, a third pass) is detected (S22). Then, the maximum height of the scanning section of the n+1st pass is derived (S24) in a state where the head unit 26 (the light emitting unit 41 and the light receiving unit 42) is arranged at the SD position=n+1 (here, "3").

Specifically, the maximum height of the scanning section for the third pass is derived in a state in which the head unit 26 (the light emitting unit 41 and the light receiving unit 42) is arranged at the SD position=3, as illustrated in FIG. 9E.

Next, after deriving the maximum height of the scanning section of the n+1st pass (here, the third pass), the control unit 5 controls the head elevating motor 25 based on the maximum height of the scanning section for the nth pass (here, the second pass) which is derived in S16, to set the height of the head unit 26 (S26). Specifically, the height of the head unit 26 is set such that the lower surface of the ink jet head 31 is positioned within a range of from 2 mm to 3 mm above the maximum height of the nth pass as a reference (0).

Next, the control unit 5 controls the main scanning drive motor 23 and controls the ink jet head 31 while moving the head unit 26 in the main scanning direction to perform printing process in the scanning section of the nth pass (here, the second pass) (S28).

After the printing process of the nth pass (here, the second pass) is performed, the control unit 5 compares the maximum height of the scanning section for the n+1st pass (here, the third pass) with the maximum height of the scanning section for the nth pass (here, the second pass) (S30). In the case that the maximum height of the scanning section for the n+1st pass (here, the third pass) is greater than the maximum height of the scanning section for the nth pass (here, the second pass), the head elevating motor 25 is controlled based on the maximum height of the scanning section for the n+1st pass (here, the third pass) to set the height of the head unit 26 (S32). Then, the process proceeds to step S34.

On the other hand, if the maximum height of the scanning section of the n+1st pass (here, the third pass) is less than or equal to the maximum height of the scanning section of the nth pass (here, the second pass), the process proceeds directly to step S34.

Next, in step S34, the control unit 5 again sets the pass number n to n=n+1 (here, "3"). Then, as long as the next pass is not the final pass (S20: NO), the processes from steps S22 through S34 are repeated.

On the other hand, if it is determined that the next pass is the final pass in step S20 (S20, YES), the head unit 26 is moved from SD position=n to SD position=n+1 (S36). Then, the control unit 5 controls the head elevating motor 25 based on the maximum height of the scanning section for the nth pass to set the height of the head unit 26 (S38). Next, the control unit 5 controls the main scanning drive motor 23 and controls the ink jet head 31 while moving the head unit 26 in the main scanning direction to perform a printing process of the scanning section for the nth pass (S40).

After the printing process for the nth pass is performed, the control unit 5 sets the height of the head unit 26 to a maximum settable height (S42). Then, the control unit 5 controls the sub scanning drive motor 12 to move the shuttle unit 4 from the position of SD position=n+1 to the standby position (HOME) (S44). Thereby, the printing operation is completed.

In the present embodiment, information related to the height of the surface of the print medium 15 is sequentially detected accompanying the movement of the shuttle unit 4 (ink jet head 31) in the sub scanning direction, as described above. Therefore, it is possible to detect the information related to the height among the printing processes of the scanning sections, and it is possible to more efficiently detect the information related to the height.

Figure 12:
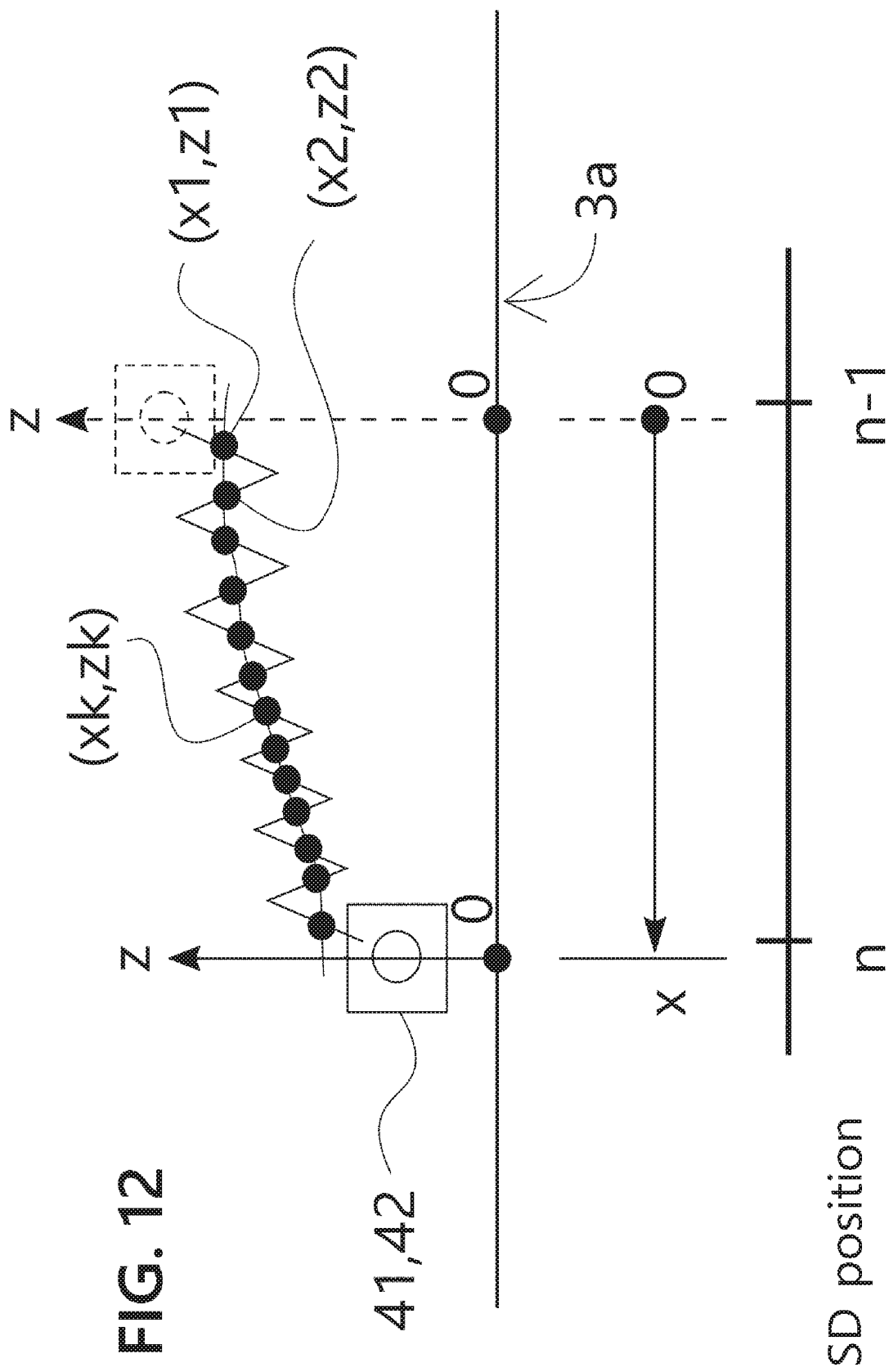
FIG. 12 is a diagram for explaining a method for detecting information related to the height of the n-th pass scanning section while the shuttle unit moves from SD position=n−1 to SD position=n.

Next, a method for detecting information related to the height of the surface of the print medium 15 by the height information detecting unit 40 of the present embodiment will be described in detail. FIG. 10 is a flowchart hat illustrates the flow of a series of steps of a method for detecting information related to height, and FIGS. 11 and 12 are diagrams for explaining the method for obtaining information related to height as the light emitting unit 41 and the light receiving unit 42 of the shuttle unit 4 moves from SD position=n−1 to SD position=n. Hereinafter, a description will be given with reference to the flowchart illustrated in FIG. 10 and the explanatory diagrams illustrated in FIGS. 11 and 12.

First, when initiating movement of the shuttle unit 4 in the sub scanning direction from the position of SD position=n−1 (S50: YES), the control unit 5 confirms whether the sensor status of the height information detecting unit 40 is "1". Here, that the sensor status is "1" refers to a state in which the sensor light L which is output from the light emitting unit 41 is reaching the light receiving unit 42. That the sensor status is "0" refers to a state in which the sensor light L which is output from the light emitting unit 41 is not reaching the light receiving unit 42.

In the case that the sensor status of the height information detecting unit 40 is "1" (S52: YES), the control unit 5 moves the light emitting unit 41 and the light receiving unit 42 downward along with initiation of movement of the shuttle unit 4 (S54). In FIG. 12, solid lines indicate movement trajectories of the light emitting unit 41 and the light receiving unit 42 when the shuttle unit 4 is moved from SD position=n−1 to SD position=n as illustrated in FIG. 11.

In the case that the sensor status changes from "1" to "0" (S56: YES), the control unit 5 exerts control to stop the movement of the light emitting unit 41 and the light receiving unit 42, and stores the SD position (x1) and the height (z1) of the light emitting unit 41 and the light emitting unit 41 at this time in a storage medium such as a semiconductor memory (S58). In FIG. 12, the SD position and the height (x1, z1) of the light emitting unit 41 and the light receiving unit 42 which are stored at this time are indicated by circular marks.

Next, if the movement of the shuttle unit 4 in the nth scanning section is not completed yet (S60: NO), the control unit 5 continues to move the shuttle unit 4 in the sub scanning direction, and moves the light emitting unit 41 and the light receiving unit 42 upward (S62). In FIG. 12, the movement trajectories of the light emitting unit 41 and the light receiving unit 42 change from downward to upward.

Then, in the case that the sensor status changes from "0" to "1" (S64: YES), the control unit 5 exerts control to stop the movement of the light emitting unit 41 and the light receiving unit 42, and stores the SD position (x2) and the height (z2) of the light emitting unit 41 and the light emitting unit 41 at this time in a storage medium such as a semiconductor memory (S66). In FIG. 12, the SD position and the height (x2, z2) of the light emitting unit 41 and the light receiving unit 42 which are stored at this time are indicated by circular marks.

Subsequently, in the case that the movement of the shuttle unit 4 in the scanning section for the nth pass is not completed yet (S68: NO), the control unit 5 continues to move the shuttle unit 4 in the sub scanning direction, and moves the light emitting unit 41 and the light receiving unit 42 downward (S54). In the case that the sensor status changes from "1" to "0" again (S56: YES), the control unit 5 exerts control to stop the movement of the light emitting unit 41 and the light receiving unit 42, and stores the SD position and the height of the light emitting unit 41 and the light receiving unit 42 in a storage medium such as a semiconductor memory (S58).

Then, the control unit 5 repeats the processes of steps S54 through S68 until the movement in the scanning section for the nth pass of the shuttle unit 4 is completed. Every time the sensor status is reversed, the control unit 5 stores the SD position and the height (xk, zk) of the light emitting unit 41 and the light receiving unit 42 at that time in a storage medium such as a semiconductor memory. Then, at a point in time at which the movement of the scanning section for the nth pass of the shuttle unit 4 is completed (S60: YES or S68: YES), the detection of the information related to the height of the scanning section for the nth pass is completed.

Information related to the height of the surface of the print medium 15 in the scanning section for SD position n−1 to SD position n is detected in the manner above, and detection results as shown in Table 1 below are obtained.

TABLE 1

| x (mm) | x1 | x2 | ... | xk | ... |
|---|---|---|---|---|---|
| z (mm) | z1 | z2 | ... | zk | ... |

Figure 13:
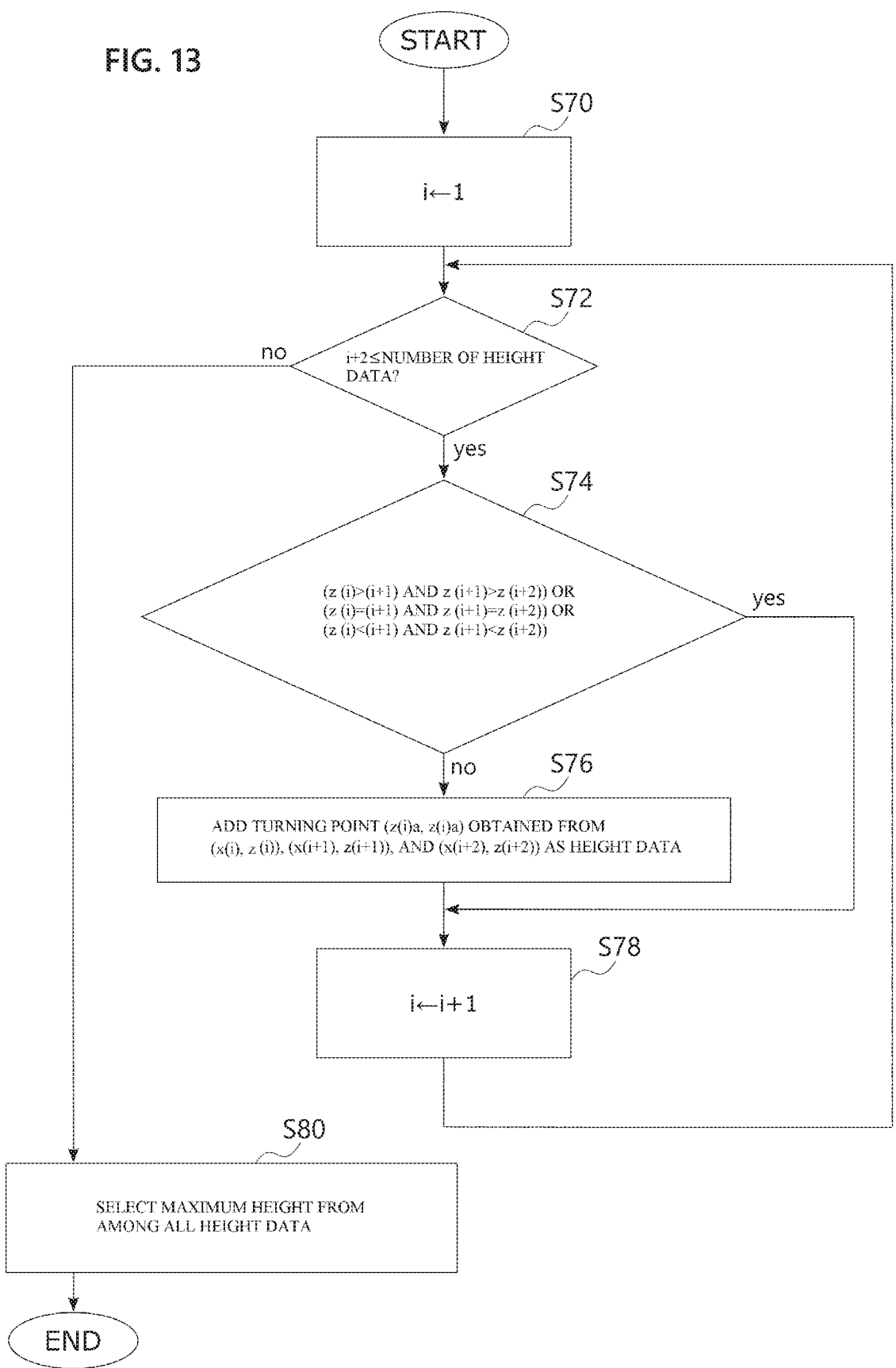
FIG. 13 is a flowchart that shows the flow of a series of steps of a method for deriving a maximum height in the first embodiment.

Next, a method for deriving the maximum height in one scanning section based on the information on the plurality of heights which are detected by the height information detecting unit 40 as described above will be described in detail. FIG. 13 is a flowchart showing the flow of a series of steps of the method for deriving the maximum height. The method for deriving the maximum height will be described below with reference to the flowchart illustrated in FIG. 13.

First, the control unit 5 sets a detection point number i to "1" (S70). Next, the number of pieces of data of information related to height (the number of detection points) is compared with i+2 (S72). If the number of pieces of data of information related to the height is greater than or equal to i+2, whether the following conditional formulae (1) through (3) are satisfied is determined (S74). Note that the conditional formula of (1) means that the values of the information related to the heights of three consecutive detection points are decreasing monotonically. In addition, the conditional formula of (2) means that the values of the information related to the heights of three consecutive detection points are unchanged. The conditional formula of (3) means that the values of information related to the heights of three consecutive detection points are increasing monotonically.

$$z(i) > z(i+1) \text{ and } z(i+1) > z(i+2) \tag{1}$$

$$z(i) = z(i+1) \text{ and } z(i+1) = z(i+2) \tag{2}$$

$$z(i) < z(i+1) \text{ and } z(i+1) < z(i+2) \tag{3}$$

In the case that any of conditional formulae (1) through (3) is satisfied (S74: YES), the control unit 5 sets the detection point number i to i+1 (S78). Then, the number of pieces of data of the information related to the height (the number of detection points) is compared with i+2. In the case that the number of pieces of data of information related to the height is greater than or equal to i+2, whether conditional formulae (1) through (3) are satisfied is determined (S74).

On the other hand, in the case that it is determined that none of the above conditional formulae (1) through (3) is satisfied at S74 (S74: NO), that is, when three consecutive points are not increasing monotonously, decreasing monotonously, or remaining unchanged, the control unit 5 employs the values of (x (i), z (i)), (x (i+1), z (i+1) and (x (i+2), z (i+2)) to obtain the values (x (i)a, z(i)a) of a turning point, and adds these values as information related to height (S76).

Then, the detection point number i is set to i+1 (S78), and the search for the turning point is continued, by comparing the number of pieces of data of the information related to height (the number of detection points) and i+2 again (S72).

Then, in the case that the value of i+2 becomes greater than the number of pieces of data of the information related to height (the number of detection points) as a result of comparing the number of pieces of data of the information related to height (the number of detection points) and i+2 (S72: NO), the search for the turning point is completed, and a maximum height is selected from among all of the pieces of information related to height (S80).

Figure 14:
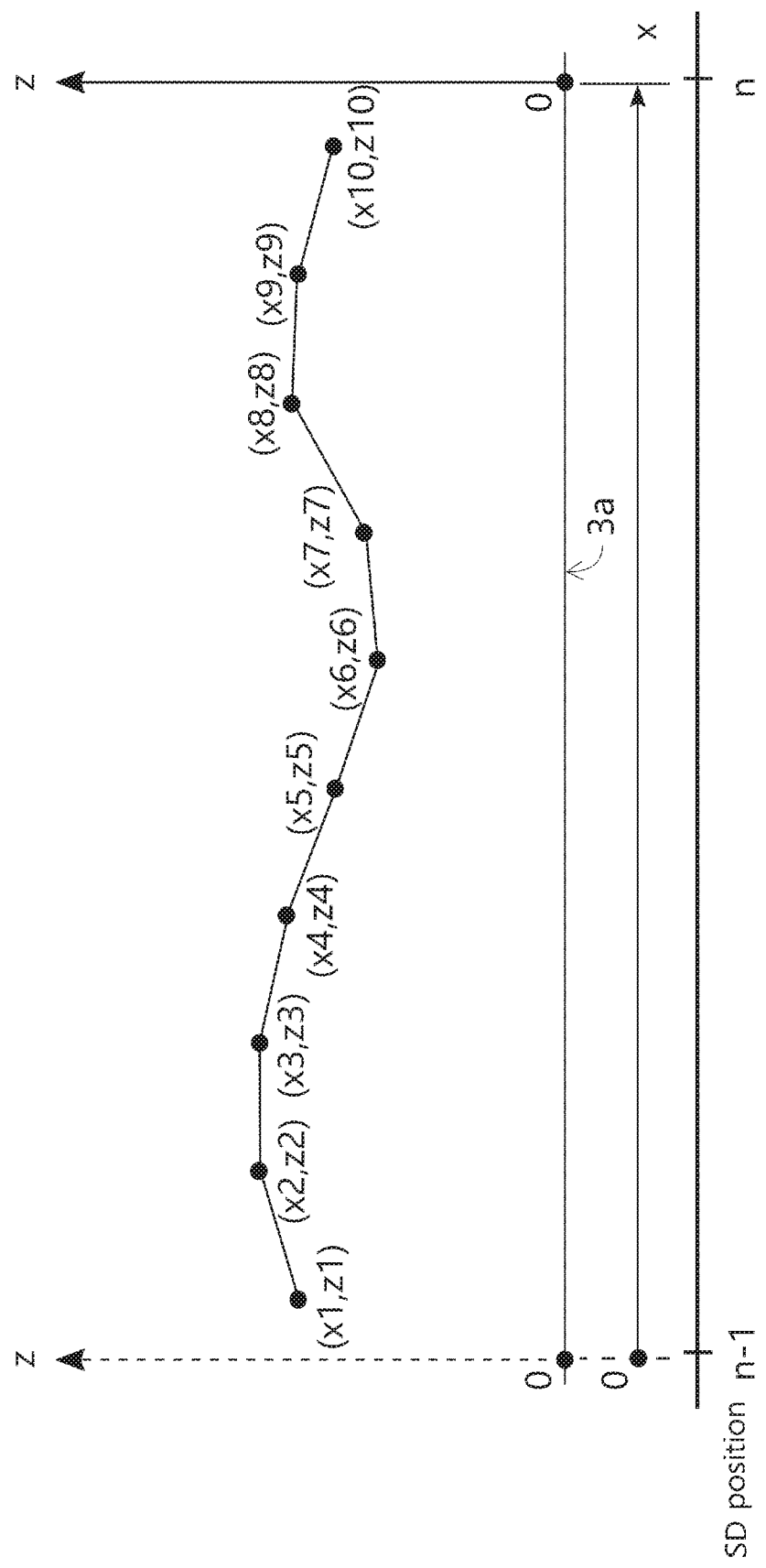
FIG. 14 is a diagram that illustrates an example of information related to the height of the surface of a print medium.

Here, a method for deriving a maximum height in the case that 10 pieces of information related to height are detected during an nth pass while the shuttle unit 4 moves from SD position=n−1 to SD position=n, as illustrated in FIG. 14 will be described as a specific example.

If a case in which the position in the sub scanning direction advances from x (i) to x (i+1) and the information related to the height increases is represented as "↑", a case in which the information related to the height decreases is represented as "↓", and a case in which the information related to the height remains unchanged is represented as "→", such cases can be expressed as shown in Table 2 below.

TABLE 2

| | x Position | | | | | | | | |
|---|---|---|---|---|---|---|---|---|---|
| | x1 to x2 | x2 to x3 | x3 to x4 | x4 to x5 | x5 to x6 | x6 to x7 | x7 to x8 | x8 to x9 | x9 to x10 |
| Change in Height | ↑ | → | ↓ | ↓ | ↓ | ↑ | ↑ | ↓ | ↓ |

Then, when it is determined whether the information related to the heights of three consecutive detection points satisfies conditional formulae (1) through (3) as described above, it can be understood that the aforementioned turning points are present in each of (x (1), x (2), x (3)), (x (2), x (3), x (4)), (x (5), x (6), x (7)), and (x (7), x (8), x(9)). For example, the value of the turning point in (x (1), x (2), x (3)) is calculated as follows.

First, substitute (x1, z1), (x2, z2), (x3, z3) into a general quadratic curve equation $z = ax^2 + bx + c$, to obtain the following three equations having a, b, and c as variables.

$$z1 = ax1^2 + bx1 + c$$

$$z2 = ax2^2 + bx2 + c$$

$$z3 = ax3^2 + bx3 + c$$

Then, a, b, and c can be obtained as solutions of this system of three equations. The x value of the turning point is obtained by solving $z' = 2ax + b = 0$, which is differentiated from the approximate quadratic curve formula $z = ax^2 + bx + c$, with respect to x, and the z value of the turning point can be obtained by substituting the x value into $z = ax^2 + bx + c$.

The values for the turning points which are present in (x (2), x (3), x (4)), (x (5), x (6), x (7)) and (x (7), x (8), x (9)) are obtained in the same manner.

Then, a point having the largest z value among the points (x1, z1) through (x10, z10) detected by the height information detecting unit 40 including the turning points is selected as the maximum height.

Figure 15:
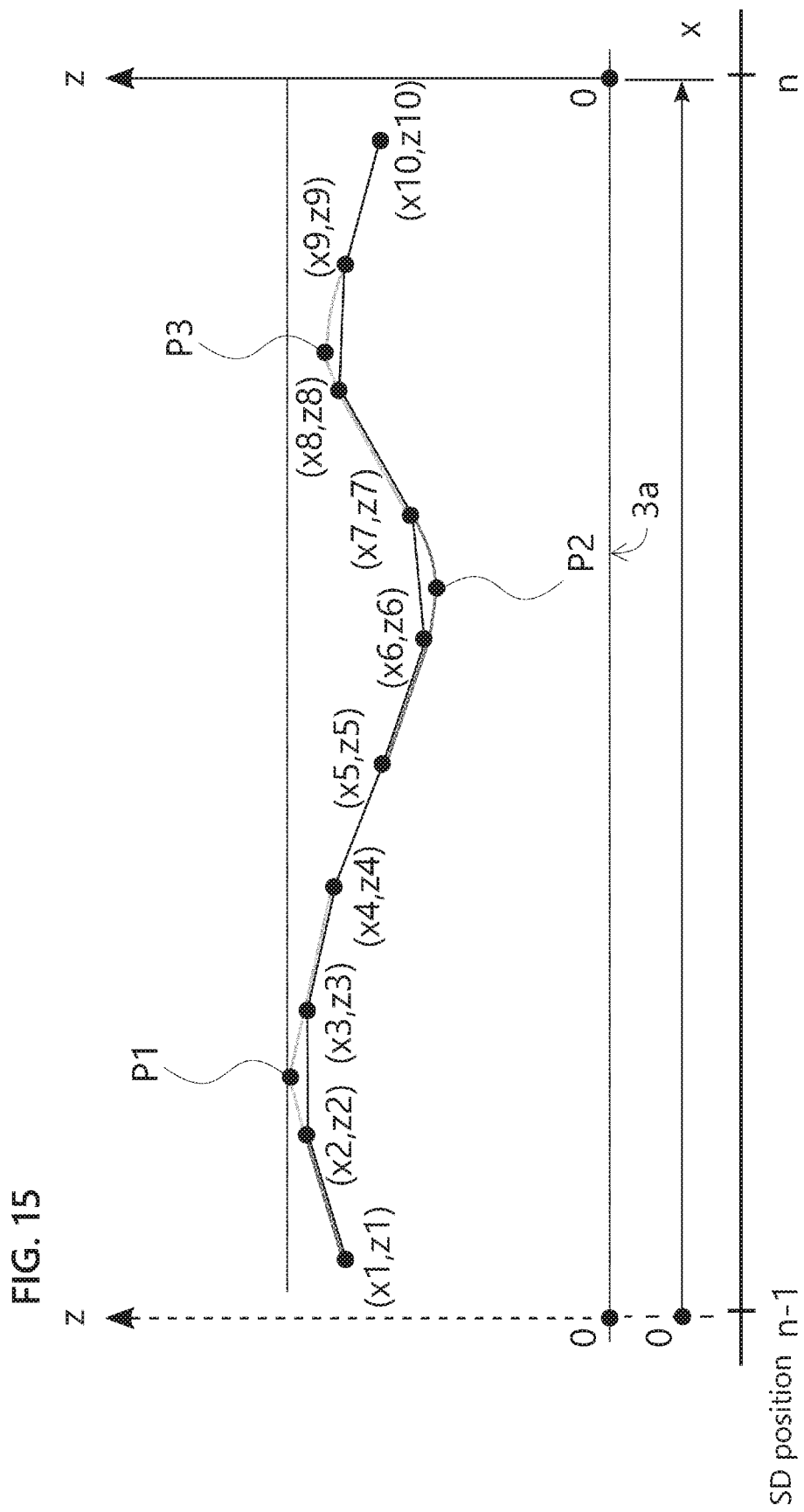
FIG. 15 is a diagram that illustrates turning points P1, P2, and P3 obtained based on information related to the height of the 10 points illustrated in FIG. 14

FIG. 15 is a diagram that illustrates turning points P1, P2, and P3 which are obtained based on the information related to the heights of 10 points illustrated in FIG. 14. The value of the turning point P1 illustrated in FIG. 15 is selected as the maximum height.

In the specific example described above, the turning point between x2 and x3 is calculated from both (x1, x2, x3) and (x2, x3, x4) because z2=z3. However, this turning point may be treated as a separate point in the same manner as the other turning points. There is no particular problem in obtaining the point with the largest z value from among a plurality of turning points and (x1, z1) through (x10, z10) as the maximum height.

The above is the description of the method for deriving the maximum height.

Note that in the first embodiment, when deriving the maximum height based on information related to a plurality of heights, a turning point of a concave graph is also calculated by an interpolation calculation. However, a configuration may be adopted, in which the interpolation calculation is not performed, because it is not possible for the concave graph to be the maximum height.

Figure 16:
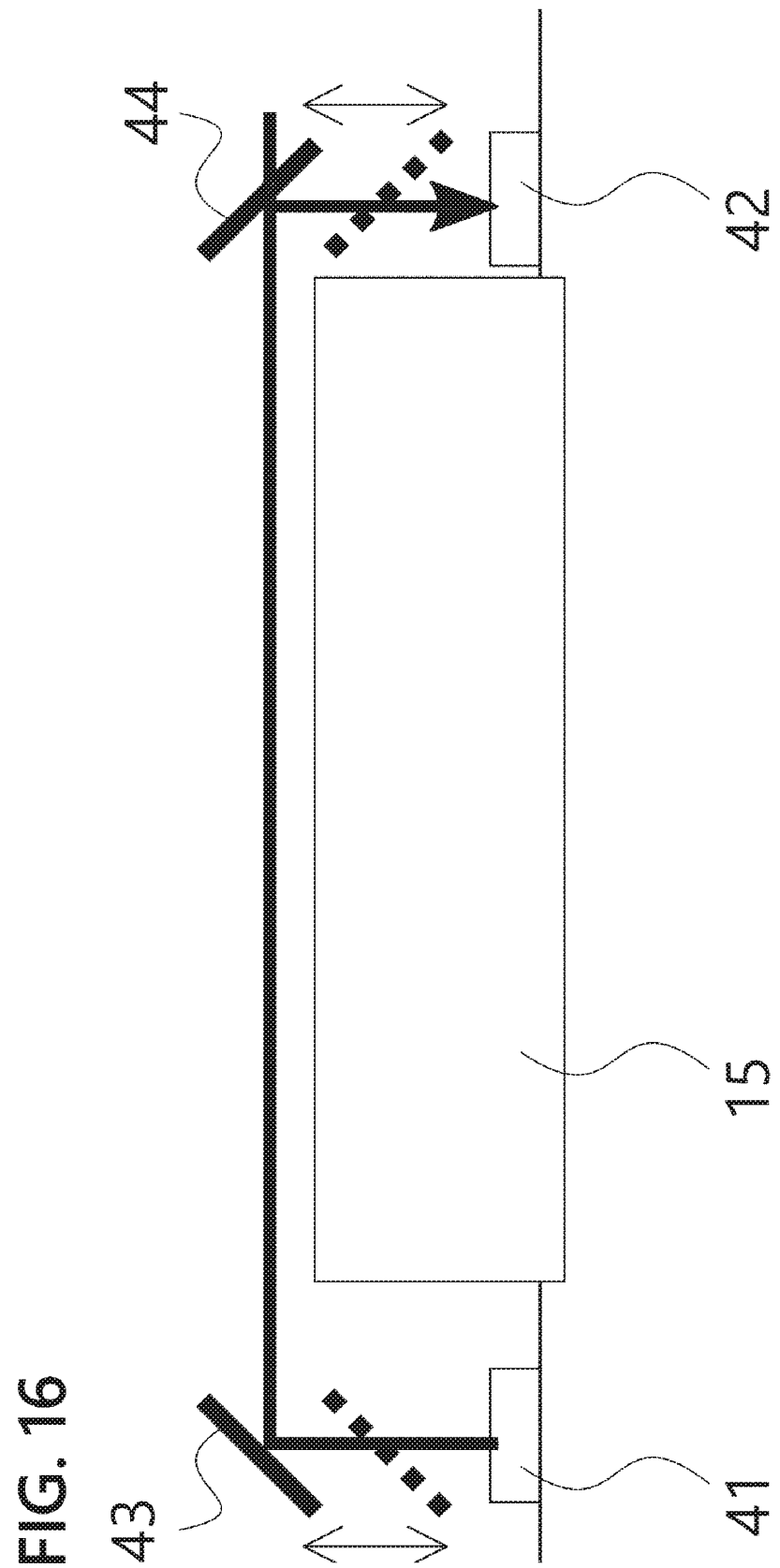
FIG. 16 is a diagram that illustrates a modified example of a height information detecting unit according to the first embodiment.

In addition, a transmissive type sensor is used as the height information detecting unit 40 in the ink jet printing apparatus 1 according to the first embodiment, and when information related to the height of the surface of the print medium 15 is detected, the light emission unit 41 and the light reception unit 42 are repeatedly moved in the vertical direction. However, the present invention is not limited to such a configuration. As an alternative to the above sensor, a first reflecting mirror 43 that reflects sensor light which is emitted from the light emitting unit 41 may be provided above the light emitting unit 41, and a second reflective mirror 44 that reflects the sensor light which is reflected by the first reflective mirror may be provided above the light receiving unit 42, as illustrated in FIG. 16.

Then, the information related to height may be detected by repeatedly moving the first reflective mirror 43 and the second reflective mirror 44 in the vertical direction, thereby moving the sensor light in the vertical direction.

In addition, the sensor light L is emitted from the light emitting unit 41 as a point shaped light beam and received by the light receiving unit 42 in the first embodiment described above. However, the present invention is not limited to such a configuration. It is also possible to adopt a configuration such as that illustrated in FIGS. 17A and 17B, in which a linear sensor light SL is emitted from a light emitting unit 50 and received by a light receiving unit 51.

In the case that a transmissive sensor that emits and receives such a linear sensor light SL is employed, it is possible to detect the light reception state of the linear sensor light (the length of the sensor light being received), in order to detect information related to the height of the surface. Thereby, the need to repeatedly move the light emitting unit 41 and the light receiving unit 42 in the vertical direction as in the above embodiment can be obviated, and the device can be miniaturized. However, because the detection range will be limited within the range of the linear sensor light SL, as illustrated in FIGS. 17A and 17B, in the case where the printing process is performed on print media 15 having thicknesses that differ greatly, a mechanism that moves the light emitting unit 50 and the light receiving unit 51 in the vertical direction may be provided.

In this case, a mechanism for manually moving the light emitting unit 50 and the light receiving unit 51 may be provided, or a mechanism for automatically moving the light emitting unit 50 and the light receiving unit 51 in the up-down direction according to the type of the print medium 15 may be provided.

In the first embodiment, the transmissive type sensor is employed as the height information detecting unit 40. However, the present invention is not limited to such a configuration, and other sensors may be employed. For example, a reflection type optical sensor may be provided. Specifically, a plurality of reflection type sensors may be arranged in the sub scanning direction with respect to the shuttle unit 4, the distances between the reflection type sensors and the surface of the print medium 15 may be measured, and information related to the height of the surface of the print medium may be detected by subtracting the measured distance from a distance between the reflection type sensors and the medium mounting surface 3a, which is set in advance.

In addition, the information related to the height of the surface of the print medium 15 is detected while moving the shuttle unit 4 backward after the shuttle unit 4 has been moved to the printing process start position in the first embodiment. However, the present invention is not limited to such a configuration. The information related to the height of the surface of the print medium 15 may be detected while the shuttle unit 4 is moved from the standby position (HOME) to the printing process start position, for example. However, in this case, since it is necessary to hold the information related to the height until a printing process is actually initiated, a large capacity will be necessary for a semiconductor memory. Therefore, it is desirable for the information related to the height of the surface of the print medium 15 to be detected while moving the shuttle unit 4 backward, as in the embodiment described above. If this method is employed, the information related to the height of a scanning section for which a printing process has been completed can be sequentially erased from the semiconductor memory, so that a necessary capacity of the semiconductor memory can be decreased.

In addition, the head unit 26 is moved upward in the vertical direction and downward in the vertical direction based on the information related to the height of the surface of the print medium 15, in the first embodiment. However, the flat bed unit 3 or the sub scanning drive guides 13A and 13B may be moved upward in the vertical direction and downward in the vertical direction instead of the head unit 26 being moved. Alternatively, at least two of the head unit 26, the flat bed unit 3, and the sub scanning drive guides 13A and 13B may be moved upward in the vertical direction and downward in the vertical direction.

Further, the light emitting unit 41 and the light receiving unit 42 are provided at positions separated by one scanning section rearward from the head unit 26, in the first embodiment. However, the present invention is not limited to such a configuration. The light emitting unit 41 and the light receiving unit 42 may be provided immediately behind the head unit 26.

However, because the shuttle unit 4 will be moved into an undetected range for the information related to the height in this case, at a point in time when information related to a height at which the head unit 26 is likely to contact the print medium 15 is detected, for example, it will be necessary to conduct a process to move the head unit 26 upward in parallel with the detecting process. Alternatively, it is necessary to stop the movement of the shuttle unit 4 and restart the movement in the sub scanning direction after moving the head unit 26 upward. As a further alternative, it is necessary to move the shuttle unit 4 to a next pass after moving the head unit 26 to a settable maximum height, and to detect the information related to height.

Next, an ink jet printing apparatus 6 according to a second embodiment of the present invention will be described. The overall configuration of the ink jet printing apparatus 6 of the second embodiment is the same as that of the ink jet printing apparatus 1 of the first embodiment illustrated in FIG. 1, but the configuration of the height information detecting unit and the method for detecting information related to the height of the print medium 15 are different. The ink jet printing apparatus 6 of the second embodiment will be described below, focusing on the differences from the ink jet printing apparatus 1 of the first embodiment. In addition, elements which are the same as those of the ink jet printing apparatus 1 of the first embodiment will be denoted with the same reference numerals, ands description thereof will be omitted.

Figure 18:
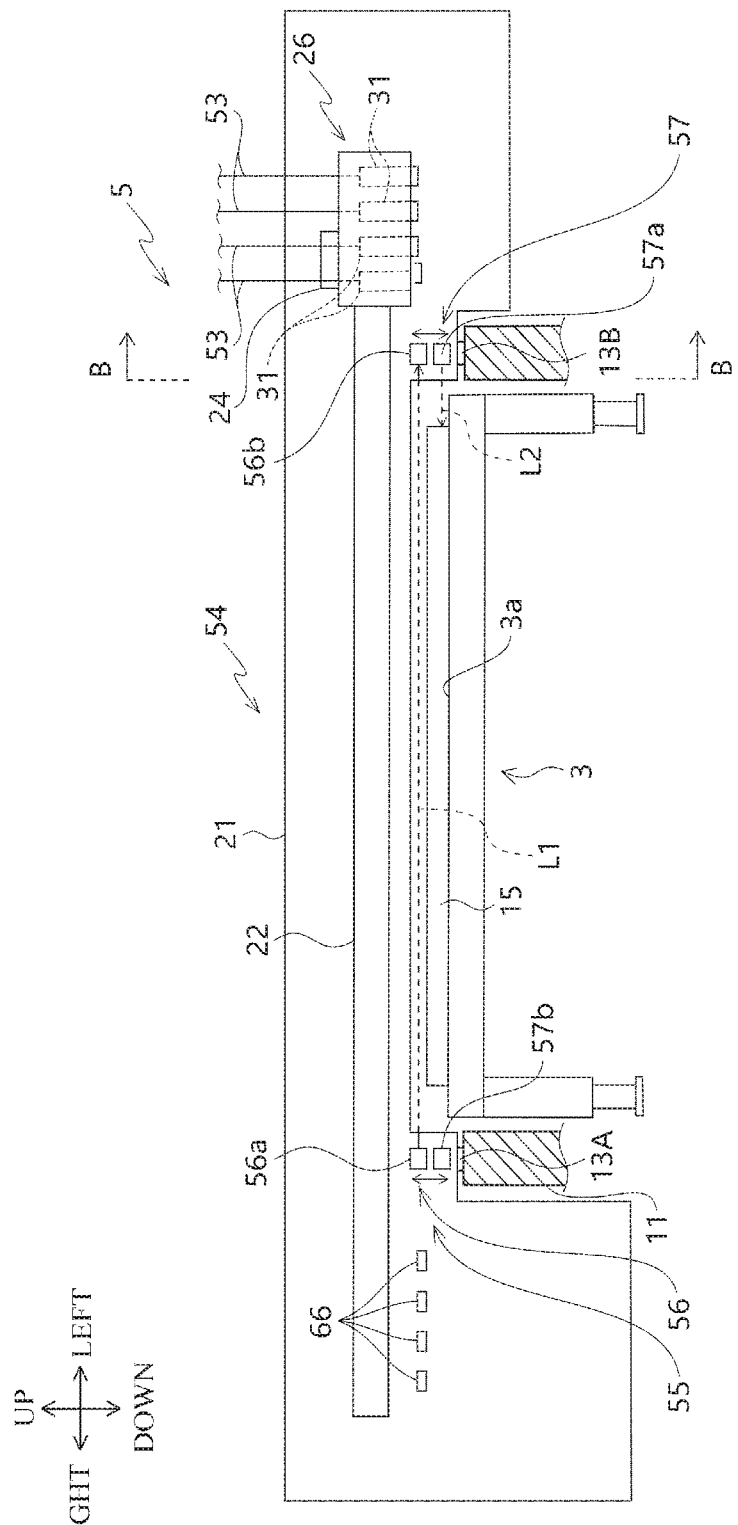
FIG. 18 is a diagram that illustrates the schematic configuration of a shuttle unit according to a second embodiment.

FIG. 18 is a diagram that illustrates the schematic configuration of a shuttle unit 54 in the ink jet printing 6 according to the second embodiment. As illustrated in FIG. 18, the height information detecting unit 55 of the second embodiment is equipped with two pairs of transmission type optical sensors, specifically, a first optical sensor 56 and a second optical sensor 57.

The first optical sensor 56 is equipped with a first light emitting unit 56a that emits a first sensor light L1 and a first light receiving unit 56b that receives the first sensor light L1 which is emitted from the first light emitting unit 56a. As illustrated in FIG. 18, the first light emitting unit 56a and the first light receiving unit 56b are provided at the same height at the two outer sides of the print medium 15 in the left-right direction.

The second optical sensor 57 is equipped with a second light emitting unit 57a that emits a second sensor light L2 and a second light receiving unit 57b that receives the second sensor light L2 which is emitted from the second light emitting unit 57a. As illustrated in FIG. 18, the second light emitting unit 57a and the second light receiving unit 57b are provided at the same height at the two outer sides of the print medium 15 in the left-right direction.

As illustrated in FIG. 18, the first optical sensor 56 and the second optical sensor 57 are installed at different positions in the up-down direction (vertical direction). That is, the first optical sensor 56 and the second optical sensor 57 are arranged side by side with a predetermined interval therebetween in the up-down direction. In addition, the first optical sensor 56 and the second optical sensor 57 are arranged such that the first light emitting unit 56a and the second light receiving unit 57b are arranged at the same side of the print medium 15, and the first light receiving unit 56b and the second light emitting unit 57a are arranged on the other side of the print medium 15. By arranging the light emitting units and the light receiving units of the respective optical sensors as described above, it becomes possible to prevent the first sensor light L1 from being received by the second optical sensor 57, and to prevent the second sensor light L2 from being received by the first optical sensor 56. That is, mutual interference between the first optical sensor 56 and the second optical sensor 57 can be prevented.

In addition, a sensor elevating motor 45 (refer to FIG. 6) in the ink jet printing apparatus 6 of the second embodiment moves the first optical sensor 56 and the second optical sensor 57 together in the up-down direction.

FIG. 19 is a cross sectional view of the shuttle unit 54 taken along line B-B in FIG. 18. As illustrated in FIG. 19, the first optical sensor 56 and the second optical sensor 57 are provided behind the head unit 26. Specifically, the first optical sensor 56 and the second optical sensor 57 are provided at positions separated by a distance d2 toward the rear of the head unit 26, for example, in the same manner as the light emitting unit 41 and the light receiving unit 42 in the first embodiment. As in the first embodiment, the distance d2 is set equal to the length d1 of one scanning section by the head unit 26.

The rest of the configurations of the shuttle unit 54 are the same as that of the shuttle unit 4 of the first embodiment.

Here, the basic principle of a method for detecting information related to the height of the print medium 15 by the height information detecting unit 55 of the present embodiment will be described with reference to FIG. 20. FIG. 20 is a cross-sectional view in the left-right direction (the direction orthogonal to the conveyance direction) in a state in which the shuttle unit 54 is provided at an arbitrary position on the print medium 15.

Figure 20A:
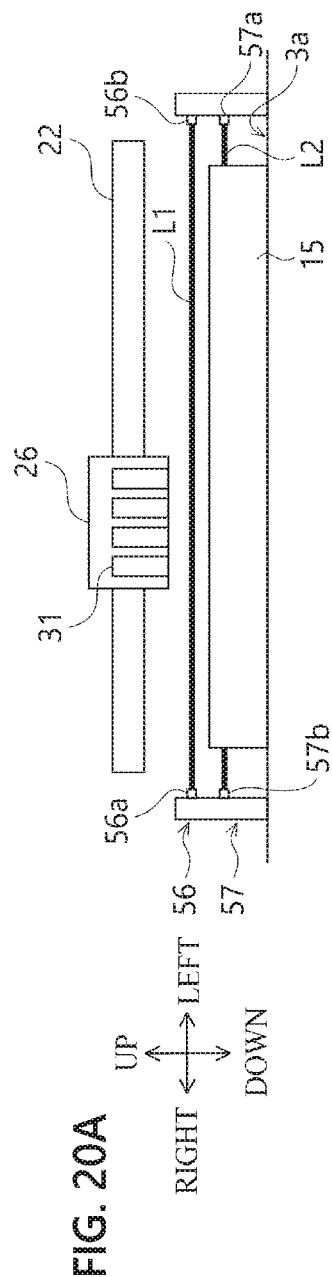
FIG. 20A is a diagram for explaining the basic principle of a method for detecting information related to height in the second embodiment.

First, in the case that the first light receiving unit 56*b* of the first optical sensor 56 which is installed on the upper side receives the first sensor light L1, and the second light receiving sensor 57*b* of the second optical sensor 57 which is installed on the lower side does not receive the sensor light L2 as illustrated in FIG. 20A, such a state is designated as that in which the height of the surface of the print medium 15 is in an appropriate state. That is, such a light reception state is designated as that in which the distance between the surface of the print medium 15 and the head unit 26 is in an appropriate state.

Figure 20B:
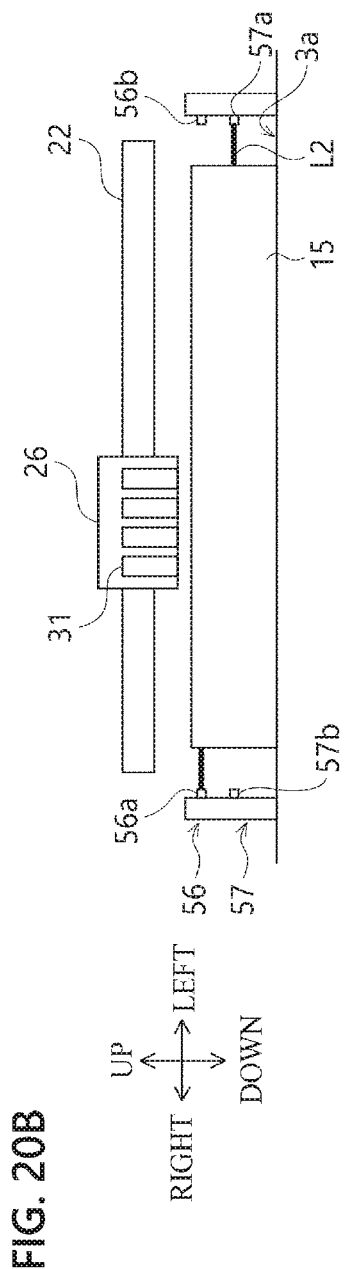
FIG. 20B is a diagram for explaining the basic principle of a method for detecting information related to height in the second embodiment.

Next, in the case that the first light receiving unit 56*b* of the first optical sensor 56 which is installed on the upper does not receive the first sensor light L1, and the second light receiving sensor 57*b* of the second optical sensor 57 which is installed on the lower side does not receive the sensor light L2 as illustrated in FIG. 20B, such a state is designated as that in which the height of the surface of the print medium 15 is excessively high. That is, such a light reception state is designated as that in which the distance between the surface of the print medium 15 and the head unit 26 is less than a desired distance.

Figure 20C:
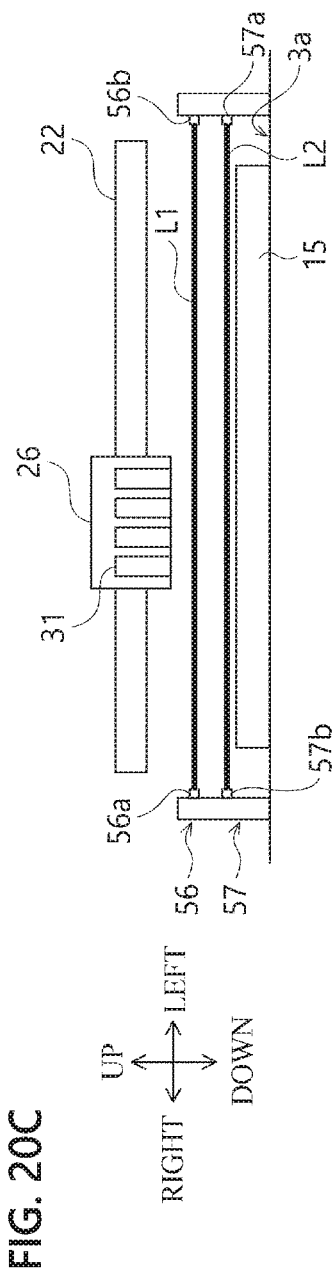
FIG. 20C is a diagram for explaining the basic principle of a method for detecting information related to height in the second embodiment.

In addition, in the case that the first light receiving unit 56*b* of the first optical sensor 56 which is installed on the upper receives the first sensor light L1, and the second light receiving sensor 57*b* of the second optical sensor 57 which is installed on the lower side receives the sensor light L2 as illustrated in FIG. 20C, such a state is designated as that in which the height of the surface of the print medium 15 is excessively low. That is, such a light reception state is designated as that in which the distance between the surface of the print medium 15 and the head unit 26 is greater than the desired distance.

The height information detecting unit 55 of the present embodiment detects the information related to the height of the print medium 15, by employing combinations of the light reception state of the first sensor light 1 by the first optical sensor 56 and the light reception state of the second sensor L2 by the second optical sensor 57 in the manner described above. A method for detecting information related to the height of the print medium 15 by the height information detecting unit 55 will be described below with reference to FIG. 21.

First, the print medium 15 is placed on the medium mounting surface 3*a* such that the leading end of the print medium 15 in the sub scanning direction (front-back direction) is at the position of SD position=SP0 as an installation reference position.

The positions of the first optical sensor 56 and the second optical sensor 57 in the vertical direction are adjusted such that the position of the surface of the print medium 15 is positioned at the center of the first optical sensor 56 and the second optical sensor 57 at the leading end of the print medium 15. At this time, the first optical sensor 56 is in a state in which it is receiving the first sensor light L1, and the second sensor light L2 of the second optical sensor 57 is in a state in which it is being shielded by the print medium 15 (a state in which light is not being received). Note that at this time, the head unit 26 is positioned in front of the first optical sensor 56 and the second optical sensor 57 (the side opposite the moving direction of the head unit 26), and the head unit 26 is not illustrated in FIG. 21.

Here, the height of the first optical sensor 56 and the second optical sensor 57 from the medium mounting surface 3*a* of the flat bed unit 3 is defined as the distance from medium mounting surface 3*a* to a center position between the first optical sensor 56 and the second optical sensor 57. The height of the first optical sensor 56 and the second optical sensor 57 at SD position=SP0 is designated as sp0*h*. The control unit 5 stores this height sp0*h* and the SD position (SP0) correlated with each other as information related to height.

Next, the control unit 5 moves the first optical sensor 56, the second optical sensor 57 and the head unit 26 in the direction of the SD position (hereinafter referred to as SD direction) by moving the shuttle unit 54.

In the case that the first optical sensor 56 and the second optical sensor 57 reach the position of SD position=SP1, the first sensor light L1 of the first optical sensor 56 is also shielded by the print medium 15, the control unit 5 determines that the distance between the surface of the print medium 15 and the head unit 26 has become too small as described above. At this time, the control unit 5 moves the positions of the first optical sensor 56 and the second optical sensor 57 upward by d/2 at the position of SP1, as illustrated in FIG. 21. Thereby, the position of the surface of the medium 15 is positioned between the first optical sensor 56 and the second optical sensor 57. As a result, the heights of the first optical sensor 56 and the second optical sensor 57 at SP1 are sp0*h*+d/2. The control unit 5 stores this height sp0*h*+d/2 and the SI) position (SP1) correlated with each other as information related to height. Note that d is the distance between the first optical sensor 56 and the second optical sensor 57.

Then the control unit 5 moves the first optical sensor 56, the second optical sensor 57, and the head unit 26 in the SD direction, by moving the shuttle unit 54 further.

In the case that the second sensor light L2 of the second optical sensor 57 is in a light receiving state when the first optical sensor 56 and the second optical sensor 57 reach SD position=SP2, the control unit 5 determines that the distance between the surface of the print medium 15 and the head unit 26 has become greater as described above. At this time, the control unit 5 moves the positions of the first optical sensor 56 and the second optical sensor 57 downward by d/2 at position SP2. Thereby; the position of the surface of the medium 15 is positioned between the first optical sensor 56 and the second optical sensor 57. As a result, the heights of the first optical sensor 56 and the second optical sensor 57 at SP2 are sp0*h*. The control unit 5 stores this height sp0*h* and the SD position (SP2) correlated with each other as information related to height.

Thereafter, the control unit 5 moves the first optical sensor 56, the second optical sensor 57, and the head unit 26 in the SD direction in the same manner as described above. In the case that the first sensor light L1 of the first optical sensor 56 is shielded, the first optical sensor 56 and the second optical sensor 57 are moved upward by d/2, and in the case that the second sensor light L2 of the second optical sensor 57 is in a light receiving state, the first optical sensor 56 and the second optical sensor 57 are moved downward by d/2. The heights of the first optical sensor 56 and the second optical sensor 57 at these times are correlated to the SD position and sequentially stored.

Because the heights of the first optical sensor 56 and the second optical sensor 57 are the height of the surface of the print medium 15, information related to the height of the entirety of the print medium 15 is detected by the process described above being performed from one end to the other end of the print medium in the sub scanning direction. The detected information related to the height is stored by the control unit 5.

As described above, the height information detecting unit 55 of the present embodiment detects information related to height by moving the two pairs of optical sensors vertically upward and vertically downward for distances which are set in advance, in response to the light receiving states of the two pairs of optical sensors accompanying movement of the shuttle unit 54. Therefore, information related to the height of the print medium 15 can be detected more efficiently than by the height information detecting unit 40 of the first embodiment.

In addition, because the height information detecting unit 55 of the present embodiment can reduce the number of detection points of information related to the height compared to the height information detecting unit 40 of the first embodiment, it is possible to reduce the amount of data, and the capacity of memory can be reduced. Further, because data processing speed can be increased, productivity can be improved. However, the height information detecting unit 40 of the first embodiment is more advantageous from the viewpoint of detection accuracy of the information related to the height of the print medium 15.

In addition, the height information detecting unit 55 of the present embodiment is configured to move the two pairs of optical sensors so that the surface of the print medium 15 is positioned between the first optical sensor 56 and the second optical sensor 57. Therefore, the height information detecting unit 55 can be realized with a simpler configuration, and the surface position of the print medium 15 can be detected more efficiently.

The control unit 5 adjusts the distance between the print medium 15 and the head unit 26 while performing the height detection of the surface of the print medium 15 as described above, and performs a printing process.

Specifically, the control unit 5 moves the head unit 26 in the up-down direction based on the information related to the height of the print medium 15. Thereby, the printing process is performed in each scanning section (also referred to as a printing pass or a pass) while maintaining a preset distance h, which is set in advance, with respect to the highest point on the surface of the pint medium 15. That is, the control unit 5 sets the height of the lower surface of the ink jet head 31 of the head unit 26 to be sp0$h$+d/2+h when printing a printing pass 1, sets the height of the lower surface of the ink jet head 31 of the head unit 26 to be sp0$h$+d+h when printing a printing pass 2 and a printing pass 3, and sets the height of the lower surface of the ink jet head 31 of the head unit 26 to be sp0$h$+d/2+h when printing a printing pass 4.

Next, the processes which are performed by the control unit 5 in the case that the method for detecting information related to the height of the print medium 15 is executed will be described with reference to the flowchart illustrated in FIG. 22.

First, when the movement of the shuttle unit 54 is initiated (S100: YES), the control unit 5 initializes a height detection number i and a sensor change number SNSNUM and sets them to zero (S102).

Next, the control unit 5 monitors whether the first optical sensor 56 has changed from a light receiving state to a light shielded state. In the case that there is no change (S104: NO), the control unit 5 monitors whether the second optical sensor 57 has changed from a light shielded state to a light receiving state (S108). Note that the first optical sensor 56 and the second optical sensor 57 output "1" in the case that they are in the light receiving state, and output "0" in the case that they are in the light shielding state. The control unit 5 recognizes whether the first optical sensor 56 and the second optical sensor 57 is in the light receiving state or the light shielding state depending on whether the signals which are output therefrom are "0" or "1".

Then, in the case that the signal which is output from the first optical sensor 56 changes from "1" to "0" (S104: YES), the control unit 5 moves the first optical sensor 56 and the second optical sensor 57 upward by d/2 (S106).

On the other hand, if the signal which is output from the first optical sensor 56 has not changed (S104: NO) and the output signal of the second optical sensor 57 has changed from "0" to "1" (S108: YES), the first optical sensor 56 and the second optical sensor 57 are moved downward by d/2 (S110).

Then, in the case that the first optical sensor 56 and the second optical sensor 57 are moved upward or downward, the control unit 5 increments the value of the height detection number i by 1 (i←i+1) (S112).

Further, the control unit 5 stores the heights of the first optical sensor 56 and the second optical sensor 57 after the movement in SHIGH (i) as information related to height (S114).

On the other hand, if there is no change in the signals which are output from both the first optical sensor 56 and the second optical sensor 57 (S108: NO), that is, if the position of the surface of the print medium 15 is maintained between the first optical sensor 56 and the second optical sensor 57, the control unit 5 neither moves the first optical sensor 56 and the second optical sensor 57 nor stores information related to the height of the print medium 15. Then, while the movement of the shuttle unit 54 in the sub scanning direction is not completed, the control unit 5 continues to move the shuttle unit 54 and monitors changes in the signals which are output from the first optical sensor 56 and the second optical sensor 57 (S116: NO).

Then, in the case that the movement of the shuttle unit 54 in the sub scanning direction is completed, the control unit 5 stores the value of the height detection number i at that point in time in the sensor change number SNSNUM (S118). The above is the explanation of the detection process for the information related to height in the control unit 5 of the second embodiment.

In the ink jet printing apparatus 6 of the present embodiment, the height information detecting unit 55 sequentially detects information related to the height of the surface of the print medium 15 as the shuttle unit 54 moves in the sub scanning direction (forward and backward direction), as described above. Then, the control unit 5 sequentially controls the head elevating motor 25 based on the sequentially detected information related to heights, and controls the ink jet head 31 to perform a printing process while the distance between the print medium 15 and the head unit 26 (ink jet head 31) is maintained to a range which is set in advance. Hereinafter, the flow of steps in a printing operation of the ink jet printing apparatus 6 of the present embodiment will be described with reference to the flowchart illustrated in FIG. 23, as well as FIGS. 24A through 24C and FIGS. 25D through 25F.

Figure 24A:
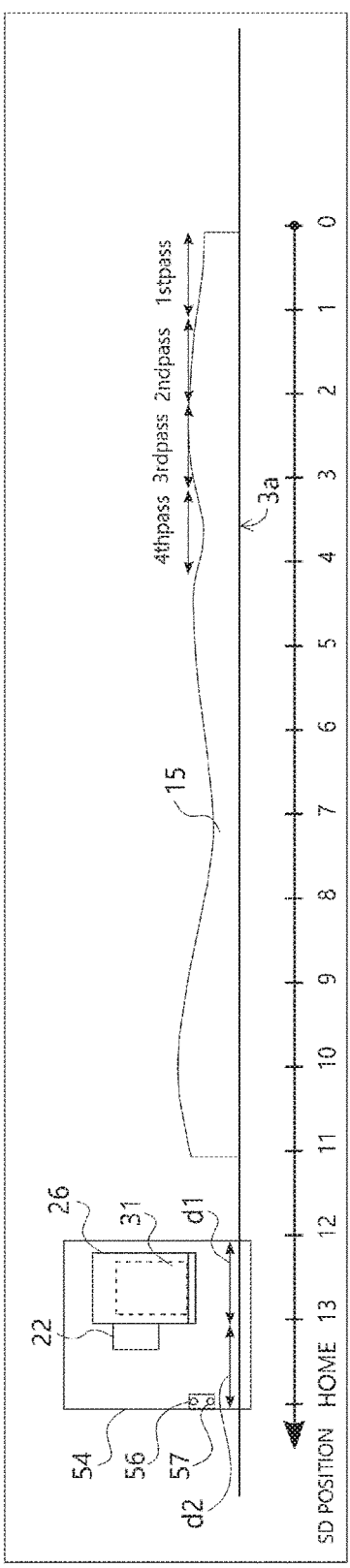
FIG. 24A is a collection of diagrams for explaining the printing operation in the ink jet printing apparatus according to the second embodiment.

First, in the ink jet printing apparatus 6, the shuttle unit 54 is provided at a standby position (HOME) in a standby state prior to initiation of the printing operation. FIG. 24A illustrates a state in which the shuttle unit 4 is provided at the standby position (HOME).

Then, in a state in which the shuttle unit 54 is disposed at the standby position (HOME) as illustrated in FIG. 24A, the height of the head unit 26 is set to the maximum settable height (S200). The maximum height which is set at this time is set to a value greater than the maximum thickness of the print medium 15 which can be presumed to be placed on the medium mounting surface 3a. A configuration may be adopted in which the maximum height is capable of being changed manually.

Figure 24B:
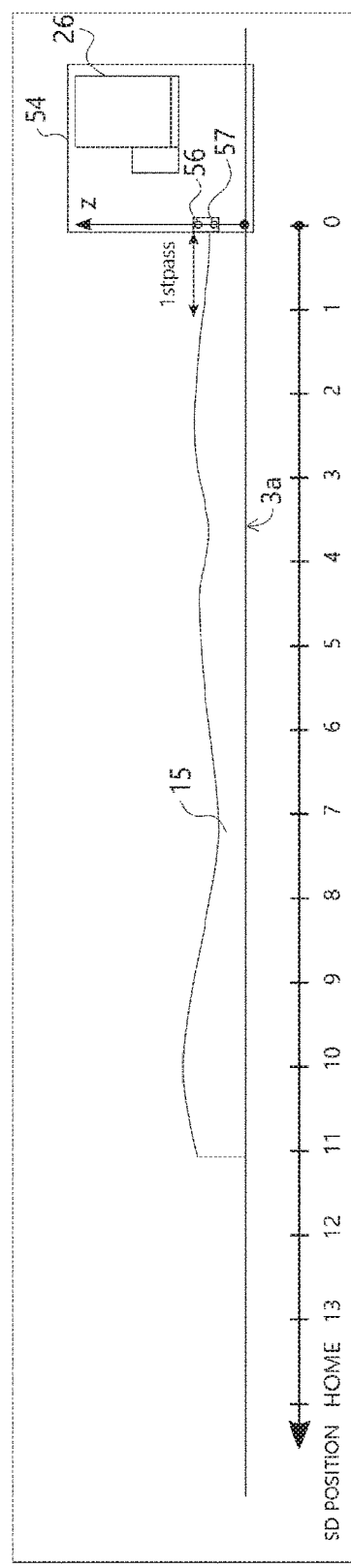
FIG. 24B is a collection of diagrams for explaining the printing operation in the ink jet printing apparatus according to the second embodiment.

Next, when a print job is input after the print medium 15 is placed on the medium mounting surface 3a of the flat bed unit 3, the control unit 5 controls the sub scanning driving motor 12 to move the shuttle unit 54 from the standby position to a printing process start position (SD position=0) (S202). FIG. 24B illustrates a state in which the shuttle unit 4 is provided at the printing process start position (SD position=0). As illustrated in FIG. 24B, when the shuttle unit 4 is provided at the printing process start position (SD position=0), the first optical sensor 56 and the second optical sensor 57 of the height information detecting unit 55 are arranged at SD position=0.

Next, the control unit 5 performs initial height position setting of the first optical sensor 56 and the second optical sensor 57 (S204). In this initial height position setting, the positions of the first optical sensor 56 and the second optical sensor 57 in the up-down direction are adjusted such that the position of the surface of the leading end of the print medium 15 is positioned at the center between the first optical sensor 56 and the second optical sensor 57. Note that the specific method for setting the initial height position will be described later.

After the initial height position setting is completed, the control unit 5 controls the sub scanning drive motor 12 to move the shuttle unit 54 from SD position=0 to SD position=1. During this movement, information related to the scanning section on the print medium 15 for a first pass is detected (S206). Then, the control unit 5 derives the maximum height of the scanning section for a first pass in a state in which the shuttle unit 54 (the first optical sensor 56 and the second optical sensor 57) is arranged at the SD position=1, as illustrated in FIG. 24C (S208).

Specifically, as described above, the control unit 5 monitors whether there are changes in the signals which are output from the first optical sensor 56 and the second optical sensor 57 while the shuttle unit 54 is moved from SD position=0 to SD position=1 as described above. At a point in time when movement of the shuttle unit 54 is initiated, the signal which is output from the first optical sensor 56 is "1" and the signal which is output from the second optical sensor 57 is "0", in this state, the height of the surface of the print medium 15 does not change within the range between the first optical sensor 56 and the second optical sensor 57. Therefore, the control unit 5 sets the initial maximum height of the print medium 15 at SD position=0 to sp0h+d/2, which is the position of the first optical sensor 56.

Figure 24C:
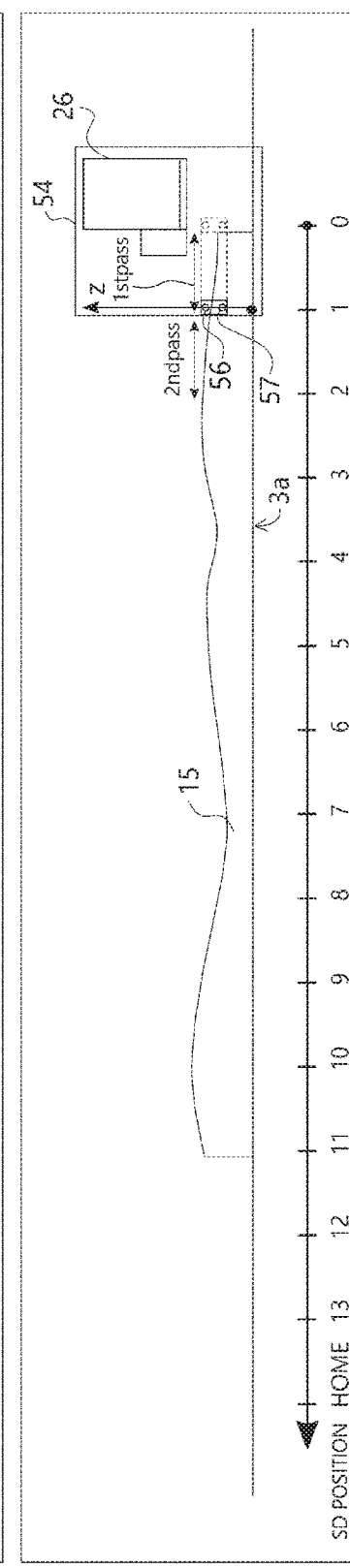
FIG. 24C is a collection of diagrams for explaining the printing operation in the ink jet printing apparatus according to the second embodiment.

As illustrated in FIG. 24C, while the shuttle unit 54 moves from SD position=0 to the SD position=1, the surface of the print medium 15 is positioned between the first optical sensor 56 and the second optical sensor 57. Therefore, the states of the signals which are output from the first optical sensor 56 and the second optical sensor 57 do not change.

Since there is no change in the states of the signals which are output from the first optical sensor 56 and the second optical sensor 57 in the range from SD position=0 to SD position=1, the control unit 5 derives and stores sp0h+d/2, which is the same value as the initial maximum height at SD position=0, as the maximum height of the surface of the print medium 15 for the first pass.

Next, the control unit 5 sets the pass number n to n=1 (S210). In the case that the next pass is not the final pass (S212: NO), the control unit 5 moves the shuttle unit 54 from SD position=n to SD position=n+1. During this movement, information related to the height of the scanning section of the n+1st pass on the print medium 15 is detected (S214). Then, the maximum height of the scanning section of the n+1st pass is derived in a state in which the shuttle unit 54 (the first optical sensor 56 and the second optical sensor 57) is arranged at SD position=n+1 (S216).

Specifically, after the maximum height of the scanning section for the first pass is detected as described above, if a second pass is not the final pass, the head unit 26 is moved from SD position=1 to SD position=2. During this movement, information related to the height of the scanning section on the print medium 15 for the second pass is detected.

Figure 25D:
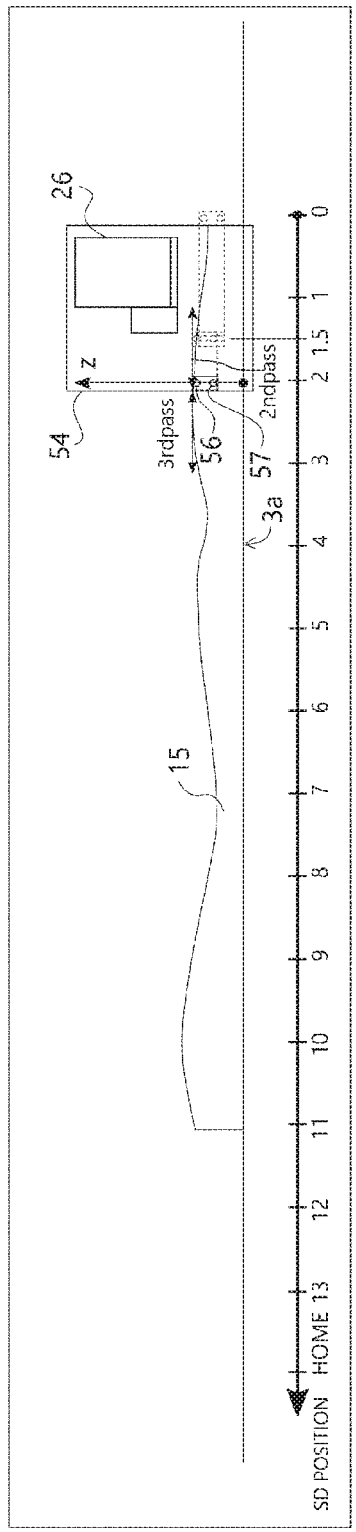
FIG. 25D is a collection of diagrams for explaining the printing operation in the ink jet printing apparatus according to the second embodiment.

The control unit 5 monitors the state of change of the signals which are output from the first optical sensor 56 and the second optical sensor 57 while moving the shuttle unit 54 from SD position=1 to SD position=2. Here, as illustrated in FIG. 25D, while the shuttle unit 54 moves from SD position=1 to SD position=2, the signal which is output from the first optical sensor 56 changes from "1" to "0" when the shuttle unit 54 reaches SD position=1.5, that is, the position of the surface of the print medium 15 becomes higher than the position of the first optical sensor 56.

Accordingly, the control unit 5 moves the first optical sensor 56 and the second optical sensor 57 upward by d/2. At the same time, the control unit 5 stores the height sp0h+d, which is the height of the first optical sensor 56 after being moved, as the maximum height of the print medium 15 from SD position=1.5. Then, the control unit 5 continues to monitor the state of change of the signals which are output from the first optical sensor 56 and the second optical sensor 57. The maximum height of the print medium 15 from SD position=1 to SD position=2 is sp0h+d/2 from SD position=1 to SD position=1.5, and sp0h+d from SD position=1.5 to SD position=2. Therefore, the control unit 5 stores the maximum height of the scanning section of the second pass as sp0h+d detected between SD position=1.5 and SD position=2.

Subsequently, as described above, the control unit 5 derives the maximum height of the scanning section of the n+1st pass (here, the second pass), and then controls the head elevating motor 25 based on the maximum height of the scanning section for the nth pass (here, the first pass) derived in step S208, to set the height of the head unit 26 (S218). Specifically, because the maximum height of the first pass is sp0h+d/2, a gap h which is set in advance is added to this maximum height, and the height of the head unit 26 is set such that the lower surface of the ink jet head 31 is positioned at a height of sp0h+d/2+h.

Next, the control unit 5 controls the main scanning drive motor 23 and controls the ink jet head 31 while moving the head unit 26 in the main scanning direction to perform a printing process in the scanning section for the nth pass (here, the first pass) (S220).

Note that in the present embodiment, the ink ejection timing of the ink jet head 31 is a fixed timing which is set in advance, and is set to the same timing in all of the scanning sections.

After the printing process of the nth pass (here, the first pass) is performed, the control unit 5 compares the maximum height of the scanning section for the n+1st pass (here, the second pass) with the maximum height of the nth pass (here, the first pass) (S222). In the case that the maximum height of the scanning section for the n+1st pass (here, the second pass) is greater than the maximum height of the scanning section for the nth pass (here, the first pass) (S222: YES), the head elevating motor 25 is controlled based on the maximum height of the scanning section for the n+1st pass (here, the second pass) to set the height of the head unit 26 (S224), and the process proceeds to step S226. Specifically, because the maximum height of the second pass is sp0h+d, the gap h which is set in advance is added to this maximum height, and the height of the head unit 26 is adjusted such that the lower surface of the ink jet head 31 is positioned at a height of sp0h+d+h. Thereafter, the process proceeds to step S226.

At step S226, the control unit 5 sets the pass number n to n=n+1 (here, "2"). In the case that the next pass is not the final pass (S212: NO), the control unit 5 moves the shuttle unit 54 from SD position=n (here, "2") to SD position=n+1 (here, "3"). During this movement, information related to the height of the scanning section for the n+1 st pass (here, the third pass) is detected (S214). Then, the maximum height of the scanning section for the n+1st pass (here, the third pass) is derived in a state in which the shuttle unit 54 (the first optical sensor 56 and the second optical sensor 57) is arranged at SD position=n+1 (here, "3") (S216).

Specifically, in the case that the third pass is not the final pass, the head unit 26 is moved from SD position=2 to SD position=3, and during this movement, information related to the height of the scanning section on the print medium 15 for the third pass is detected.

The control unit 5 monitors the state of change of the signals which are output from the first optical sensor 56 and the second optical sensor 57 while moving the shuttle unit 54 from SD position=2 to SD position=3.

Figure 25E:
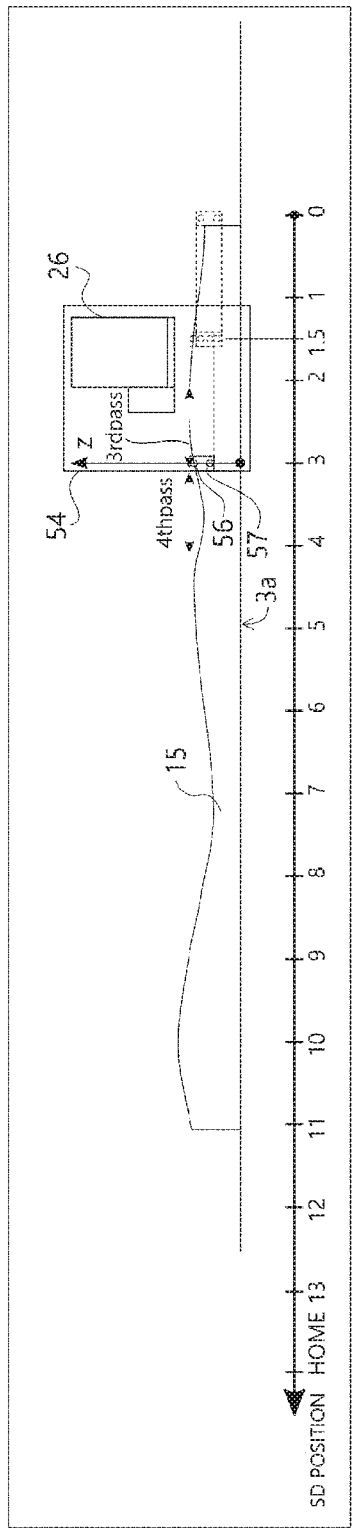
FIG. 25E is a collection of diagrams for explaining the printing operation in the ink jet printing apparatus according to the second embodiment.

While the shuttle unit 54 moves from SD position=2 to SD position=3, the surface of the print medium 15 is between the first optical sensor 56 and the second optical sensor 57 as illustrated in FIG. 25E. Therefore, the states of the signals which are output from the first optical sensor 56 and the second optical sensor 57 do not change.

Accordingly, the control unit 5 stores sp0h+d, which is the same value as the maximum height of SD position=1.5 as the maximum height of the surface of the print medium 15 of for third pass.

Next, after deriving the maximum height of the scanning section for the third pass as described above, the control unit 5 controls the head elevating motor 25 based on the maximum height of the scanning section of the second pass, to set the height of the head unit 26 (S218). Specifically, since the maximum height of the second pass is sp0h+d, the gap h which is set in advance is added to this maximum height, and the height of the head unit 26 is adjusted such that the lower surface of the ink jet head 31 is positioned at a height of sp0h+d+h. Note that here, the height of the head unit 26 is set to sp0h+d+h prior to the movement from SD position=2 to SD position=3, and therefore no actual change is implemented.

Next, the control unit 5 controls the main scanning drive motor 23 and controls the ink jet head 31 while moving the head unit 26 in the main scanning direction to perform a printing process in the scanning section for the nth pass (here, the second pass) (S220).

After the printing process of the nth pass (here, the second pass) is performed, the control unit 5 compares the maximum height of the scanning section for the n+1st pass (here, the third pass) with the maximum height of the scanning section for the nth pass (here, the second pass) (S222). In the case that the maximum height of the scanning section for the n+1st pass (here, the third pass) is less than or equal to the maximum height of the scanning section for the nth pass (here, the second pass) (S222: NO), the process proceeds to step S226 without changing the current height of the head unit 26.

Next, at step S226, the control unit 5 sets the pass number n to n=n+1 (here, "3"). In the case that the next pass is not the final pass (S212: NO), the processes from steps S214 through S226 are repeated.

That is, the control unit 5 detects information related to the height of the scanning section for the n+1st pass while moving the shuttle unit 54 from SD position=n to SD position=n+1, and derives a maximum height from the detected information related to the height. After deriving the maximum height of the scanning section for the n+1st pass, the head unit 26 is moved in the vertical direction based on the maximum height of the previous nth pass to perform a printing process for the nth pass.

After the printing process for the nth pass is completed, in the case that the maximum height of the n+1st pass is greater than the maximum height of the nth pass, the head unit 26 is moved upward in the vertical direction based on the maximum height of the n+1st pass. Thereafter, information related to height is detected while moving the shuttle unit 54 again to the next pass.

On the other hand, when the maximum height of the n+1st pass is less than or equal to the maximum height of the nth pass, information related to height is detected while the shuttle unit 54 is moved to the next pass again, without moving the head unit 26 in the vertical direction. The control unit 5 repeats the processes described above until it is determined that the next path is the final path in step S212.

On the other hand, if it is determined in step S212 that the next pass is the final pass (S212: YES), the shuttle unit 54 is moved from SD position=n to SD position=n+1 (S228). Then, the control unit 5 controls the head elevating motor 25 based on the maximum height of the scanning section of the nth pass to set the height of the head unit 26 (S230). Next, the control unit 5 controls the main scanning drive motor 23 and controls the ink jet head 31 while moving the head unit 26 in the main scanning direction to perform the printing process for the scanning section for the nth pass (S232).

Figure 25F:
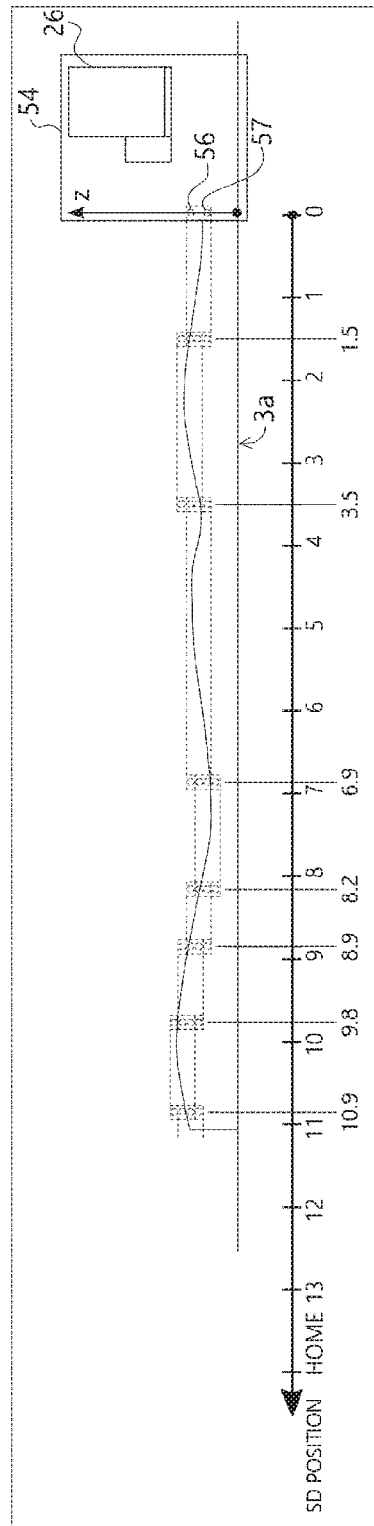
FIG. 25F is a collection of diagrams for explaining the printing operation in the ink jet printing apparatus according to the second embodiment.

After the printing process for the nth pass is performed, the control unit 5 sets the height of the head unit 26 to the maximum settable height (S234). Then, as illustrated in FIG. 25F, the control unit 5 controls the sub scanning drive motor 12 to move the shuttle unit 54 from the position of SD position=n+1 to the standby position (HOME) (S236). Thereby, the printing operation is completed.

Table 3 below shows the results of detecting information related to the height of the print medium 15 illustrated in FIG. 25F for scanning sections up to an eleventh pass, which is the final pass, and deriving the maximum height of each pass.

TABLE 3

| 6th Pass | 5th Pass | 4th Pass | 3rd Pass | 2nd Pass | 1st Pass | Pass No. |
|---|---|---|---|---|---|---|
| sp0h + d/2 | sp0h + d/2 | sp0h + d | sp0h + d | sp0h + d | sp0h + d/2 | Maximum Height |
| 11th Pass | 10th Pass | | 9th Pass | 8th Pass | 7th Pass | Pass No. |
| sp0h + d * 3/2 | sp0h + d * 3/2 | | sp0h + d | sp0h | sp0h + d/2 | Maximum Height |

As shown in Table 3 above, in the case of the print medium 15 illustrated in FIG. 25F, in addition to SD position=1.5 described above, the states of the signals which are output from the first optical sensor 56 and the second optical sensor 57 change at SD positions=3.5, 6.9, 8.2, 8.9, 9.8 and 10.9, and the control unit 5 moves the first optical sensor 56 and the second optical sensor 57 in the up-down direction to set the position of the head unit 26 in the up-down direction in pass units (scanning section units).

In addition, in the case that the states of the signals which are output from the first optical sensor 56 and the second optical sensor 57 change only once within a pass (within a scanning section) (the 2nd, 4th, 7th, 10th, and 11th passes), the control unit 5 derives the maximum height of the scanning section based on information related to the higher height after the change in the output signal, and sets the height of the head unit 26.

In the case that the state of the output signal of the first optical sensor 56 and the state of the output signal of the second optical sensor 57 changes twice or more within a pass (within a scanning section) (9th pass), the control unit 5 derives the maximum height of the scanning section based on the highest position from among the plurality of detected heights, and sets the height of the head unit 26.

Figure 23:
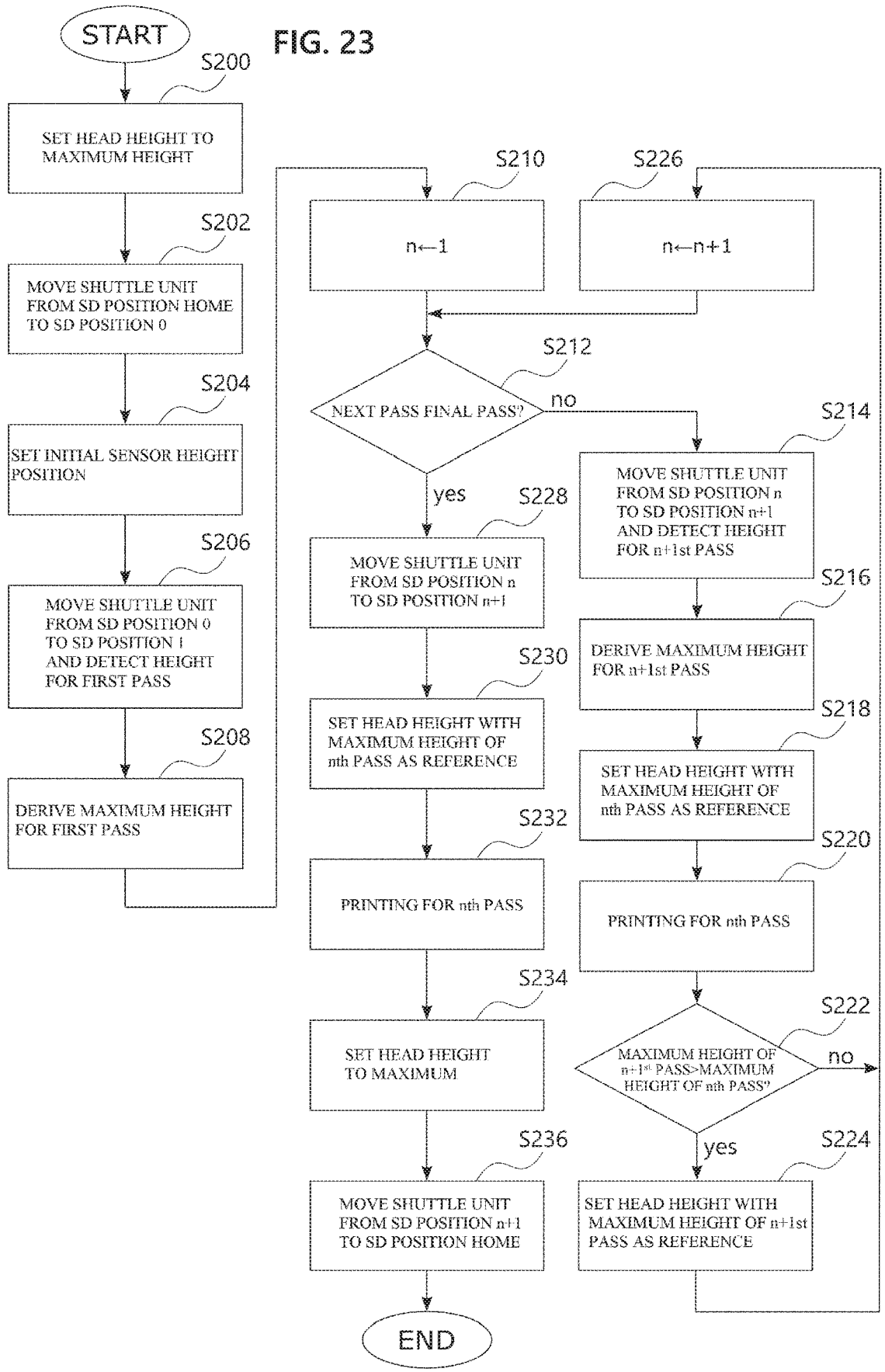
FIG. 23 is a flowchart that illustrates the flow of a series of steps of a printing operation of the ink jet printing apparatus according to the second embodiment.
Figure 26:
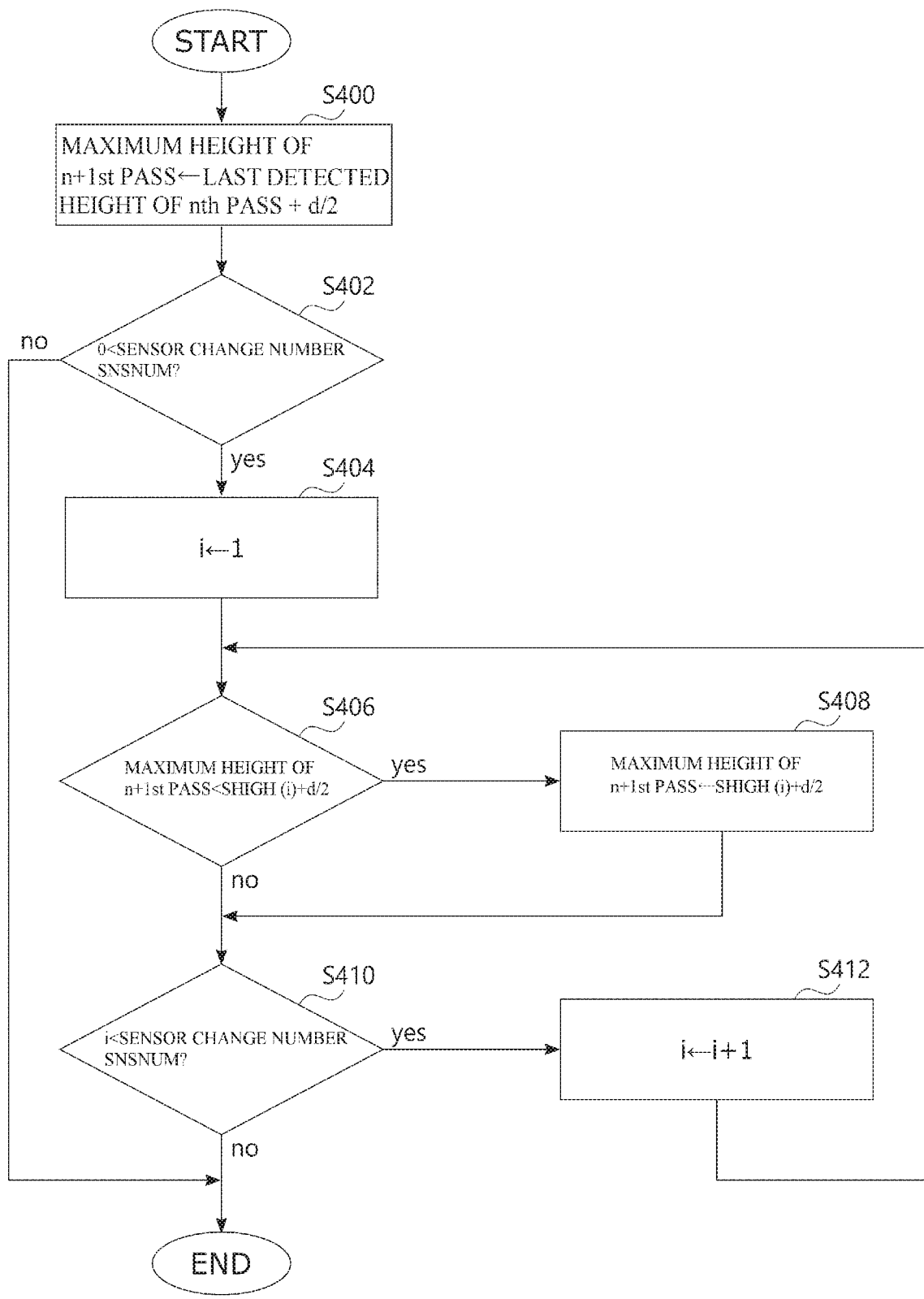
FIG. 26 is a flowchart that illustrates a series of flows of the maximum height deriving method for the second embodiment.
Figure 27:
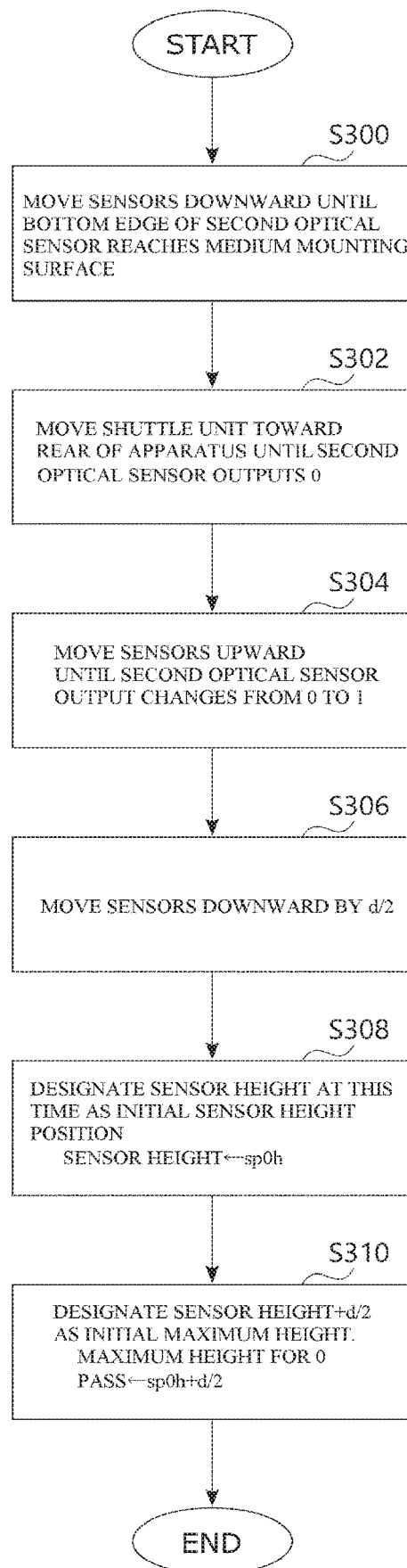
FIG. 27 is a flowchart for explaining an initial height position setting of a first optical sensor and a second optical sensor.

Next, the processes which are executed by the control unit 5 when deriving the maximum height in steps S208 and S216 of the flowchart illustrated in FIG. 23 will be described in detail with reference to the flowchart illustrated in FIG. 26.

First, the control unit 5 provisionally sets the last detected height of an nth pass+d/2 as the maximum height of an n+1st pass (S400). In the case that the maximum height of a first pass is being derived in S208, the initial maximum height position is provisionally set as the maximum height of the first pass.

When detecting the information related to the height of the scanning section of the n+1st pass, in the case that the positions of the first optical sensor 56 and the second optical sensor 57 are not moved, that is, in the case that the sensor change number SNSNUM is zero (S402: NO), a height, which is the final height of the positions of the first optical sensor 56 and the second optical sensor 57 in the previous nth path plus d/2, is set as the maximum height of the n+1st pass. That is, the maximum height of the previous nth pass is set as the maximum height of the n+1st pass. In the case that the maximum height of the first pass is being derived in S208, the initial maximum height position is set as the maximum height of the first pass.

On the other hand, in the case that the control unit 5 moves the positions of the first optical sensor 56 and the second optical sensor 57 (S402: YES) when detecting information related to the height of the scanning section for the n+1st pass, the height detection number i is set to "1", and the maximum height of the provisionally set n+1st pass is compared with SHIGH (i)+d/2 (S406).

In the case that the provisionally set maximum height of the n+1st pass is less than SIEGE (i)+d/2 (S406: YES), the control unit 5 sets SHIGH (i)+d/2 as the maximum height of n+1 (S408). Thereafter, the control unit 5 judges whether the sensor change number SNSNUM is greater than "i" (S410). That is, the control unit 5 determines whether the number of movements of the first optical sensor 56 and the second optical sensor 57 is two or more in one scanning section. In the case that the sensor change number SNSNUM is greater than "i" (S410: YES), the control unit 5 increments the height detection number i by "1" and returns to step S406. The processes of steps S406 through S412 are repeated until the sensor change number SNSNUM becomes the same value as that of "i" in step S410.

That is, in the case that the number of movements of the first optical sensor 56 and the second optical sensor 57 in one scanning section is two or greater, the control unit 5 compares the value of SHIGH (i), which is information related to the heights after all of the movements, plus d/2 and the provisionally set maximum height of the n+1st pass. Then, in the case that the provisionally set maximum height of the n+1st pass is less than all of the values of SHIGH (i)+d/2 (S406: YES), SHIGH (i), which is the maximum value from among all of the values from SHIGH (1) through SHIGH (SNSNUM), plus d/2 is set as the maximum height of the n+1st pass. In the case that the provisionally maximum height of the n+1st pass is greater than or equal to all of the values of SHIGH (i)+d/2 (S406: NO), a height, which is the final height of the positions of the first optical sensor 56 and the second optical sensor 57 in the previous nth path plus d/2, is set as the maximum height of the n+1st pass.

Figure 28A:
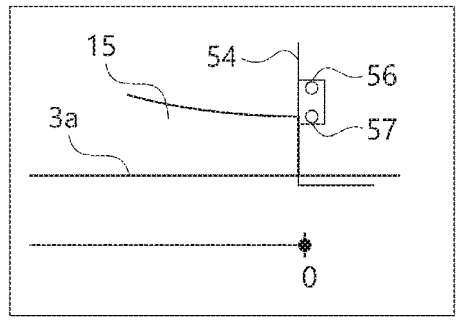
FIG. 28A is a collection of diagrams for explaining the initial height position setting of the first optical sensor and the second optical sensor.

Next, the initial height position setting of the first optical sensor 56 and the second optical sensor 57 in S204 of the flowchart illustrated in FIG. 23 will be described with reference to the flowchart illustrated in FIG. 27, and FIGS. 28A through 28E. FIGS. 28A through 28E are magnified views of the vicinities of the first optical sensor 56 and the second optical sensor 57. In addition, FIG. 28A shows a state in which the shuttle unit 54 has moved from the standby position (HOME) to the printing process start position (SD position=0).

Figure 28B:
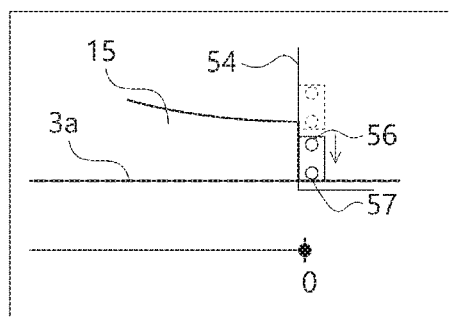
FIG. 28B is a collection of diagrams for explaining the initial height position setting of the first optical sensor and the second optical sensor.

First, the control unit 5 continues to move the first optical sensor 56 and the second optical sensor 57 downward from the state illustrated in FIG. 28A until the lower side of the second optical sensor 57 reaches the medium mounting surface 3a, as illustrated in FIG. 28B (S300).

Figure 28C:
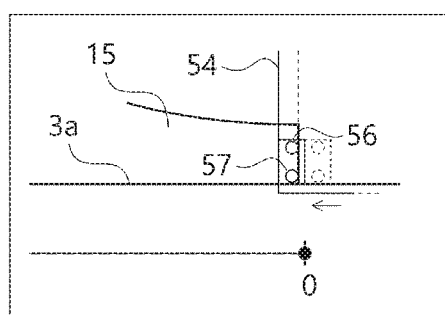
FIG. 28C is a collection of diagrams for explaining the initial height position setting of the first optical sensor and the second optical sensor.

Next, the control unit 5 moves the shuttle unit 54 backward and stops when the output signal of the second optical sensor 57 becomes "0", as illustrated in FIG. 28C (S302).

Figure 28D:
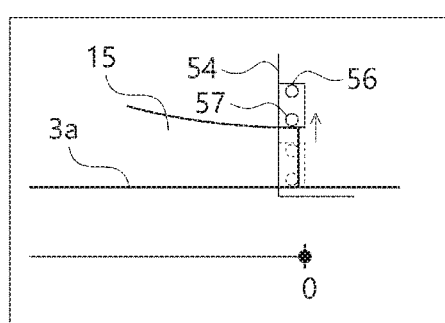
FIG. 28D is a collection of diagrams for explaining the initial height position setting of the first optical sensor and the second optical sensor.

Then, the control unit 5 moves the first optical sensor 56 and the second optical sensor 57 upward and stops the upward movement when signal output from the second optical sensor 57 changes from "0" to "1", as illustrated in FIG. 28D (S304).

Figure 28E:
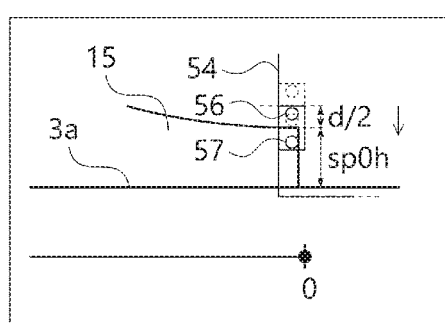
FIG. 28E is a collection of diagrams for explaining the initial height position setting of the first optical sensor and the second optical sensor.

Subsequently, the control unit 5 moves the first optical sensor 56 and the second optical sensor 57 downward by d/2 and stops the downward movement, as illustrated in FIG. 28E (S306). The surface of the leading end of the print medium 15 is positioned at the center of the first optical sensor 56 and the second optical sensor 57, in this manner. The heights of the first optical sensor 56 and the second optical sensor 57 at this time are designated as the initial height positions of the first optical sensor 56 and the second optical sensor 57 (S308). This initial height position is the height sp0h at the SD position=SP0 described above.

Then, the control unit 5 sets the initial height position sp0h+d/2 as the initial maximum height, as described above. That is, the maximum height of the 0th pass is set to sp0h+d/2 (S310). The above is a description of the initial height position setting.

Next, the advantageous effects of the ink jet printing apparatus 6 of the second embodiment will be described with reference to FIG. 29.

FIG. 29 is a diagram for explaining the problems of the conventional ink jet printing apparatus. Specifically, FIG. 29 is a diagram for explaining a case where a straight line extending in the front-back direction with respect to the print medium 15 is printed using a conventional ink jet printing apparatus that does not change the height of the head unit 26.

FIG. 29A is a diagram of the head unit 26 and the print medium 15 as viewed from the left-right direction, and FIG. 29B is a diagram of a straight line printed on the print medium 15 as viewed from above. In addition, the height of the head unit 26 is adjusted with the highest position of the print medium 15 as a reference, and in each pass from an nth pass to an n+7th pass, the head unit 26 is moved from the right to the left of the apparatus to perform printing.

As a result, as the height of the print medium 15 decreases, as illustrated in FIG. 29A, the printed line becomes shifted toward the left side and is an oblique line as illustrated in FIG. 29B. In addition, since the distance between the head unit 26 and the print medium 15 is excessively great in the n+6th pass and thereafter, the landing precision of the ink droplet is also reduced due to the decrease in the ejection speed of the ink droplet, resulting in an unstable state.

FIG. 30 is a collection of diagrams for explaining a case where a straight line extending in the front-rear direction is printed on the print medium 15 illustrated in FIG. 29 using the ink jet printing apparatus 6 of the second embodiment. FIG. 30A is a diagram of the head unit 26 and the print medium 15 as viewed from the left-right direction, and FIG. 30B is a diagram of a straight line printed on the print medium 15 as viewed from above. In addition, the head unit 26 moves in the vertical direction based on the maximum height of each pass as described above, and in each pass from the nth pass through the n+7th pass, the head unit 26 is moved from right to left of the apparatus to perform printing.

As illustrated in FIG. 30B, the distance between the head unit 26 and the print medium 15 is appropriate in the nth pass, but the distance becomes greater from the n+1st pass. In the n+3rd pass, a change in the state of the signals which are output from the first optical sensor 56 and the second optical sensor 57 is detected, and an adjustment to move the head unit 26 downward in the n+4th pass is performed. That is, the head unit 26 moves in a direction to reduce printing shifts. As a result, as illustrated in FIG. 30B, printing shifts can be reduced as compared with the conventional technique. In addition, an unstable landing state being reached due to reduction in ejection speed of ink droplets is prevented.

FIG. 31 is a collection of diagrams for explaining the printing result in the case where the distance between the first optical sensor 56 and the second optical sensor 57 in the ink jet printing apparatus 6 of the second embodiment is made narrower than the case described with reference to FIG. 30. FIG. 31A is a view of the head unit 26 and the print medium 15 as viewed from the left-right direction, and FIG. 31B is a view of a straight line printed on the print medium 15 as viewed from above. In addition, the head unit 26 moves in the vertical direction based on the maximum height in each pass as described above, and in each pass from the nth pass to the n+7th pass, the head unit 26 is moved from right to left of the apparatus to perform printing.

In the example illustrated in FIG. 30, a change in the states of the signals which are output from the first optical sensor 56 and the second optical sensor 57 is detected in the n+3th pass and reflected in the printing of the n+4th pass. However, in the example illustrated in FIG. 31, a change in the states of the signals which are output from the first optical sensor 56 and the second optical sensor 57 is detected in the n+2nd pass and reflected in the printing of the n+3rd pass.

Further, in the example illustrated in FIG. 30, a change in the states of the signals which are output from the first optical sensor 56 and the second optical sensor 57 is not detected in the n+4th and subsequent passes. On the other hand, in the example illustrated in FIG. 31, changes in the states of the signals which are output from the first optical sensor 56 and the second optical sensor 57 are detected in the n+4th pass and the n+5th pass, and in the n+6th and subsequent passes, it becomes possible to return to the same straight line as that printed in the nth pass.

By decreasing the distance between the first optical sensor 56 and the second optical sensor 57 in this manner, it is possible to reduce variations in the distance between the print medium 15 and the head unit 26. Therefore, shifts in printing positions can be reduced.

According to the ink jet printing apparatus 6 of the second embodiment, it is possible not only to avoid contact between the head unit 26 and the print medium 15 at protrusive portions of the print medium 15, but also deterioration in printing quality caused by extreme decreases landing speed at recessed portions of the print medium 15 can be prevented. Therefore, favorable printing quality can be secured with respect to the entire surface of the print medium 15.

In addition, by providing the function of adjusting the distance between the first optical sensor 56 and the second optical sensor 57, it is possible to further optimize the distance between the head unit 26 and the print medium 15. As a result, printing quality can be further improved.

Here, by decreasing the distance between the first optical sensor 56 and the second optical sensor 57 as described above, it is possible to reduce shifts in printing positions. However, the amount of shift in the printing positions also changes according to the movement velocity of the head unit 26 in the main scanning direction (left-right direction), in addition to the distance between the first optical sensor 56 and the second optical sensor 57. That is, even when the distance between the first optical sensor 56 and the second optical sensor 57 is the same, the amount of shift increases as the movement velocity of the head unit 26 in the main scanning direction increases.

Meanwhile, in the case that the resolution which is desired by a user is high, it is necessary to cause the aforementioned amount of shift to be as small as possible. However, if the resolution which is desired by the user is low, the amount of shift need not be that small, and there are cases in which faster output by increasing the movement velocity of the head unit 26 is desired.

Here, a case in which printing results are set to conditions desired by a user depending on combinations of the resolution desired by a user, the movement velocity of the head unit 26 in the main scanning direction, and the distance between the first optical sensor 56 and the second optical sensor 57 will be described. Note that the distance between the first optical sensor 56 and the second optical sensor 57 may be automatically adjusted by the control unit 5 using a predetermined actuator, for example. Alternatively, the user may adjust the distance manually.

First, Table 4 below shows the tolerance values of landing shifts (printing shifts) with respect to resolutions desired by a user. Here, the landing shift tolerance values are set to be less than half of the intervals among dots.

TABLE 4

|  |  | Resolution | | | | | | |
| --- | --- | --- | --- | --- | --- | --- | --- | --- |
|  | dpi | 180 | 360 | 540 | 720 | 900 | 1080 | 1440 |
| Dot Interval | μm | 141.1 | 70.6 | 47.0 | 35.3 | 28.2 | 23.5 | 17.6 |
| Shift Tolerance Value | μm | 70.6 | 35.3 | 23.5 | 17.6 | 14.1 | 11.8 | 8.8 |

Table 5 below shows the distances d between the first optical sensor 56 and the second optical sensor 57 and the movement velocity v (crg) of the head unit 26 which are necessary to cause landing shifts (printing shifts) to be within the shift tolerance ranges shown in Table 4. STA 18 is a resolution of 180 dpi, STA 36 is a resolution of 360 dpi, STA 54 is a resolution of 540 dpi, STA 72 is a resolution of 720 dpi, STA 90 is a resolution of 900 dpi, STA 108 is a resolution of 1080 dpi, and STA 144 is a resolution of 1440 dpi.

TABLE 5

| Settings | | STA18 | STA36 | STA54 | STA72 | STA90 | STA108 | STA144 |
|---|---|---|---|---|---|---|---|---|
| h | mm | 1.5 | 1.5 | 1.5 | 1.5 | 1.5 | 1.5 | 1.5 |
| d | mm | 1 | 0.7 | 0.7 | 0.6 | 0.6 | 0.5 | 0.5 |
| v (fire) | m/s | 6 | 6 | 6 | 6 | 6 | 6 | 6 |
| V (crg) | mm/s | 400 | 300 | 200 | 170 | 140 | 125 | 100 |
| ZR | μm | 66.7 | 35.0 | 23.3 | 17.0 | 14.0 | 10.4 | 8.3 |

Here, the size of the gap h which is added to the maximum height of the print medium 15 is set to 1.5 mm and an ink discharge speed v (fire) is set to 6 m/s. In the second embodiment, because the surface of the print medium 15 is basically maintained between the first optical sensor 56 and the second optical sensor 57, a head gap, which is the distance between the head unit 26 and the print medium 15, was set to be within a range of h≤head gap≤h+d. The values of ZR shown in Table 5 are amounts of shift when the head gap is h+d. That is, the amounts of shift ZR are the values of maximum amounts of shift.

For example, in the case that a user desires printing at 720 dpi, by setting the values h=1.5 mm, d=0.6 mm, v (fire)=6 m/s, and v (crg)=170 mm/s, the maximum amount of shift will be 17.0 μm, and it is possible to realize a shift tolerance value of 17.6 μm or less.

Figure 32:
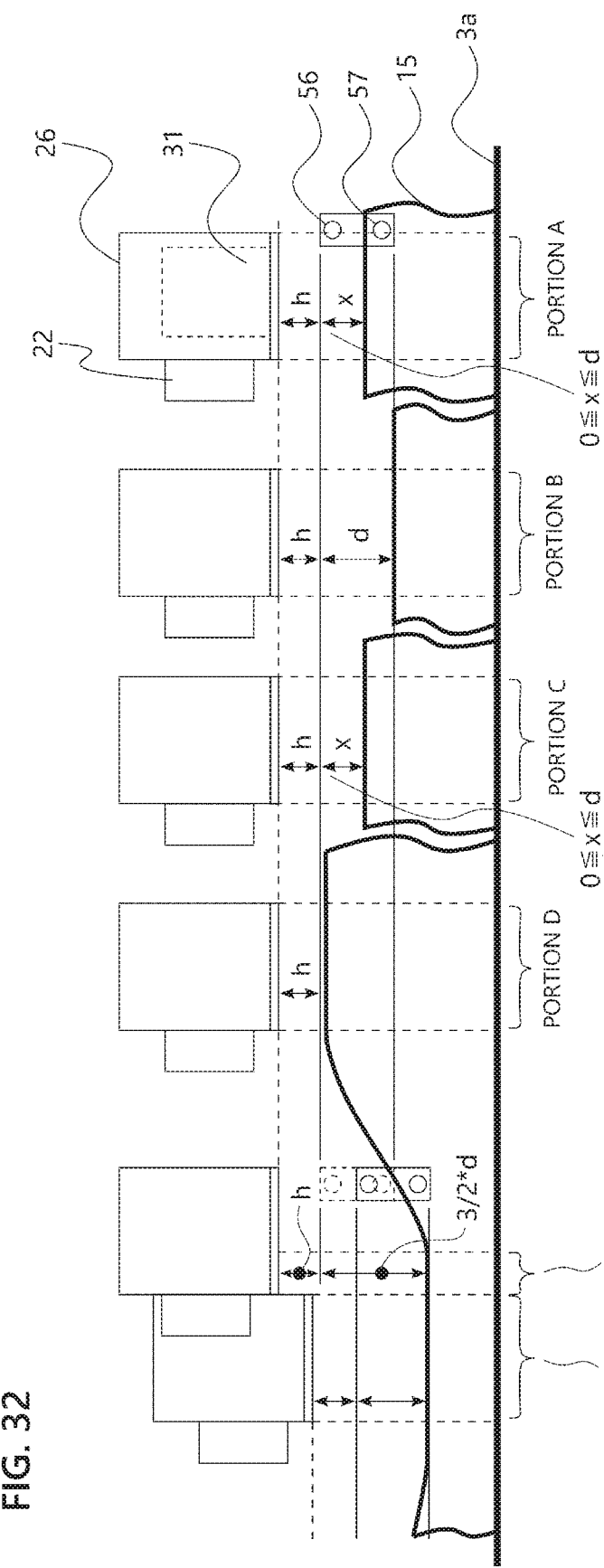
FIG. 32 is a diagram for explaining the range of the gap control between a head unit and a print medium.
Figure 33:
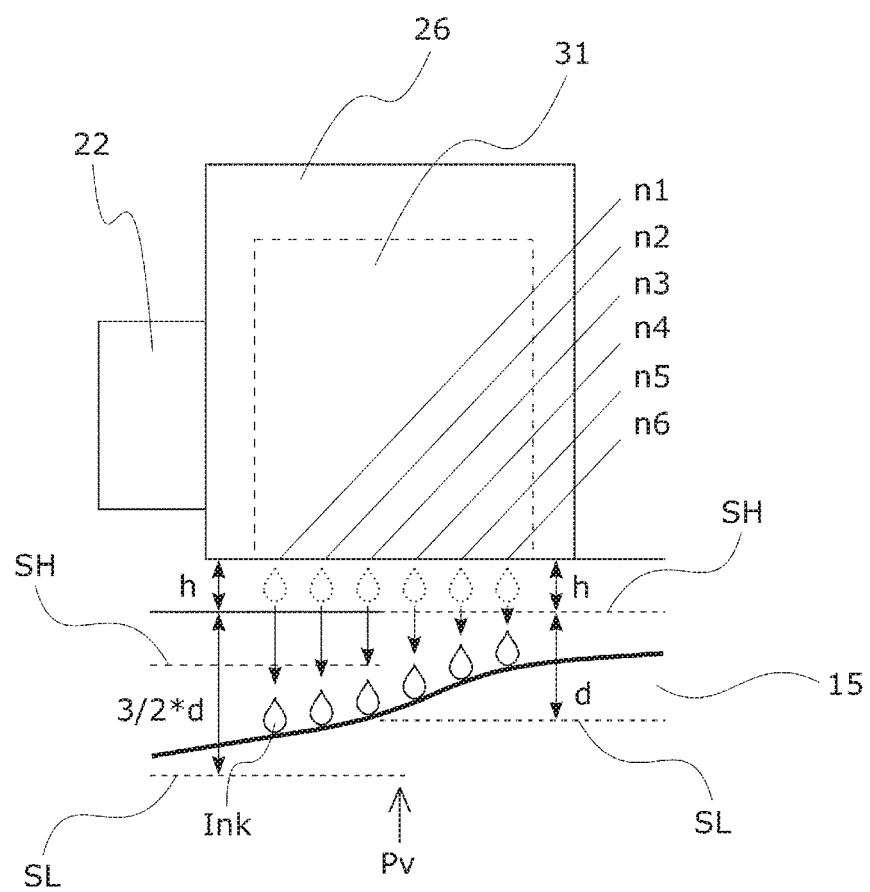
FIG. 33 is a diagram for explaining the range of the gap control between the head unit and the print medium.
Figure 34A:
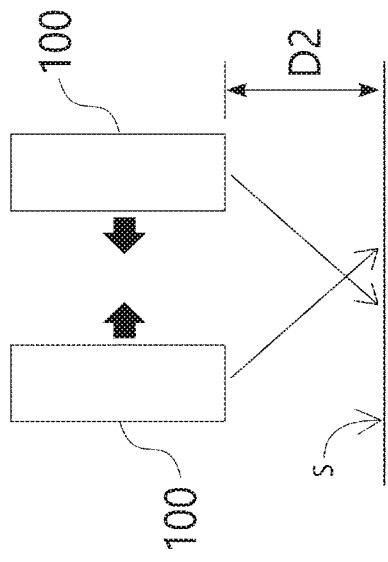
FIG. 34A is a diagram for explaining a problem of a conventional ink jet printing apparatus.
Figure 34B:
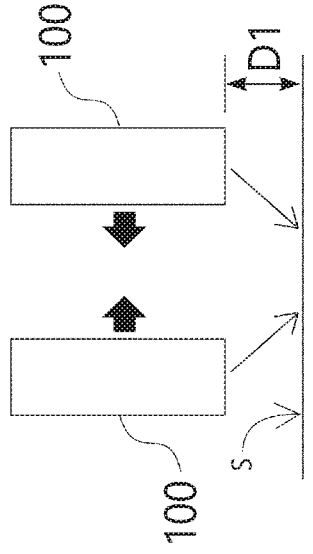
FIG. 34B is a diagram for explaining a problem of a conventional ink jet printing apparatus.
Figure 34C:
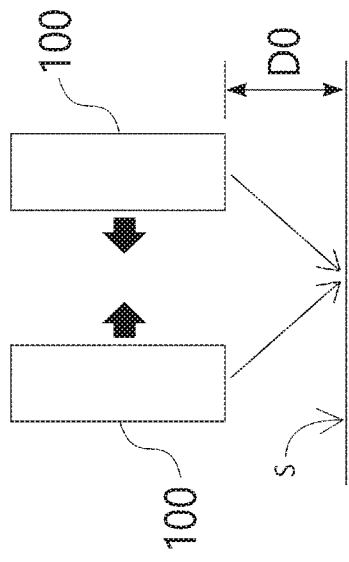
FIG. 34C is a diagram for explaining a problem of a conventional ink jet printing apparatus.

Note that Table 5 shows examples of calculations for cases in which the head gap is within the range of h≤head gap≤h+d. However, there may be cases in which the head gap is greater than or equal to the upper limit of this range at a point in time at which the heights of the first optical sensor 56 and the second optical sensor 57 are changed in order to maintain the surface of the print medium 15 between the first optical sensor 56 and the second optical sensor 57. Such a case will be described with reference to FIGS. 32 and 33. FIGS. 32 and 33 are diagrams of the print medium 15 and the head unit 26 as viewed from the left side.

As described above, in the second embodiment, because the surface of the print medium 15 is basically maintained between the first optical sensor 56 and the second optical sensor 57, the head gap, which is the distance between the head unit 26 and the print medium 15 is in the range of h≤head gap≤h+d. That is, in the case of the print medium 15 illustrated in FIG. 32, x in FIG. 32 is 0≤x≤d in portions A, B, C, D and F.

However, for example, in the case that the height of the print medium 15 decreases to a great degree, there are cases in which the value of x may increase further. Specifically, when the surface of the print medium 15 is lower than the second optical sensor 57 as in portion E illustrated in FIG. 32, the first optical sensor 56 and the second optical sensor 57 are lowered by d/2 to track the surface position of the print medium 15 so as to maintain it between the first optical sensor 56 and the second optical sensor 57.

However, in contrast, there may be cases in which the height of the head unit 26 is the same as the position before the first optical sensor 56 and the second optical sensor 57 are lowered, that is, the same position as the D portion. There are cases in which printing is performed in this state. Taking such cases into account, the head gap becomes h≤head gap≤h+3/2×d.

More specifically, a case will be considered in which the ink jet head 31 of the head unit 26 has six nozzles n1 through n6 arranged in the sub scanning direction (front-rear direction), and the heights of the first optical sensor 56 and the second optical sensor 57 are lowered at a point Pv within a predetermined pass as illustrated in FIG. 33, for example. The dotted line SH illustrated in FIG. 33 indicates a movement trajectory of the first optical sensor 56, and the dotted line SL indicates a movement trajectory of the second optical sensor 57. In this case, with respect to the nozzles n6, n5, and n4, the distance D1 between the nozzle and the print medium 15 is within a range of h≤D1≤h+d, but for the nozzles n3, n2, and n1, distance D2 between the nozzle and the print medium 15 is within a range of h≤D2≤h+3/2×d. Therefore, as a result, the pass illustrated in FIG. 33 is printed with the head gap in a range of h≤head gap≤h+3/2.

Table 6 below shows cases in which the head gap is within the range of h≤head gap≤h+3/2×d, and values for the distance d (the distance between the first optical sensor 56 and the second optical sensor 57) and the movement velocity v (crg) of the head unit 26 that satisfy shift tolerance values for various resolutions. Note that here as well, the size of the gap h was set to 1.5 mm and the ink discharge speed v (fire) was set to 6 m/s.

TABLE 6

| Settings | | STB18 | STB36 | STB54 | STB72 | STB90 | STB108 | STB144 |
|---|---|---|---|---|---|---|---|---|
| h | mm | 1.5 | 1.5 | 1.5 | 1.5 | 1.5 | 1.5 | 1.5 |
| d | mm | 1 | 0.5 | 0.5 | 0.4 | 0.4 | 0.4 | 0.4 |
| v (fire) | m/s | 6 | 6 | 6 | 6 | 6 | 6 | 6 |
| v (crg) | mm/s | 250 | 250 | 180 | 150 | 130 | 100 | 80 |
| ZR | μm | 62.5 | 31.3 | 22.5 | 15.0 | 13.0 | 10.0 | 8.0 |

In the calculation results shown in both of Table 5 and Table 6, the value of the distance d can be increased and the movement velocity of the head unit 26 can be set faster in the case where the resolution is rough (for example, 180 dpi), but if the resolution is fine (for example, 1440 dpi), it is necessary to suppress the values of both of the distance d and the movement velocity of the head unit 26.

As can be understood from a comparison of Table 5 and Table 6, in order to cause the landing shifts (printing shifts) to fall within shift tolerance values with head gaps within the range of h≤head gap≤h+3/2×d, it is necessary to suppress the values of both of the distance d and the movement velocity of the head unit 26 to a greater degree than for cases in which landing shifts are caused to be within, rather than setting the landing deviation within the deviation tolerance within shift tolerance values with head gaps within the range of h≤head gap≤h+d.

From the above results, in the ink jet printing apparatus 6 of the second embodiment, the values of the distance d and the movement velocity of the head unit 26 are set to be variable according to the resolution desired by a user. Optimization of printing quality and processing speed can be achieved, by adopting a configuration in which the user is capable of selecting an applicable range within which the gap is controlled.

That is, the values of the distances d and the movement velocities of the head unit 26 corresponding to each of the resolutions shown in Table 5 and Table 6 may stored in advance as a table. When a desired resolution is set and input by the user, the control unit 5 may obtain the values of the distance d and the movement velocity of the head unit 26 according to the resolution. Then, the control unit 5 may adjust the interval between the first optical sensor 56 and the second optical sensor 57 and control the movement velocity of the head unit 26 such that these values are satisfied.

Specifically, in the case that a user will be satisfied with a low image quality as image quality and desires to confirm output results quickly, the user will select STA18 in Table 5, for example. In this case, the resolution will be 180 dpi, but the printing speed can be the fastest. In addition, the amount of shift of printing positions can also be set within the range of shift tolerance values.

Alternatively, in the case that a user desires a standard image quality as image quality and uses a print medium with a comparatively favorable flatness, the user will select STA72 Table 5. In this case, the resolution can be set to 720 dpi, and the amount of shift of printing positions can also be set within the range of shift tolerance values.

As a further alternative, in the case that a user desires a standard image quality for as image quality and desires to minimize landing shifts as much as possible, the user will select STB72 in Table 6. In this case, the resolution can be set to 720 dpi, and the landing shift can also be as small as possible within the range of the shift tolerance values.

As a still further alternative, in the case that the user desires high image quality as image quality and desires to minimize landing shifts as much as possible landing deviation and the printing speed can be low, the user will select STB144 in Table 6. In this case, since the movement velocity of the head unit 26 is slow, the printing speed will be slow, but the resolution can be 1440 dpi, and the landing shift can also be as small as possible within the range of the shift tolerance values.

In addition, two optical sensors, which are the first optical sensor 56 and the second optical sensor 57, are employed in the second embodiment. However, it is also possible to adopt a configuration in which a linear sensor light that extends in the vertical direction (up-down direction) is output from a light emitting unit, the linear sensor light is received by a light receiving unit.

In the case that such a transmissive sensor that emits and receives linear sensor light is employed, the light receiving state of the linear sensor light (the length of the sensor light which is received) may be detected to detect information related to the height of the surface of the print medium 15. Thereby, there is no need to move the first optical sensor 56 and the second optical sensor 57 in the vertical direction as in the second embodiment, and the apparatus can be miniaturized. However, because the detection range is limited within the range of the linear sensor light, in the case where the printing process is performed on print media 15 having greatly different thicknesses, a mechanism for vertically moving the light emitting unit and the light receiving unit may be provided.

In this case, a mechanism for manually moving the light emitting unit and the light receiving unit may be provided, or a mechanism for automatically moving the light emitting unit and the light receiving unit in the up-down direction may be provided according to the type of the print medium 15.

In addition, information related to the height of the surface of the print medium 15 is detected while moving the shuttle unit 54 backward after the shuttle unit 54 has been moved to the printing process start position, in the second embodiment. However, the present invention is not limited to such a configuration. For example, information related to the height of the surface of the print medium 15 may be detected while the shuttle unit 54 is moved from the standby position (HOME) to the printing process start position. However, in this case, since it is necessary to hold the information related to height until the start of an actual printing process, a large capacity will be required for a semiconductor memory. Therefore, it is desirable to detect information related to the height of the surface of the print medium 15 while moving the shuttle unit 54 backward, as in the second embodiment. By this method, the information related to the height of scanning sections for which printing processes have been completed can be sequentially erased from a semiconductor memory, and the capacity of the semiconductor memory can be reduced.

In addition, in the second embodiment, the head unit 26 is moved upward in the vertical direction and downward in the vertical direction based on the information related to the height of the surface of the print medium 15. Alternatively, the flat bed unit 3 or the sub scanning drive guides 13A and 13B may be moved upward and downward in the vertical direction instead of moving the head unit 26. As a further alternative, at least two of the head unit 26, the flat bed unit 3, and the sub scanning drive guides 13A and 13B may be moved upward and downward in the vertical direction.

In addition, in the second embodiment, the first optical sensor 56 and the second optical sensor 57 are provided at positions separated by one scanning section rearward from the head unit 26. However, the present invention is not limited to such a configuration. For example, the first optical sensor 56 and the second optical sensor 57 may be provided immediately behind the head unit 26.

However, in this case, the shuttle unit 54 will be moved to a range in which information related to height is not yet detected, and it will be necessary to execute a process to move the head unit upward in parallel at a point in time when, for example, information related to the height at which the head unit 26 is likely to contact the print medium 15 is detected. Alternatively, it will be necessary to cease the movement of the shuttle unit 54 and restart the movement in the sub scanning direction after moving the head unit 26 upward. As a further alternative, it will be necessary to move the head unit 26 to the maximum settable height, and then detect information related to height while moving the shuttle unit 54 to a next pass.

In the ink jet printing apparatus 1, 6 according to the first and second embodiments, the shuttle unit 4, 54 is moved relative to the print medium 15 (flat bed unit 3) so as to perform scanning in the sub scanning direction. However, the present invention is not limited to such a configuration.

The shuttle unit 4, 54 may be fixed, and the print medium 15 (flat bed unit 3) may be moved, or both the shuttle unit 4, 54 and the print medium 15 (flat bed unit 3) may be moved.

The following additional notes are disclosed regarding the ink jet printing apparatus of the present invention.

(Additional Notes)

In the ink jet printing apparatus of the present invention, the height information detecting unit may sequentially detect information related to the height of the surface of the print medium accompanying the movement of at least one of the print medium and the ink jet head.

The ink jet printing apparatus of the present invention may have a scanning mechanism that moves an ink jet head in a scanning direction orthogonal to a conveyance direction and may perform a printing process in a scanning section by movement of an ink jet head in a scanning direction, and the head unit having the ink jet head and the height information detecting unit may be provided apart from each other by one scanning section in the conveyance direction.

In addition, the ink jet printing apparatus of the present invention, the height information detecting unit may be provided at the exterior sides of the print medium in a direction orthogonal to the conveyance direction.

In addition, in the ink jet printing apparatus of the present invention, the height information detecting unit may have an optical sensor, and information related to height may be detected by repeatedly moving the sensor light emitted from the optical sensor in the vertical direction.

In addition, in the ink jet printing apparatus of the present invention, it is possible to detect information related to height by repeatedly moving the optical sensor in the vertical direction.

In addition, in the ink jet printing apparatus of the present invention, the height information detecting unit may have two sets of optical sensors arranged at different positions in the vertical direction, and information related to height may be detected while moving the two sets of optical sensors upward and downward in the vertical direction for a distance which is set in advance, according to the light receiving states of the optical sensors.

In the ink jet printing apparatus of the present invention, the two sets of optical sensors may have a first optical sensor provided at the upper side in the vertical direction and a second optical sensor provided at the lower side in the vertical direction, and the height information detecting unit may move the two sets of optical sensors such that the surface of the print medium is positioned between the first optical sensor and the second optical sensor.

Further, the ink jet printing apparatus of the present invention may be configured such that it is possible to adjust the distance between the first optical sensor and the second optical sensor in the vertical direction.

EXPLANATION OF THE REFERENCE NUMERALS 1, 6 ink jet printing apparatus
2 shuttle base unit
3 flat bed unit
3a medium mounting surface
4, 54 shuttle unit
5 control unit
11 gantry section
12 sub scanning drive motor
13A, 13B sub scanning drive guides
15 printing medium
21 casing
22 main scanning drive guide
23 main scanning drive motor
24 head elevating guide
25 head elevating motor
26 head unit
28 suction unit
29 absorption member setting mechanism
30 maintenance unit
31 ink jet head
32 nozzle guard
36 nozzle plate
36a ink ejection surface
37 nozzle
40, 55 height information detecting unit
41 light emitting unit
42 light receiving unit
43 first reflective mirror
44 second reflective mirror
45 sensor elevating motor
46 opening
50 light emitting unit
51 light receiving unit
53 ink supply pipe
56 first optical sensor
56a first light emitting unit
56b first light receiving unit
57 second optical sensor
57a second light emitting unit
56b second light receiving unit
66 capping unit
67 cap elevating motor
71 cap
72 cap base
76 bottom portion
77 peripheral wall
100 head unit
L sensor light
LN1~LN3 line
S surface
SL sensor light

What is claimed is:

1. An ink jet printing apparatus comprising:
an ink jet head for ejecting ink onto a print medium;
a conveying mechanism that moves at least one of the print medium and the ink jet head in a predetermined conveyance direction;
a height information detecting unit that obtains information related to the height of the surface of the print medium;
a moving mechanism that moves at least one of the ink jet head and the print medium upward and downward in the vertical direction;
a control unit that controls the ink jet head while sequentially controlling the moving mechanism accompanying conveyance by the conveying mechanism, based on the information related to the height which is detected by the height information detecting unit, thereby maintaining the distance between the print medium and the ink jet head to be within a range which is set in advance, to perform a printing process on the print medium; and
a scanning mechanism that moves the ink jet head in a scanning direction orthogonal to the conveyance direction, a printing process being administered in a scanning section by movement of the ink jet head in the scanning direction, wherein a downstream end of a head unit having the ink jet head and the height information detecting unit is arranged such that they are separated by one scanning section.

2. An ink jet printing apparatus as defined in claim 1, wherein:

the height information detecting unit sequentially detects the information related to the height accompanying the movement of at least one of the ink jet head and the print medium by the conveying mechanism.

3. An ink jet printing apparatus as defined in claim 1, wherein:

the height information detecting unit is provided at the exterior sides of the print medium in a direction orthogonal to the conveyance direction.

4. An ink jet printing apparatus as defined in claim 1, wherein:

the height information detecting unit comprises an optical sensor; and the information related to the height is detected by repeatedly moving a sensor light emitted from the optical sensor in the vertical direction.

5. An ink jet printing apparatus as defined in claim 4, wherein:

the information related to the height is detected by repeatedly moving the optical sensor in the vertical direction.

6. An ink jet printing apparatus as defined in claim 1, wherein:

the height information detecting unit comprise two sets of optical sensors arranged at different positions in the vertical direction; and the information related to the height is detected while moving the two sets of optical sensors upward and downward in the vertical direction for a distance which is set in advance, according to the light receiving states of the optical sensors.

7. An ink jet printing apparatus as defined in claim 6, wherein:

the two sets of optical sensors have first and second optical sensors provided at different positions in the vertical direction; and the height information detecting unit moves the two sets of optical sensors such that the surface of the print medium is positioned between the first optical sensor and the second optical sensor.

8. An ink jet printing apparatus as defined in claim 7, wherein:

the ink jet printing apparatus is configured to be adjustable to adjust the distance between the first optical sensor and the second optical sensor in the vertical direction.

9. An ink jet printing apparatus as defined in claim 1, wherein:

the head unit and the height information detecting unit are configured to be movable in the conveyance direction as an integrated unit; and the head unit moves in a direction orthogonal to the conveyance direction.

\* \* \* \* \*